US009413460B2

(12) United States Patent
Oshima et al.

(10) Patent No.: US 9,413,460 B2
(45) Date of Patent: *Aug. 9, 2016

(54) COMMUNICATION METHOD

(71) Applicant: PANASONIC INTELLECTUAL PROPERTY CORPORATION OF AMERICA, Torrance, CA (US)

(72) Inventors: Mitsuaki Oshima, Kyoto (JP); Koji Nakanishi, Kanagawa (JP); Hideki Aoyama, Osaka (JP); Shinsuke Ogata, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/008,799

(22) Filed: Jan. 28, 2016

(65) Prior Publication Data

US 2016/0149641 A1    May 26, 2016

Related U.S. Application Data

(63) Continuation of application No. 14/260,351, filed on Apr. 24, 2014, now Pat. No. 9,294,666.

(60) Provisional application No. 61/921,132, filed on Dec. 27, 2013.

(51) Int. Cl.
*H04N 5/235* (2006.01)
*H04B 10/116* (2013.01)
(Continued)

(52) U.S. Cl.
CPC .............. *H04B 10/116* (2013.01); *G06K 9/209* (2013.01); *G06K 9/22* (2013.01); *G06K 9/3208* (2013.01); *H04N 5/2257* (2013.01); *H04N 5/247* (2013.01)

(58) Field of Classification Search
CPC . H04N 5/23203; H04N 5/235; H04N 5/2351; H04N 5/2621; H04N 5/247
See application file for complete search history.

(56) References Cited

U.S. PATENT DOCUMENTS 7,224,394 B2 *  5/2007  Shimamura ......... H04M 1/0214
                                                    348/333.08
7,671,916 B2    3/2010  Hashimoto
(Continued)

FOREIGN PATENT DOCUMENTS

GB    2298752      11/1996
JP    08-242205    9/1996
(Continued)

OTHER PUBLICATIONS

International Search Report, mailed Jul. 22, 2014, for corresponding International Application No. PCT/JP2014/002327.

*Primary Examiner* — Tuan Ho
(74) *Attorney, Agent, or Firm* — Greenblum & Bernstein, P.L.C.

(57) ABSTRACT

A communication method used in a terminal is provided that includes a front camera and a back camera. The communication method includes switching between the front camera and the back camera according to an orientation of the terminal, and performing visible light communication by using the front camera or the back camera, which is selected in the switching. The performing of visible light communication includes capturing a first subject that is changing in luminance by using the front camera and obtaining a first image when the front camera is used, capturing a second subject by using the back camera and obtaining a second image when the back camera is used, and obtaining specified information that is related to the first subject or the second subject.

8 Claims, 48 Drawing Sheets

(51) Int. Cl.
 *H04N 5/225* (2006.01)
 *H04N 5/247* (2006.01)
 *G06K 9/32* (2006.01)
 *G06K 9/22* (2006.01)
 *G06K 9/20* (2006.01)

(56) References Cited

U.S. PATENT DOCUMENTS

| | | |
|---|---|---|
| 8,280,398 B2 | 10/2012 | Ishii et al. |
| 2002/0167701 A1 | 11/2002 | Hirata |
| 2007/0071344 A1* | 3/2007 | Ouzilevski ............... G06T 5/20 382/254 |
| 2007/0177161 A1 | 8/2007 | Ishii et al. |
| 2011/0187811 A1 | 8/2011 | Kim et al. |
| 2011/0299857 A1 | 12/2011 | Rekimoto |
| 2012/0281129 A1 | 11/2012 | Wang et al. |
| 2013/0330088 A1 | 12/2013 | Oshima et al. |
| 2013/0335592 A1 | 12/2013 | Yamada et al. |
| 2013/0337787 A1 | 12/2013 | Yamada et al. |
| 2014/0037296 A1 | 2/2014 | Yamada et al. |
| 2014/0184914 A1 | 7/2014 | Oshima et al. |
| 2014/0185860 A1 | 7/2014 | Oshima et al. |
| 2014/0186026 A1 | 7/2014 | Oshima et al. |
| 2014/0186047 A1 | 7/2014 | Oshima et al. |
| 2014/0186048 A1 | 7/2014 | Oshima et al. |
| 2014/0186049 A1 | 7/2014 | Oshima et al. |
| 2014/0186050 A1 | 7/2014 | Oshima et al. |
| 2014/0186052 A1 | 7/2014 | Oshima et al. |
| 2014/0186055 A1 | 7/2014 | Oshima et al. |
| 2014/0192185 A1 | 7/2014 | Oshima et al. |
| 2014/0192226 A1 | 7/2014 | Oshima et al. |
| 2014/0204129 A1 | 7/2014 | Oshima et al. |
| 2014/0205136 A1 | 7/2014 | Oshima et al. |
| 2014/0207517 A1 | 7/2014 | Oshima et al. |
| 2015/0207963 A1* | 7/2015 | Sayag ................... G03B 15/05 348/376 |

FOREIGN PATENT DOCUMENTS

| | | |
|---|---|---|
| JP | 09-305277 | 11/1997 |
| JP | 2002-290335 | 10/2002 |
| JP | 2011-254317 | 12/2011 |
| WO | 2005/086375 | 9/2005 |
| WO | 2013/175804 | 11/2013 |
| WO | 2013/187494 | 12/2013 |

* cited by examiner (When vertical)

FIG. 11

| | | |
|---|---|---|
| Validity flag { | Drawing validity | TRUE |
| Rack exterior { | Height of rack | 1600 mm |
| | Width of rack | 1200 mm |
| Rack interior { | The number of shelves | 3 |
| | Height ratio of first shelf | 0.3 |
| | Height ratio of second shelf | 0.35 |
| | Height ratio of third shelf | 0.35 |
| Product type information { | The number of product variations | 3 |
| | Length of image data of product type [0] | 542 |
| | Image data of product type [0] | (Binary) |
| | Height of product type [0] | 120 mm |
| | ... | |
| | Length of image data of product type [2] | 542 |
| | Image data of product type [2] | (Binary) |
| | Height of product type [2] | 140 mm |
| Product stock information { | The number of products | 10 |
| | Type number of product type [0] | 0 |
| | x coordinates of product type [0] | 1 |
| | y coordinates of product type [0] | 2 |
| | z coordinates of product type [0] | 0 |
| | ... | |
| | Type number of product type [9] | 2 |
| | x coordinates of product type [9] | 3 |
| | y coordinates of product type [9] | 1 |
| | z coordinates of product type [9] | 2 |

A11101 — Validity flag
A11102 — Rack exterior
A11103 — Rack interior
A11104 — Product type information
A11105 — Product stock information

| Validity flag | TRUE |
|---|---|
| Data length of map image | 400 kbyte |
| Map image | (Binary) |

A11301 — Validity flag
A11302 — Data length of map image
A11303 — Map image

| | | |
|---|---|---|
| A11601 | Error flag | TRUE |
| A11602 | Previous frame drawing type | Map information |
| A11603 | Depth of display rack | 0 |
| A11604 | Map offset X | 0 |
| A11605 | Map offset Y | 0 |
| A11606 | Previously-obtained ID | -1 |

FIG. 32

| Rack identifier | Illumination ID | Rack identifier of left rack | Rack identifier of right rack | Rack information |
|---:|---:|---:|---:|---|
| 100 | 200 | — | 101 | (Rack information 1) |
| 101 | 201 | 100 | 102 | (Rack information 2) |
| 102 | — | 101 | 103 | (Rack information 3) |
| 103 | 202 | 102 | — | (Rack information 4) |

A13101  A13102  A13103  A13104  A13105

COMMUNICATION METHOD

CROSS REFERENCE TO RELATED APPLICATION

This application is a continuation of U.S. application Ser. No. 14/260,351 filed on Apr. 24, 2014, which claims the benefit of U.S. Provisional Patent Application No. 61/921,132 filed on Dec. 27, 2013. The entire disclosure of the above-identified application, including the specification, drawings and claims is incorporated herein by reference in its entirety.

FIELD

The present invention relates to a method of communication between a mobile terminal such as a smartphone, a tablet terminal, or a mobile phone and a home electric appliance such as an air conditioner, a lighting device, or a rice cooker.

BACKGROUND

In recent years, a home-electric-appliance cooperation function has been introduced for a home network, with which various home electric appliances are connected to a network by a home energy management system (HEMS) having a function of managing power usage for addressing an environmental issue, turning power on/off from outside a house, and the like, in addition to cooperation of AV home electric appliances by internet protocol (IP) connection using Ethernet® or wireless local area network (LAN). However, there are home electric appliances whose computational performance is insufficient to have a communication function, and home electric appliances which do not have a communication function due to a matter of cost.

CITATION LIST

Patent Literature

Japanese Unexamined Patent Application Publication No. 2002-290335

SUMMARY

Technical Problem

However, the conventional method is limited to a case in which a device to which the method is applied has three color light sources such as an illuminator. The present invention solves this problem, and provides an information communication method that enables communication between various devices including a device with low computational performance.

Solution to Problem

In accordance with an aspect of the present disclosure, there is provided a communication method used in a terminal that includes a front camera as a first image capturing unit and a back camera as a second image capturing unit, the communication method including: switching between the front camera and the back camera according to an orientation of the terminal; and performing visible light communication by using the front camera or the back camera which is selected in the switching.

General and specific aspect(s) disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

An information communication method disclosed herein enables communication between various devices including a device with low computational performance.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 11 illustrates an example of a structure of pieces of information stored in a product information storage unit according to Embodiment 1.

FIG. 32 illustrates an example of a structure of pieces of information managed by a database (DB) of identifiers according to Embodiment 4.

DESCRIPTION OF EMBODIMENTS

Figure 1:
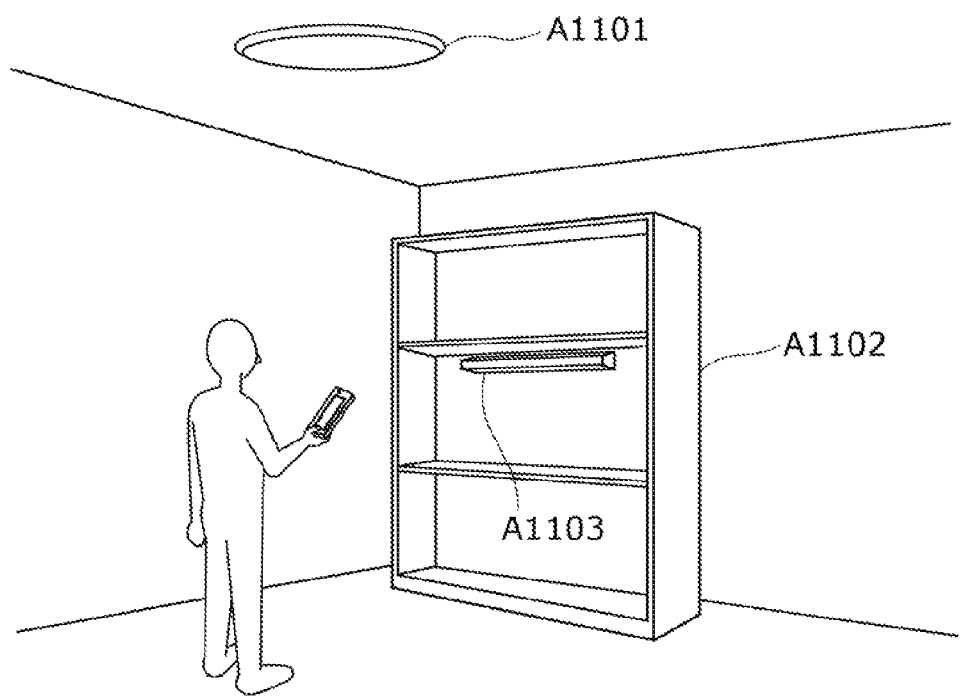
FIG. 1 is a diagram illustrating an example of a situation of using a mobile terminal according to Embodiment 1.

In accordance with an aspect of the present invention, there is provided a communication method used in a terminal that includes a front camera as a first image capturing unit and a back camera as a second image capturing unit, the communication method including: switching between the front camera and the back camera according to an orientation of the terminal; and performing visible light communication by using the front camera or the back camera which is selected in the switching.

In accordance with another aspect of the present invention, there is provided a communication method used in a terminal that includes a front camera as a first image capturing unit and a back camera as a second image capturing unit, the communication method including: switching between the front camera and the back camera at predetermined intervals; and performing visible light communication by using the front camera or the back camera which is selected in the switching.

For example, it is also possible that when the orientation of the terminal is substantially perpendicular to ground, the performing of visible light communication includes: performing, by using the back camera selected in the switching, visible light communication with a first device which is located in front of a user and emits visible light, thereby obtaining product information of a product rack provided with the first device; and displaying the product information on a display unit of the terminal, and when the orientation of the terminal is substantially parallel to ground, the performing of visible light communication includes: performing, by using the front camera selected in the switching, visible light communication with a second device which is located above the user and emits visible light, thereby obtaining position information of the second device; and displaying, on the display unit of the terminal, the position information as a current position of the user together with map information of an area where the user is present.

For example, it is further possible that the terminal is included in a watch, the front camera is provided on a front surface of the watch, and the back camera is provided on a side surface of the watch, the front surface having a display unit that displays a time of the watch, and when the display unit of the watch is substantially parallel to ground, the performing of visible light communication includes: performing, by using the front camera, visible light communication with a second device which is located above the user and emits visible light, thereby obtaining position information of the second device; performing, by using the back camera, visible light communication with a first device which is located in front of the user and emits visible light, thereby obtaining product information of a product rack provided with the first device; and displaying one of the position information and the product information on the display unit of the terminal according to selection of the user, the position information being displayed as a current position of the user together with map information of an area where the user is present.

For example, it is still further possible that the performing of visible light communication includes inquiring a server about an identifier uniquely assigned to a device that emits visible light, thereby obtaining information related to the device corresponding to the identifier, the identifier being obtained through visible light communication, and when no information corresponds to the identifier as a result of the inquiring the server, the performing of visible light communication further includes displaying, on the display unit of the terminal, an error notification indicating that no information is related to the device.

For example, it is still further possible that the communication method further includes changing the product information displayed on the display unit of the terminal, wherein in the changing, the product information to be displayed on the display unit is changed by user's flicking on the display unit.

For example, it is still further possible that the communication method further includes changing the map information displayed on the display unit of the terminal, wherein in the changing, the map information to be displayed on the display unit is changed by user's flicking on the display unit.

For example, it is still further possible that the performing of visible light communication includes initializing an offset assigned to the map information, when the product information of the product rack provided with the first device is obtained by using the back camera selected in the switching after displaying the map information on the display unit of the terminal, and the performing of visible light communication includes initializing an offset assigned to the product information, when the position information is obtained as the current position of the user by using the front camera selected in the switching after displaying the product information on the display unit of the terminal.

For example, it is still further possible that the communication method further includes detecting a line of sight of the user, wherein in the switching, the back camera is selected when the orientation of the terminal is substantially perpendicular to ground, in the detecting, the line of the sight of the user is detected by using the front camera, and the performing of visible light communication includes: performing, by using the back camera selected in the switching, visible light communication with the first device that is located in front of the user and emits visible light, thereby obtaining product information of a first product rack provided with the first device; and, when a second product rack in the line of the sight detected in the detecting is different from the first product rack, displaying product information of the second product rack instead of the product information of the first product rack.

For example, it is still further possible that the terminal includes an image sensor having a plurality of exposure lines, and the communication method further includes: obtaining image data by sequentially starting exposure of the exposure lines of the image sensor at different times and capturing a subject in an exposure time of $1/480$ seconds or less to partially and temporally overlap exposure times of adjacent exposure lines among the exposure lines; obtaining identification information of the subject by demodulating a bright line pattern which appears in the image data and corresponds to the exposure lines; and providing a user of the terminal with service information associated with the identification information of the subject.

For example, it is still further possible that the communication method further includes: receiving a request for distribution of information from a requester; distributing the information requested from the requester as information corresponding to data obtained by the visible light; and performing information processing for charging the requester according to the distribution of the information.

In accordance with still another aspect of the present invention, there is provided a communication device that includes a front camera as a first image capturing unit and a back camera as a second image capturing unit, the communication device including: a switching unit configured to switch between the front camera and the back camera according to an orientation of a terminal; and a visible light communication unit configured to perform visible light communication by using the front camera or the back camera which is selected by the switching unit.

These general and specific aspects may be implemented to a system, a method, an integrated circuit, a computer program, and a computer-readable recording medium, such as a Compact Disc-Read Only Memory (CD-ROM), and may be implemented also to a desired combination of them.

Hereinafter, embodiments are specifically described with reference to the Drawings. However, the description in details beyond necessity may be omitted. For example, detailed explanation of well-known matters and repeated explanation of the same structure may be omitted. This is because unnecessarily redundant explanation is avoided below to facilitate understanding of those skilled in the art.

Furthermore, each of the embodiments described below is a general or specific example. The numerical values, shapes, materials, structural elements, the arrangement and connection of the structural elements, steps, the processing order of the steps etc. shown in the following embodiments are mere examples, and therefore do not limit the scope of the present invention. Therefore, among the structural elements in the following embodiments, structural elements not recited in any one of the independent claims representing the broadest concepts are described as arbitrary structural elements.

Embodiment 1

Embodiment 1 describes a communication device that switches between light receiving units for visible light communication.

The communication device according to the present embodiment is assumed to be included in a mobile terminal, such as a smartphone.

The following describes a situation of using a mobile terminal including the communication device according to the present embodiment.

Figure 2:
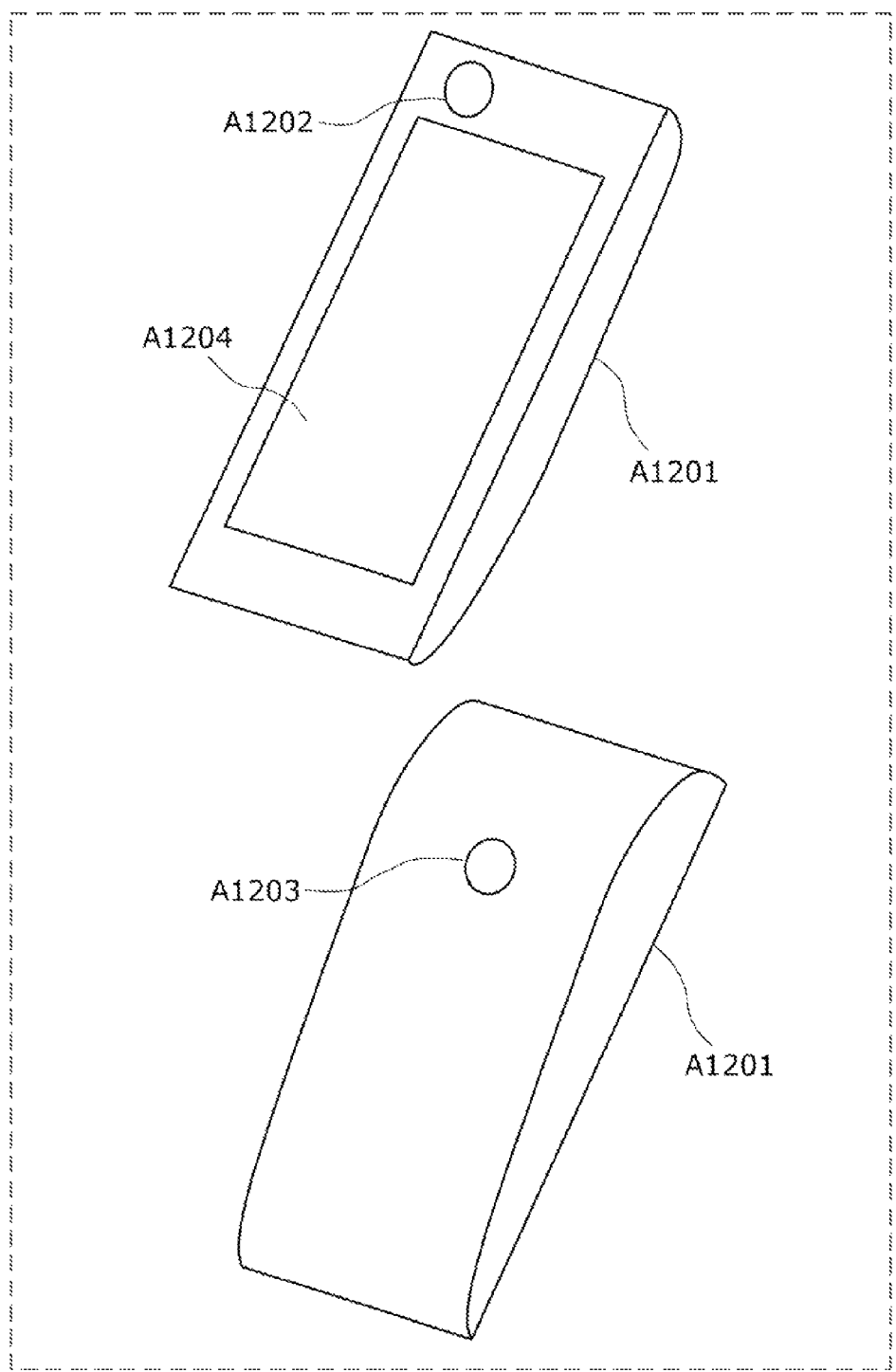
FIG. 2 is a schematic diagram illustrating an example of the mobile terminal according to Embodiment 1.

FIG. 1 is a diagram illustrating an example of a situation of using the mobile terminal according to Embodiment 1. FIG. 2 is a schematic diagram illustrating an example of the mobile terminal according to Embodiment 1.

The communication device used by a user performs visible light communication with a ceiling light A1101 provided on a ceiling so as to receive an ID transmitted from the ceiling light A1101. Furthermore, the communication device performs visible light communication with a base light (rack light) A1103 in front of the user so as to receive an ID transmitted from the base light A1103.

The communication device is characterized by (i) including a plurality of light receiving units (image capturing units) each receiving visible light, and (ii) by selecting a suitable light receiving unit from among the light receiving units according to an attitude of the mobile terminal in order to receive a plurality of IDs through visible light communication with a plurality of devices provided at different positions, such as the ceiling light A1101 and the base light A1103.

In the present embodiment, the communication device includes a front camera that is the first image capturing unit and a back camera that is the second image capturing unit. More specifically, for example, as illustrated in FIG. 2, a mobile terminal A1201 including the communication device has a front camera A1202 (first image capturing unit) on the front, a back camera A1203 (second image capturing unit) on the back, and a touch panel unit A1204 on the front. The communication device switches between the front camera A1202 (first image capturing unit) and the back camera A1203 (second image capturing unit) according to an orientation of the terminal (mobile terminal) including the communication device, and thereby performs visible light communication using the switched camera.

The following describes a situation where visible light communication is performed by switching between the image capturing units according to an orientation of the mobile terminal including the communication device.

Figure 3:
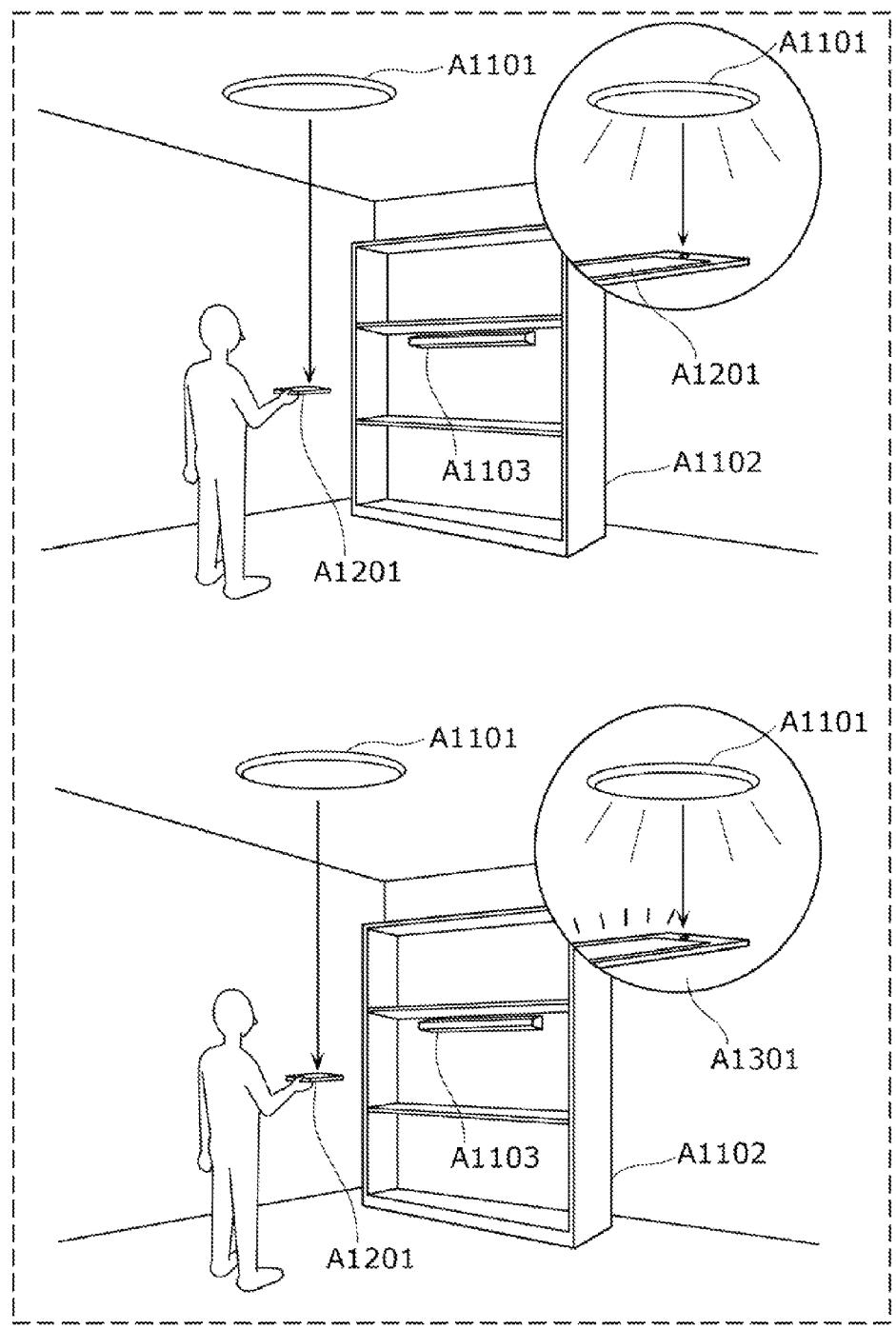
FIG. 3 is a diagram illustrating an example of a situation of holding the mobile terminal to be horizontal according to Embodiment 1.
Figure 4:
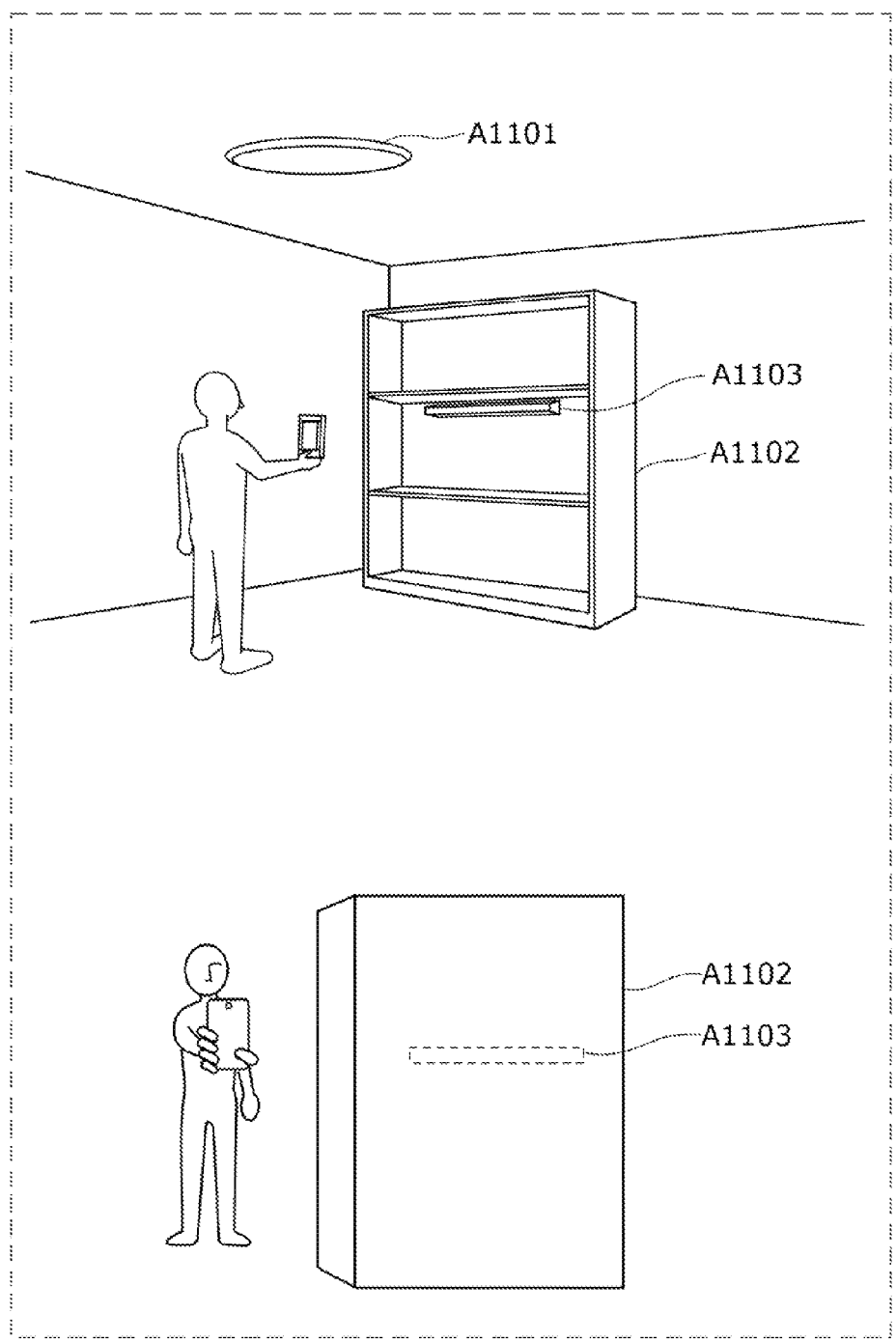
FIG. 4 is a diagram illustrating an example of a situation of holding the mobile terminal to be vertical according to Embodiment 1.

FIG. 3 is a diagram illustrating an example of a situation of holding the mobile terminal to be horizontal according to Embodiment 1. FIG. 4 is a diagram illustrating an example of a situation of holding the mobile terminal to be vertical according to Embodiment 1.

For example, as illustrated in FIG. 3, when the user holds the mobile terminal A1201 such that a display surface of the mobile terminal A1201 faces a ceiling (in other words, the display surface is substantially parallel to the ground), the mobile terminal A1201 determines by using an acceleration sensor in the mobile terminal A1201 that the mobile terminal A1201 is parallel to the ceiling (the ground), and therefore operates the front camera A1202. Here, operation of the back camera A1203 may be stopped for saving power consumption.

While the ceiling light A1101 is lighted, a light amount of the lighting is varied with a specific pattern (light emitting pattern), thereby performing visible light communication. For example, as illustrated in a region A1301, when the front camera A1202 currently operating detects light emitted from the ceiling light A1101, the front camera A1202 captures the light to perform the visible light communication. In other words, the mobile terminal A1201 obtains an ID associated with the light emitting pattern of the ceiling light A1101 through the visible light communication with the ceiling light A1101, and thereby changes actions according to a type of the ID.

Furthermore, for example, as illustrated in FIG. 4, when the user holds the mobile terminal A1201 to be perpendicular to the ground, the mobile terminal A1201 determines by using the included acceleration sensor that the mobile terminal A1201 does not face the ceiling light on the ceiling but faces the base light A1103 provided on a wall or a rack A1102, and thereby operates the back camera A1203. Here, operation of the front camera A1202 may be stopped for saving power consumption.

While the base light A1103 is lighted, a light amount of the lighting is varied with a specific pattern (light emitting pattern), thereby performing visible light communication. When the back camera A1203 currently operating detects the light emitted from the base light A1103, the back camera A1203 captures the light to perform the visible light communication. In other words, the mobile terminal A1201 obtains an ID associated with the light emitting pattern of the base light A1103 through the visible light communication with the base light A1103, and thereby changes actions according to a type of the ID.

Next, an example of the action according to a type of an obtained ID is described.

Figure 5:
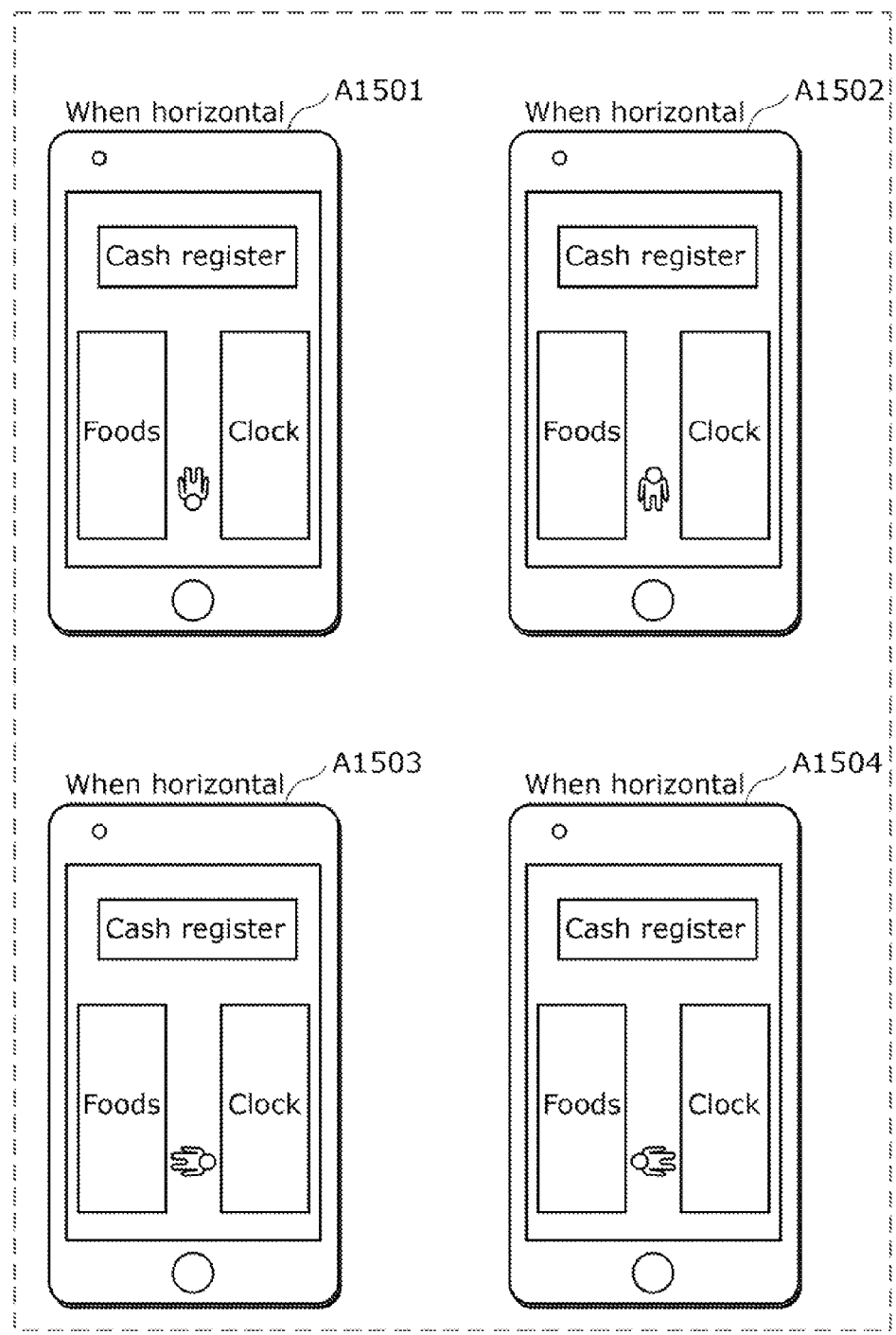
FIG. 5 is a schematic diagram illustrating examples of a shop map presented by the mobile terminal according to Embodiment 1.

FIG. 5 is a diagram illustrating examples of a shop map presented by the mobile terminal according to Embodiment 1.

As illustrated in FIG. 3, if the mobile terminal A1201 determines that the mobile terminal A1201 is parallel to the ceiling (ground), the mobile terminal A1201 transmits, to a server, an ID associated with a light emitting pattern obtained by visible light communication performed using the front camera A1202. The server searches out position information corresponding to the ID, and notifies the position information to the mobile terminal A1201.

When the position information is obtained from the server, the mobile terminal A1201 presents the user with a map (map information) showing a user's current position, such as a shop map as illustrated in FIG. 5, in which the obtained position information is presented as the user's current position.

As described above, if the orientation of the mobile terminal A1201 is substantially parallel to the ceiling (the ground), the front camera A1202 is used to perform visible light communication with the ceiling light A1101 (second device) that is located above the user and emits visible light, so as to obtain position information of the ceiling light A1101 (second device). The mobile terminal A1201 displays, on a display unit of the mobile terminal A1201, the obtained position information together with map information of an area where the user is present.

It should be noted that the map information displayed on the display unit of the mobile terminal A1201 may be changed by flicking. For example, if the user flicks on the display unit of the mobile terminal A1201, an offset position of the map information displayed on the display unit is changed.

Figure 6:
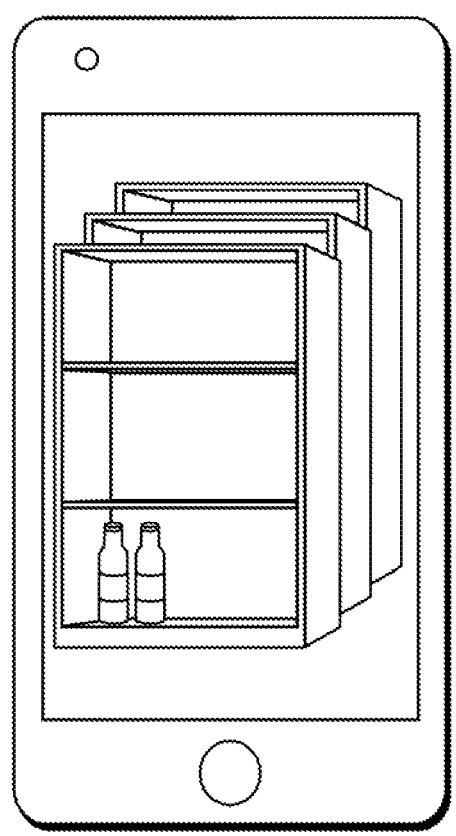
FIG. 6 is a diagram illustrating an example of a product UI presented by the mobile terminal according to Embodiment 1.
Figure 7:
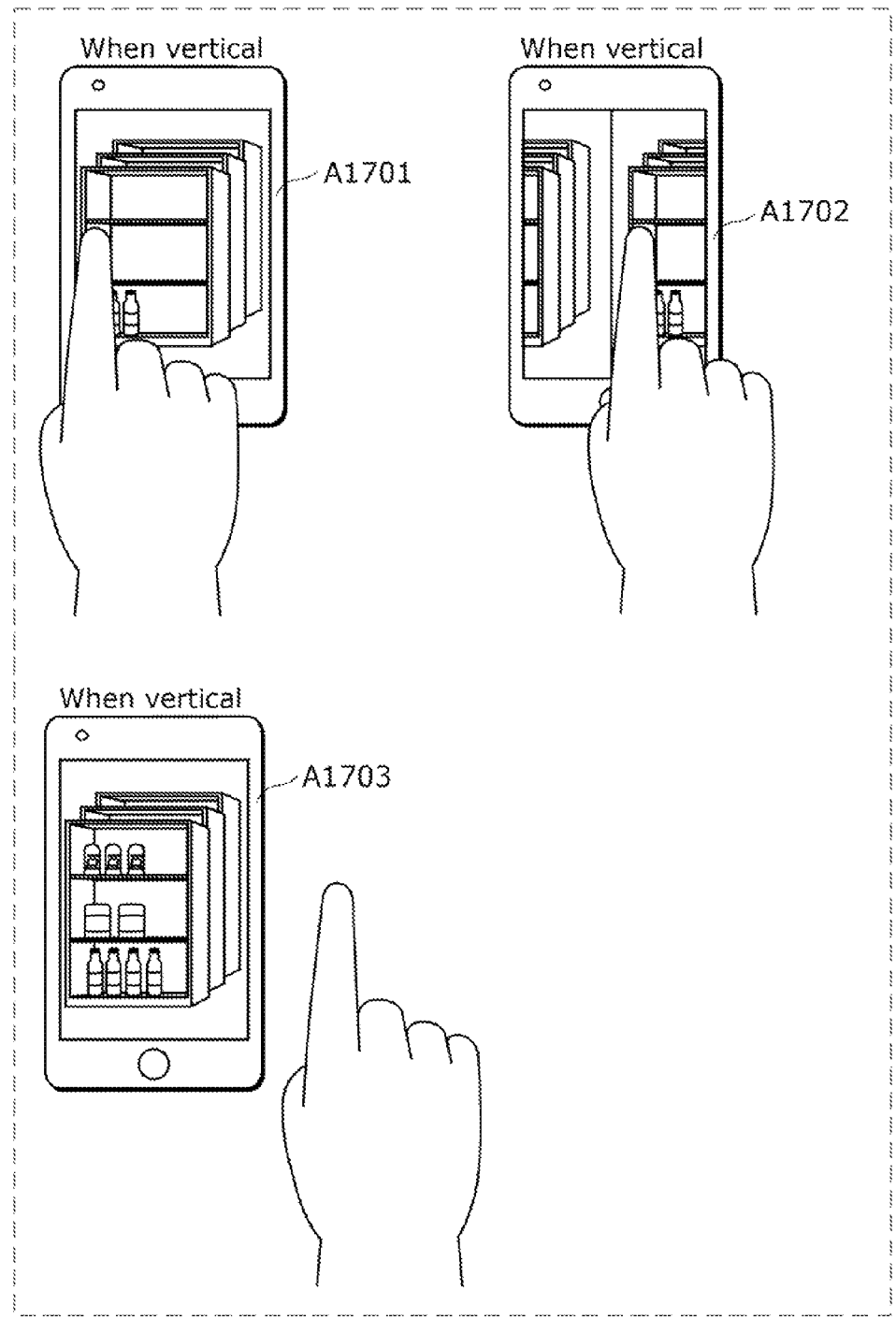
FIG. 7 is a diagram illustrating an example of a situation where the product UI presented by the mobile terminal is operated, according to Embodiment 1.

FIG. 6 is a diagram illustrating an example of a product user interface (UI) presented by the mobile terminal according to Embodiment 1. FIG. 7 is a diagram illustrating an example of the situation where the product UI presented by the mobile terminal is operated, according to Embodiment 1.

If it is determined that the mobile terminal A1201 is perpendicular to the ground as illustrated in FIG. 4, the mobile terminal A1201 transmits, to the server, an ID which is obtained through visible light communication using the front camera A1202. The server searches a database for a product type and stock of a product rack associated with the ID, and generates an image showing a stock amount of products according to the found product type and stock. Here, for example, as illustrated in FIG. 6, the server generates an image in which an image of products in stock is superimposed on an image of products arranged on the product rack. Then, the server transmits the generated image to the mobile terminal A1201.

The mobile terminal A1201 presents, on the display unit, the image received from the server, namely, the image showing a stock amount of the products.

As described above, when the orientation of the mobile terminal A1201 is substantially perpendicular to the ground, the back camera A1203 is used to perform visible light communication with the base light A1103 (first device) that is located in front of the user and emits visible light, so as to obtain product information of the product rack provided with the base light A1103 (first device). The mobile terminal A1201 displays the obtained product information on the display unit of the mobile terminal A1201.

It should be noted that the image displayed on the display unit of the mobile terminal A1201 to show the stock amount of the products may be changed by flicking. For example, if the user flicks on the display unit of the mobile terminal A1201, an offset of the image displayed on the display unit to show the stock amount of the products is changed, or the image itself is changed, thereby changing the product information displayed on the display unit.

When the server transmits the generated image (image data) to the mobile terminal A1201, it is also possible to transmit a plurality of images (plural pieces of image data) to the mobile terminal A1201. For example, as illustrated in FIG. 7, the server sequentially transmits an image A1701 of a rack with a small stock amount and an image A1703 of a rack with a large stock amount, and the mobile terminal A1201 therefore displays the image A1701 of the rack with the small stock amount. According to a screen operation of the user, such as flicking, the mobile terminal A1201 displays sequentially the image A1701 of the rack with the small stock amount, then an image A1702 showing a scrolling transition, and finally the image A1703 of the rack with the large stock amount. As a result, the user can check product stocks more instinctly and more easily.

Figure 8:
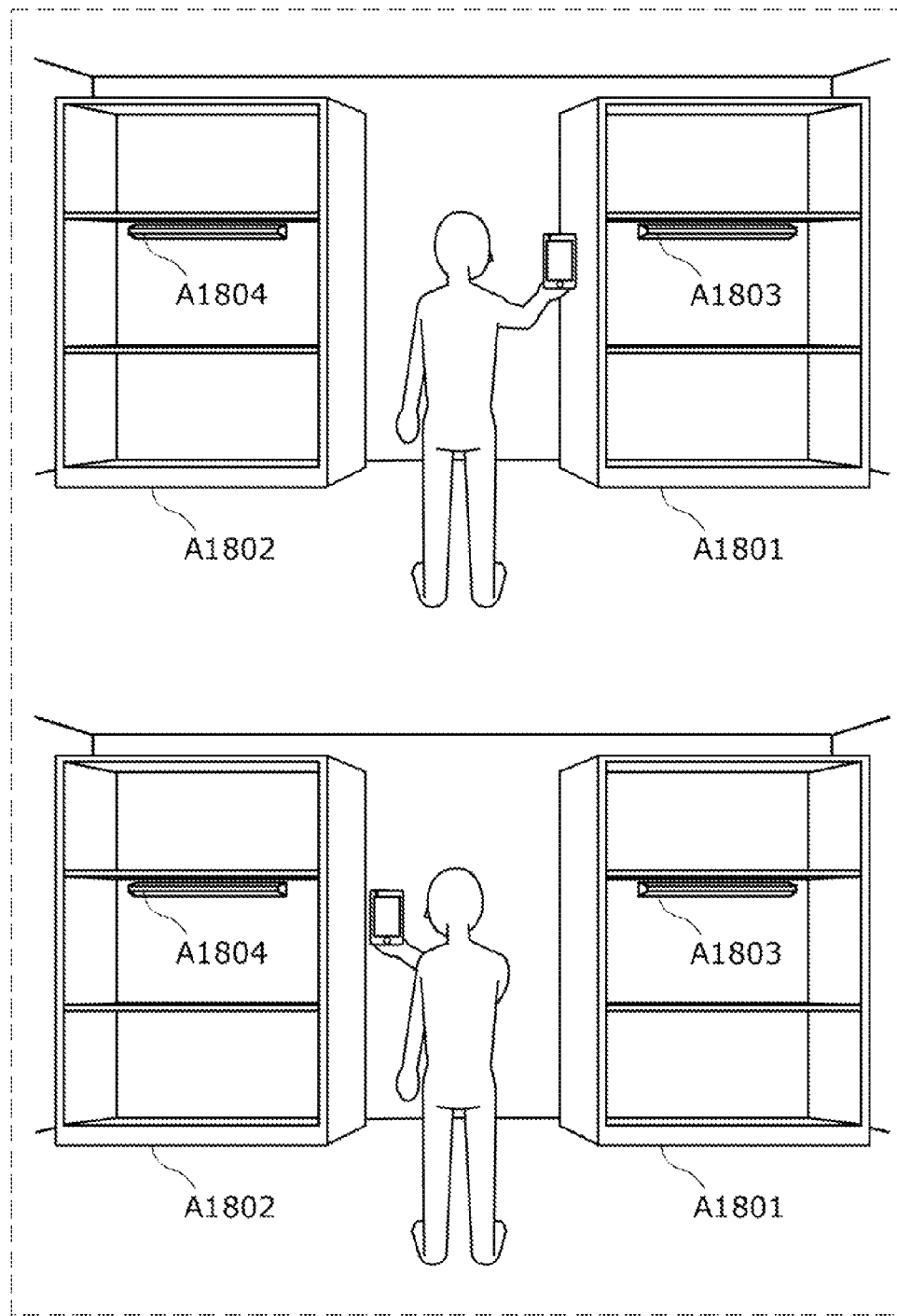
FIG. 8 is a diagram illustrating user's actions of moving the mobile terminal in a direction from right to left according to Embodiment 1.

FIG. 8 is a diagram illustrating user's actions of moving the mobile terminal in a direction from right to left according to Embodiment 1.

As described above, the mobile terminal A1201 can switch presented details according to a received ID. Therefore, for example, as illustrated in FIG. 8, it is possible to switch pieces of product information of a rack A1801 and a rack A1802 which the user has viewed. In other words, when the user causes the mobile terminal A1201 to face the rack A1801 and then face the rack A1802, the mobile terminal A1201 sequentially receives an ID from a base light A1803 and an ID from a base light A1804. Therefore, the mobile terminal A1201 can sequentially display product information corresponding to the ID received from the base light A1803 and then product information corresponding to the ID received from the base light A1804.

As described above, the mobile terminal A1201 can present the user with pieces of information corresponding to an ID obtained by visible light communication with a device selected according to an attitude of the user.

It should be noted that the terminal including the communication device according to the present embodiment is not limited to the mobile terminal A1201 having image capturing units on the front and on the back. The terminal may be a watch. The following describes an example of the situation where the terminal including the communication terminal according to the present embodiment is a watch (watch-type device) with reference to FIG. 9.

Figure 9:
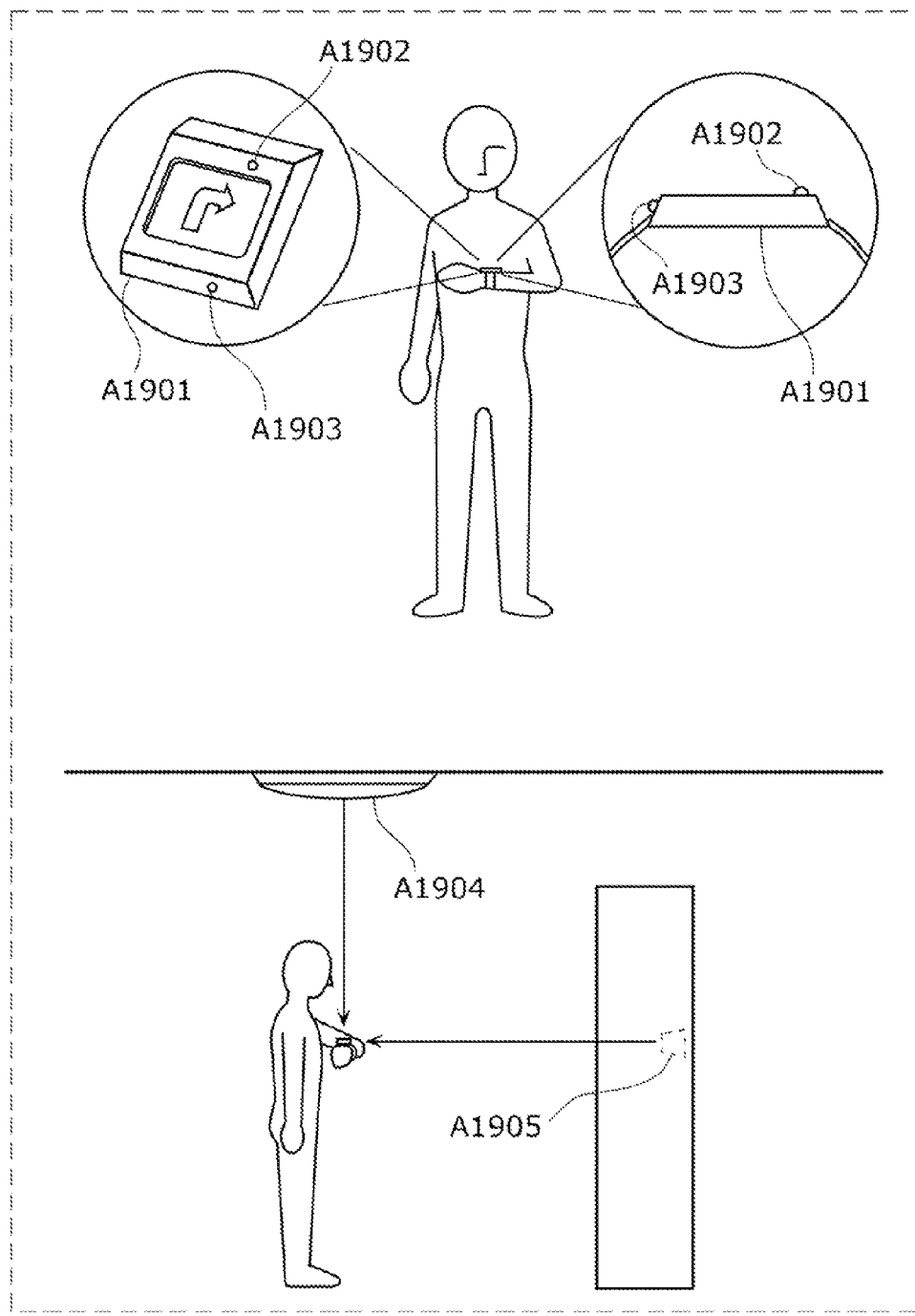
FIG. 9 is a diagram illustrating an example of a situation of using a watch-type device according to Embodiment 1.

FIG. 9 is a diagram illustrating an example of the situation of using a watch-type device according to Embodiment 1.

The watch-type device A1901 illustrated in FIG. 9 includes a light receiving unit A1902 on the front part and a light receiving unit A1903 on the side part. The light receiving unit A1902 corresponds to the above-described front camera A1202 (first image capturing unit), and the light receiving unit A1903 corresponds to the above-described back camera A1203 (second image capturing unit).

The watch-type device A1901 also includes an acceleration sensor.

If, for example, as illustrated in FIG. 9, the front part of the watch-type device A1901 faces a direction parallel to the ground, the watch-type device A1901 operates the light receiving unit A1902 and the light receiving unit A1903. The light receiving unit A1902 receives light emitted from a ceiling light A1904, and the light receiving unit A1903 receives light emitted from a base light A1905.

More specifically, the watch-type device A1901 uses the light receiving unit A1902 to perform visible light communication with the ceiling light A1904 (second device) that is located above the user and emits visible light, so as to obtain position information of the ceiling light A1904 (second device). On the other hand, the watch-type device A1901 uses the light receiving unit A1903 to perform visible light communication with the base light A1905 (first devices) that is located in front of the user and emits visible light, so as to obtain product information of the product rack provided with the base light A1905 (first device). Then, according to the user's selection, the obtained position information is displayed as a current position of the user on the display unit together with map information of an area where the user is present, or the obtained product information is displayed on the display unit.

It is also possible that the watch-type device A1901 may switch between the light receiving unit A1902 and the light receiving unit A1903 at predetermined intervals, and the switched light receiving unit A1902 or the light receiving unit A1903 is used to perform visible light communication.

As described above, the mobile terminal or the watch including the communication device according to the present embodiment is used.

The following describes the structure of the communication device according to the present embodiment.

Figure 10:
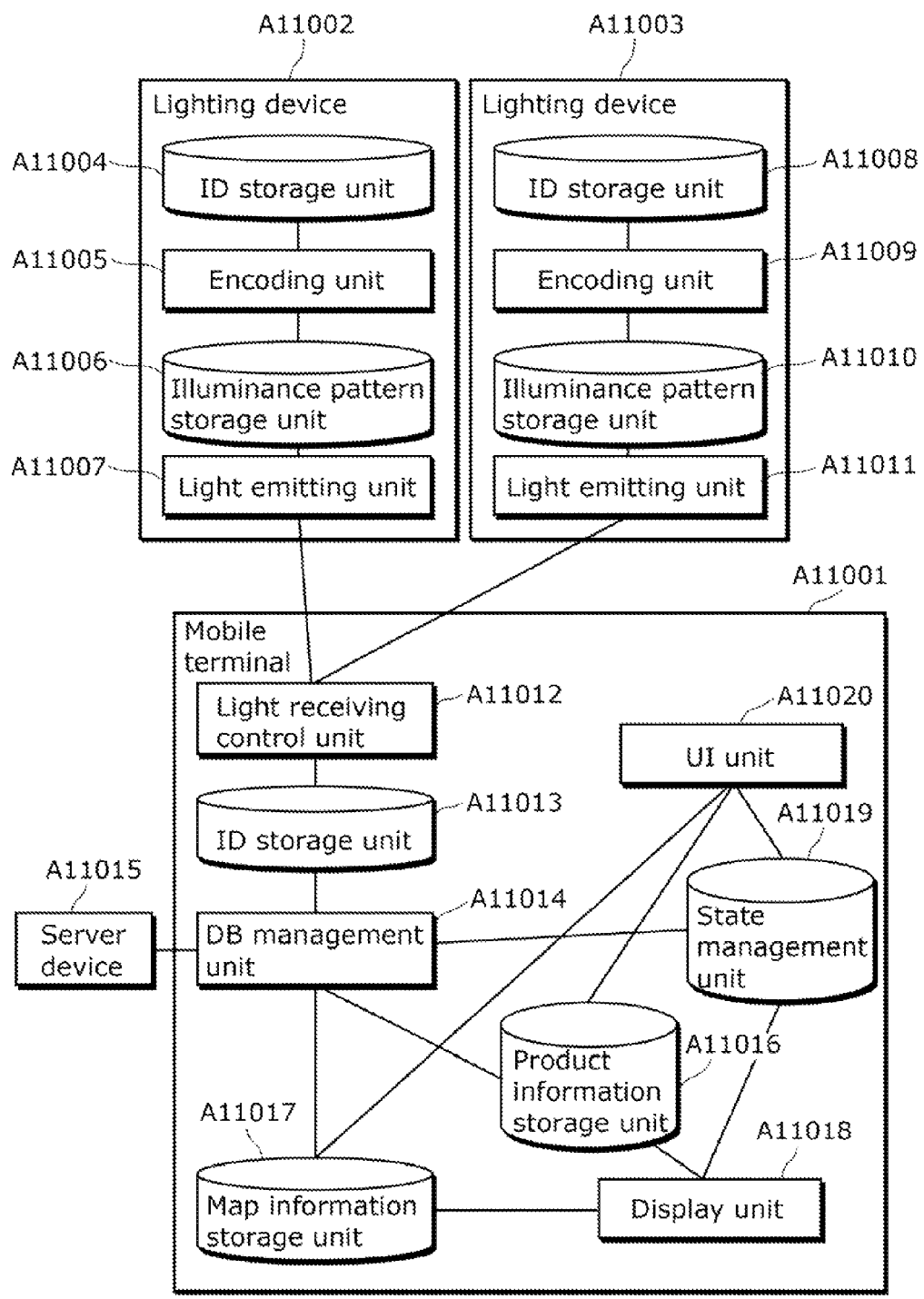
FIG. 10 is a diagram illustrating a whole configuration of a communication system according to Embodiment 1.

FIG. 10 is a diagram illustrating a whole configuration of a communication system according to Embodiment 1.

The communication system according to the present embodiment includes at least a mobile terminal A11001, a lighting device A11002, a lighting device A11003, and a server device A11015.

[Structure of Lighting Device A11002]

The lighting device A11002 includes an ID storage unit A11004, an encoding unit A11005, an illuminance pattern storage unit A11006, and a light emitting unit A11007. The lighting device A11002 corresponds to the second device, such as the ceiling light A1101 illustrated in FIG. 1 or the ceiling light A1904 illustrated in FIG. 9.

The ID storage unit A11004 is a memory region. In the ID storage unit A11004, identifiers each uniquely identifying an individual, such as media access control (MAC) addresses, are previously written.

When the lighting device A11002 is supplied with power, the encoding unit A11005 reads an ID from the ID storage unit A11004, and converts the ID to an illuminance pattern of the lighting, in other words, an illuminance of the lighting at corresponding timing, and stores the illuminance pattern to the illuminance pattern storage unit A11006.

When the above-described start phase is completed, the light emitting unit A11007 controls light emission by updating illuminance at a high speed according to the pattern stored in the illuminance pattern storage unit A11006. The lighting device A11002 thereby performs illuminance control (visible light communication) based on the ID.

[Structure of Lighting Device A11003]

Like the lighting device A11002, the lighting device A11003 includes an ID storage unit A11018, an encoding unit A11009, an illuminance pattern storage unit A11010, and a light emitting unit A11011. The lighting device A11003 corresponds to the first device, such as the base light A1103 illustrated in FIG. 1 and the base light A1905 illustrated in FIG. 9.

The ID storage unit A11008 is a memory region. In the ID storage unit A11008, identifiers each uniquely identifying an individual, such as MAC addresses, are previously written.

When the lighting device A11003 is supplied with power, the encoding unit A11019 reads an ID from the ID storage unit A11008, and converts the ID to an illuminance pattern of the lighting, in other words, an illuminance of the lighting at corresponding timing, and stores the illuminance pattern to the illuminance pattern storage unit A11010.

When the above-described start phase is completed, the light emitting unit A11011 controls light emission by updating illuminance at a high speed according to a pattern stored in the illuminance pattern storage unit A11010. The lighting device A11003 thereby performs illuminance control (visible light communication) based on the ID.

[Structure of Mobile Terminal A11001]

Subsequently, the structure of the mobile terminal A11001 is described.

The mobile terminal A11001 includes a light receiving control unit A11012, an ID storage unit A11013, a DB management unit A11014, a product information storage unit A11016, a map information storage unit A11017, a display unit A11018, a state management unit A11019, and an UI unit A11020. The mobile terminal A11001 corresponds to the mobile terminal A1201 illustrated in FIG. 2 or the watch-type device illustrated in FIG. 9.

[Light Receiving Control Unit A11012]

The light receiving control unit A11012 detects an illuminance pattern of the light emitting unit A11007 and an illuminance pattern of the light emitting unit A11011, then converts the detected patterns to IDs, and stores the IDs to the ID storage unit A11013. In the case of the present embodiment, since an illuminance pattern of the light emitting unit A11007 or the light emitting unit A11011 is detected, the ID stored in the ID storage unit A11013 is identical to either an ID stored in the ID storage unit A11004 or an ID stored in the ID storage unit A11008.

[Product Information Storage Unit A11016]

Next, the product information storage unit A11016 is described.

Figures 12, 13:
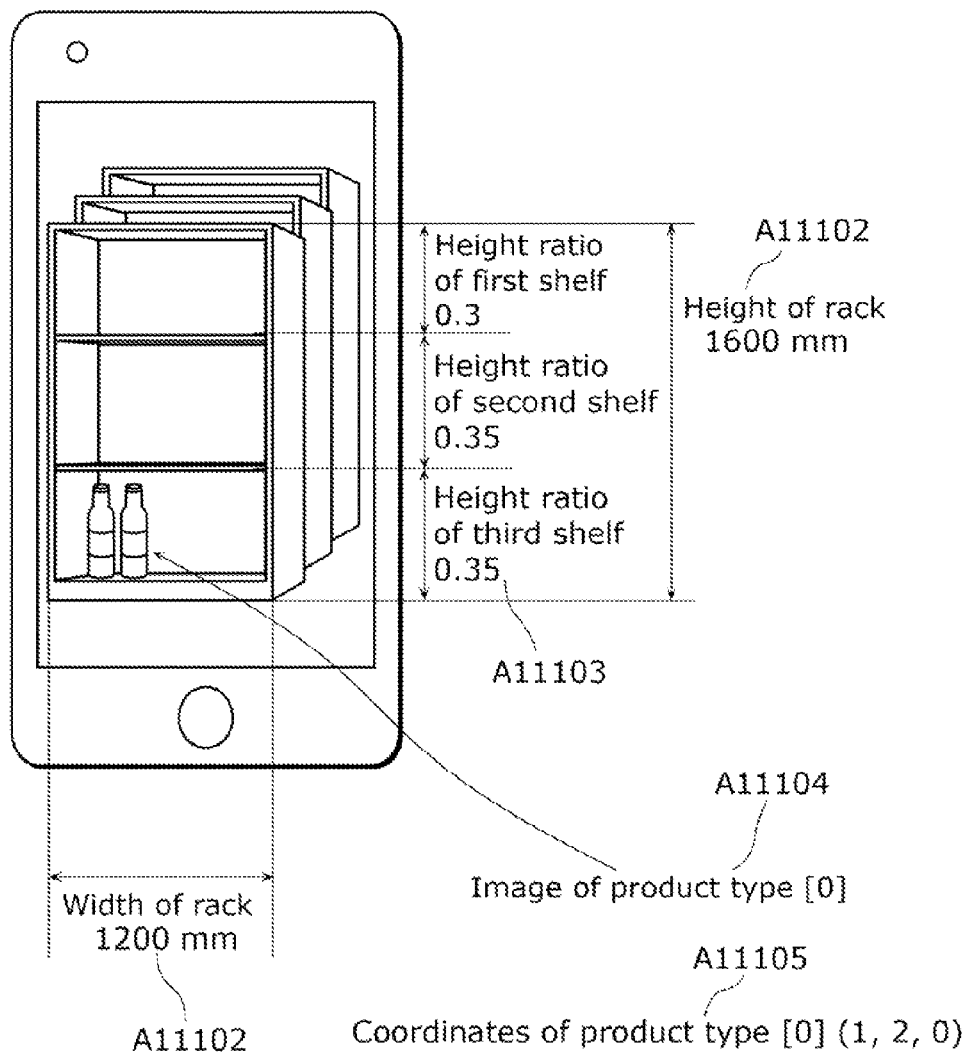
FIG. 12 is a diagram illustrating an example of a layout of the product UI presented by the mobile terminal according to Embodiment 1.
FIG. 13 illustrates an example of a structure of pieces of information stored in a map information storage unit according to Embodiment 1.

FIG. 11 illustrates an example of a structure of pieces of information stored in a product information storage unit according to Embodiment 1. FIG. 12 is a diagram illustrating an example of a layout of the product UI presented by the mobile terminal according to Embodiment 1.

For example, as illustrated in FIG. 11, in the product information storage unit A11016, there are stored a validity flag A11101, rack exterior A11102, rack interior A11103, product type information A11104, product stock information A11105 are stored.

The validity flag A11101 indicates whether or not to render product stock information. The validity flag A11101 has a value indicating TRUE or a value indicating FALSE. If the value is TRUE, the display unit A11018 renders the product stock information.

The rack exterior A11102 indicates an exterior of a rack to be drawn. As the rack exterior A11102, a height and a width of a plain scale of the rack are recorded. Based on the plain scale information, the display unit A11018 performs the rendering to draw the rack within the image. For example, the display unit A11018 renders an outer line of the rack as a layout illustrated in FIG. 12.

The rack interior A11103 indicates the number of shelves in the rack and a height ratio of each of the shelves to the rack. Based on these pieces of information, the display unit A11018 renders the internal boards of the shelves with intervals as illustrated in FIG. 12.

The product type information A11104 stores the number of product variations and pieces of image data of respective products. For example, when the format of the image data received from the server device A11015 is PNG data, the PNG data is directly arranged in the product type image data corresponding to the product type information A11104. Then, the display unit A11018 develops the PNG data to a cache region (not illustrated) immediately prior to the rendering, and renders details of the cache region to present the user with the image of the products.

The product stock information A11105 indicates (a) the number of stocked products, and (b) a type and coordinate information of the stocked products to be rendered. Among pieces of coordinate information in FIG. 11, x-coordinates indicate "where a target product is in a product rack when it is counted from the left", y-coordinate indicates "where a shelf with a target product is in a product rack as being counted from the top", and z-coordinate indicates "where a rack with a target product is among the racks arranged to the depth direction as being counted from the front." The display unit A11018 renders the product image identified by a product type number on the coordinates matching these pieces of coordinate information.

[Map Information Storage Unit A11017]

Next, the map information storage unit A11017 is described.

FIG. 13 illustrates an example of a structure of pieces of information stored in the map information storage unit A11017 according to Embodiment 1.

For example, as illustrated in FIG. 13, the map information storage unit A11017 stores a validity flag A11301, a data length of a map image (map image data length) A11302, and a map image A11303.

The validity flag A11301 indicates whether or not to render the map information. The validity flag A11301 has a value indicating TRUE or a value indicating FALSE. If the value is TRUE, the display unit A11018 renders the map information.

The map image A11303 stores information of image data itself of a map. For example, if a format of image data received from the server device A11015 is PNG data, the map image A11303 stores the PNG data directly.

The map image data length A11302 indicates a data length of the map image A11303. For example, if a format of image data received from the server device A11015 is PNG data, the display unit A11018 develops the PNG data to a cache region (not illustrated) immediately prior to rendering, and renders details of the cache region to present the user with the image of the products.

[State Management Unit A11019]

Next, the state management unit A11019 is described.

Figures 14, 15:
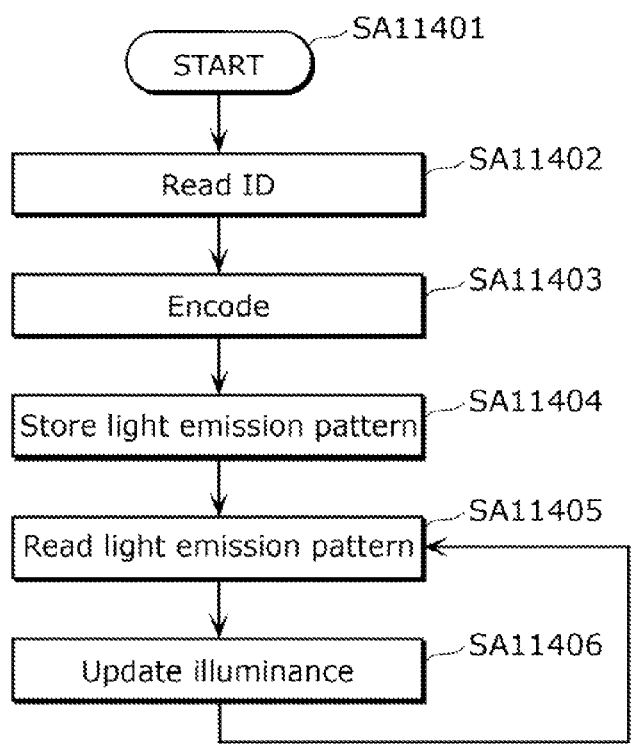
FIG. 14 illustrates an example of a structure of pieces of information managed by a state management unit according to Embodiment 1.
FIG. 15 is a flowchart of processing performed by a lighting device according to Embodiment 1.

FIG. 14 illustrates an example of a structure of pieces of information managed by the state management unit according to Embodiment 1.

As illustrated in FIG. 14, the state management unit A11019 includes an error flag A11601, a previous frame drawing type A11602, a display rack depth A11603, a map offset X A11604, a map offset Y A11605, a previously-obtained ID A11606.

An initial value of the previously-obtained ID A11606 is an invalid value. According to the present embodiment, it is assumed that the invalid value=−1.

The error flag A11601 has a value indicating TRUE or a value indicating FALSE. The state management unit A11019 sets the error flag A11601 to TRUE, if, for example, an ID transmitted to the server device A11015 is an invalid ID that is not related to any of the lighting devices (lighting device A11002, lighting device A11003). Furthermore, for example, if the error flag A11601 is TRUE, the display unit A11018 notifies the user that receiving is failed.

Values of the display rack depth A11603, the map offset X A11604, and the map offset Y A11605 are updated by the UI unit A11020, when the user operates the touch panel unit A1204.

[DB Management Unit A11014]

Next, the DB management unit A11014 is described.

The DB management unit A11014 reads an ID from the ID storage unit A11013, and then inquires the server device A11015 whether or not the readout ID matches the recorded ID.

If it is determined that the readout ID matches, for example, the ID of the ceiling light on the ceiling, the DB management unit A11014 requests the server device A11015 to transmit the map information as illustrated in FIG. 5, namely, map image showing the ceiling light and its periphery. As a result of the request, the DB management unit A11014 obtains the map image (map information) as illustrated in FIG. 5 and stores it to the map information storage unit A11017. Then, the DB management unit A11014 sets the validity flag A11301 of the map information storage unit A11017 to TRUE, sets the validity flag of the product information storage unit A11016 to FALSE, and sets the error flag A11601 to FALSE.

On the other hand, if it is determined that the readout ID is, for example, an ID of any of the base lights provided on product racks, the DB management unit A11014 requests the server device A11015 to transmit the product information illustrated in FIG. 11. As a result of the request, the DB management unit A11014 stores the obtained product information to the product information storage unit A11016. Then, the DB management unit A11014 sets the validity flag A11301 of the map information storage unit A11017 to FALSE, sets the validity flag of the product information storage unit A11016 to TRUE, and sets the error flag A11601 to FALSE.

It should be noted that, if the ID transmitted to the server device A11015 is an invalid ID that is not related to any of the ceiling light and the base lights, the DB management unit A11014 sets the validity flag A11301 of the map information storage unit A11017 to FALSE, sets the validity flag of the product information storage unit A11016 to FALSE, and sets the error flag A11601 to TRUE.

[UI Unit A11020]

Subsequently, the UI unit A11020 is described.

The UI unit A11020 is cooperated with the touch panel unit A1204.

If, for example, the validity flag A11101 of the product information storage unit A11016 is TRUE and the user flicks on the touch panel unit A1204, the UI unit A11020 updates the values of the map offset X A11604 and the map offset Y A11605. For example, if the user flicks to the right on the touch panel unit A1204, the UI unit A11020 increases the value of the map offset X A11604 by an amount of the flicking. If the user flicks to the left on the touch panel unit A1204, the UI unit A11020 decreases the value of the map offset X A11604 by an amount of the flicking. Furthermore, for example, if the user flicks upwards on the touch panel unit A1204, the UI unit A11020 decreases the value of the map offset Y A11605. If the user flicks downwards on the touch panel unit A1204, the UI unit A11020 increases the value of the map offset Y A11605.

On the other hand, for example, if the validity flag A11301 of the map information storage unit A11017 is TRUE, the UI unit A11020 updates the value of the display rack depth A11603. For example, if the user flicks to the right on the touch panel unit A1204, the UI unit A11020 increases the value of the display rack depth A11603. If the user flicks to the left on the touch panel unit A1204, the UI unit A11020 decreases the value of the display rack depth A11603.

When the value of the display rack depth A11603 exceeds a maximum value of z coordinates of a product of the product stock information A11105, the UI unit A11020 resets the value of the display rack depth A11603 to zero. When the value of the display rack depth A11603 becomes smaller than zero, the UI unit A11020 sets the value of the display rack depth A11650 to the maximum value of the z coordinates of the product of the product stock information A11105.

[Display Unit A11018]

The display unit A11018 renders the above-described map information or product information to be displayed. In addition, the display unit A11018 updates displayed details according to the above-described processing.

When processing for updating the displayed details (updating) is to be performed, the display unit A11018 first performs preparation for display updating which is described below.

If the validity flag A11101 of the product information storage unit A11016 is TRUE and the previous frame drawing type A11602 is not product information, the display unit A11018 determines that the state of the rack to be displayed is to be initialized, and therefore resets the value of the display rack depth A11603 to zero.

In other words, if, after displaying product information on the display unit A11018 of the mobile terminal A11001, a newly switched first image capturing unit (for example, front camera A1202) is used to obtain position information as a current position of the user, an offset assigned to the product information is initialized.

Likewise, if the validity flag A11301 of the map information storage unit A11017 is TRUE and the previous frame drawing type A11602 is not map information, the display unit A11018 determines that the state of the map to be displayed is to be initialized, and therefore resets the values of the map offset X A11604 and the map offset Y A11605 to zero. In other words, if, after displaying map information on the display unit A11018 of the mobile terminal A11001, a newly switched second image capturing unit (for example, back camera A1203) is used to obtain product information of a product rack provided with the first device (lighting device A11003), an offset assigned to the map information is initialized.

It is also possible that, if the previously-obtained ID in the state management unit A11019 and the ID in the ID storage unit A11013 have different values, the display unit A11018 determines that the display state is to be initialized, and therefore resets the values of the map offset X A11604, the map offset Y A11605, and the display rack depth A11603 to zero. In this case, data of the ID storage unit A11013 is copied to the previously-obtained ID in the state management unit A11019.

Furthermore, for the preparation for display updating, in the state management unit A11019, if the validity flag A11101 of the product information storage unit A11016 is TRUE, the previous frame drawing type A11602 is set to "product information", and if the validity flag A11301 of the map information storage unit A11017 is TRUE, the previous frame drawing type A11602 is set to "map information". If the error flag A11601 is TRUE, the previous frame drawing type A11602 is set to "error".

It is assumed that the above-described preparation for display updating is completed and therefore either the validity flag A11301 of the map information storage unit A11017 and the validity flag of the product information storage unit A11016 is TRUE.

In this case, if the validity flag A11301 of the map information storage unit A11017 is TRUE, the display unit A11018 performs rendering to display the map information as illustrated in FIG. 5. Furthermore, if the validity flag of the product information storage unit A11016 is TRUE, the display unit A11018 performs rendering to display a product stock state as illustrated in FIG. 12. On the other hand, if the error flag A11601 is TRUE, the display unit A11018 updates displayed details to notify that an unauthorized ID is received.

[Processing Flow of Communication System]

Sequentially, the processing flow of the communication system according to the present embodiment is described.

[Processing Flow of Lighting Device]

FIG. 15 is a flowchart of processing performed by the lighting device according to Embodiment 1.

The following describes the processing flow of the lighting device A11002 with reference to FIG. 15.

First, the lighting device A11002 is supplied with power, and thereby the processing flow starts (SA11401).

Next, the encoding unit A11005 reads an ID from the ID storage unit A11004 (SA11402).

Next, the encoding unit A11005 performs encoding to convert the ID to an illuminance pattern of lighting, namely, an illuminance of lighting at each timing (SA11403).

Next, the encoding unit A11005 stores the illuminance pattern to the first illuminance pattern storage unit A11006 (SA11404).

Next, because the above start phase is completed, the light emitting unit A11007 reads the illuminance pattern from the illuminance pattern storage unit A11006 (SA11405), and controls light emission by updating illuminance at a high speed according to the pattern indicated by the illuminance pattern (SA11406).

By the above processing flow, the lighting device A11002 performs illuminance control (visible light communication) based on the ID.

Next, the lighting device A11003 is also described.

First, the lighting device A11003 is supplied with power, and thereby a processing flow starts (SA11401). The encoding unit A11009 reads an ID from the ID storage unit A11008 (SA11402), performs encoding to convert the ID to an illuminance pattern of lighting, namely, an illuminance of lighting at each timing (SA11403), and stores the illuminance pattern to the illuminance pattern storage unit A11010 (SA11404).

When the above start phase is completed, the light emitting unit A11011 reads the illuminance pattern from the illuminance pattern storage unit A11010 (SA11405), and controls light emission by updating illuminance at a high speed according to the pattern indicated by the illuminance pattern (SA11406).

By the above processing flow, the lighting device A11003 performs illuminance control based on the ID.

[Processing Flow of Mobile Terminal A11001]

Subsequently, the flow of the mobile terminal A11001 is described with reference to FIG. 16.

Figure 16:
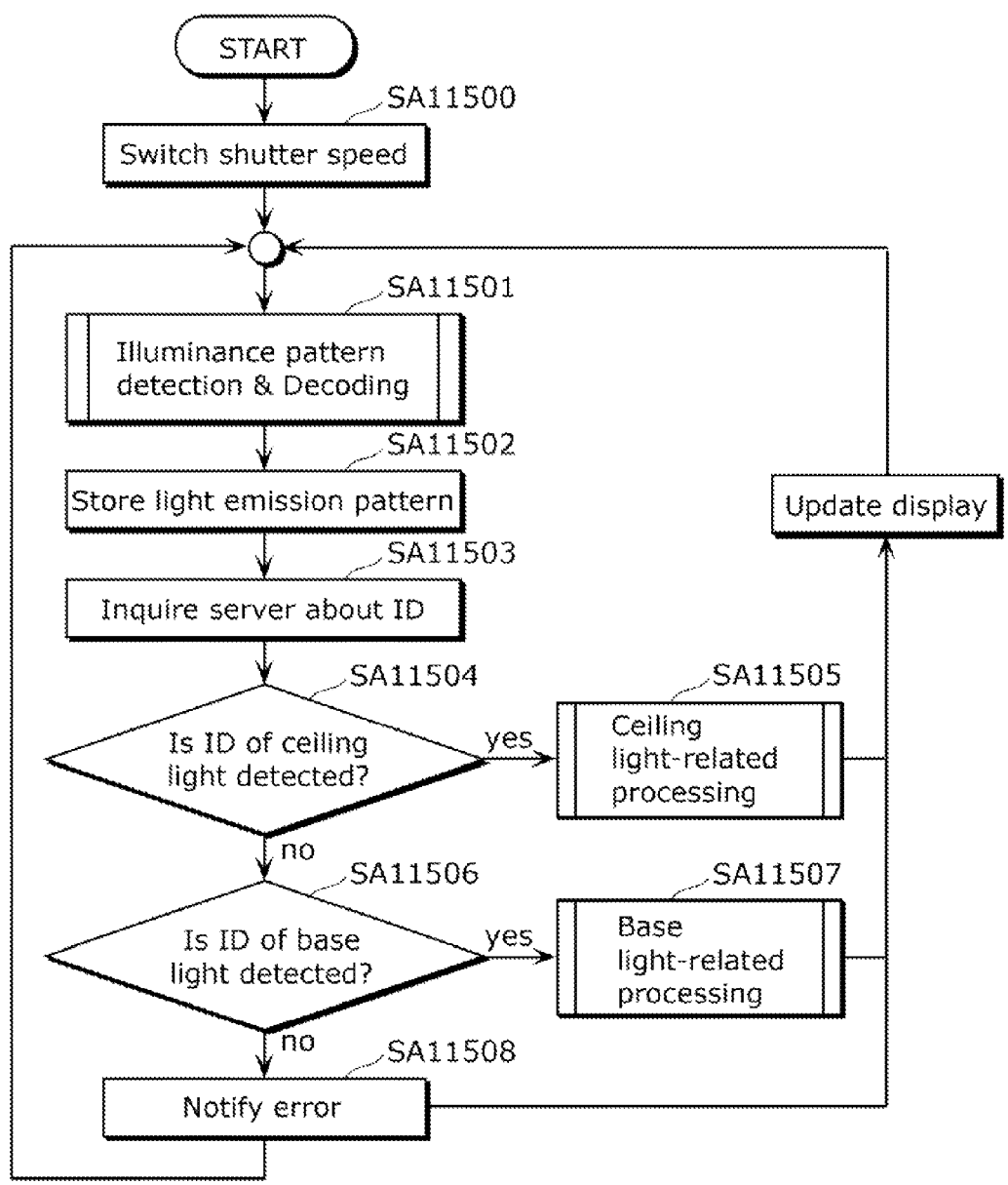
FIG. 16 is a flowchart of processing performed by the mobile terminal according to Embodiment 1.

FIG. 16 is a flowchart of processing performed by the mobile terminal according to Embodiment 1.

First, the light receiving control unit A11012 switches a shutter speed to be high (SA11500).

Next, the light receiving control unit A11012 detects an illuminance pattern of the light emitting unit A11007 or the light emitting unit A11011, then decodes the detected illuminance pattern to convert the pattern to an ID (SA11501), and stores the ID to the ID storage unit A11013 (SA11502).

Next, the DB management unit A11014 reads the ID from the ID storage unit A11013 and makes inquiry to the server device A11015 (SA11503), and determines whether or not the readout ID matches the recorded ID (SA11504, SA11506).

If it is determined at SA11504 that the readout ID matches an ID of any of ceiling lights on the ceiling (Yes at SA11504), then the DB management unit A11014 performs processing related to ceiling light (SA11505).

On the other hand, if it is determined at SA11506 that the ID matches an ID of any of the base lights provided on product racks (Yes at SA11506), the DB management unit A11014 performs processing related to base light (SA11507).

It should be noted that, if the ID transmitted to the server device A11015 is an invalid ID that is not related to any of the ceiling light and the base lights, the DB management unit A11014 sets the validity flag A11301 of the map information storage unit A11017 to FALSE, sets the validity flag of the product information storage unit A11016 to FALSE, and sets the error flag A11601 to TRUE. The display unit A11018 displays an error notification indicating that there is no information related to lighting device (SA11508). In other words, the mobile terminal A11001 inquires the server device A11015 about an identifier uniquely assigned to the lighting device which is obtained by the visible light communication with the lighting device emitting visible light, thereby obtaining information of the lighting device which is associated with the identifier. However, if the mobile terminal A11001 makes inquiry to the server device A11015 but there is no information associated with the identifier, the mobile terminal A11001 displays, on the display unit A11018, an error notification indicating that there is no information related to the lighting device.

[Flow of Processing Related to Ceiling Light]

Next, the ceiling light-related processing (SA11505) is described.

Figure 17:
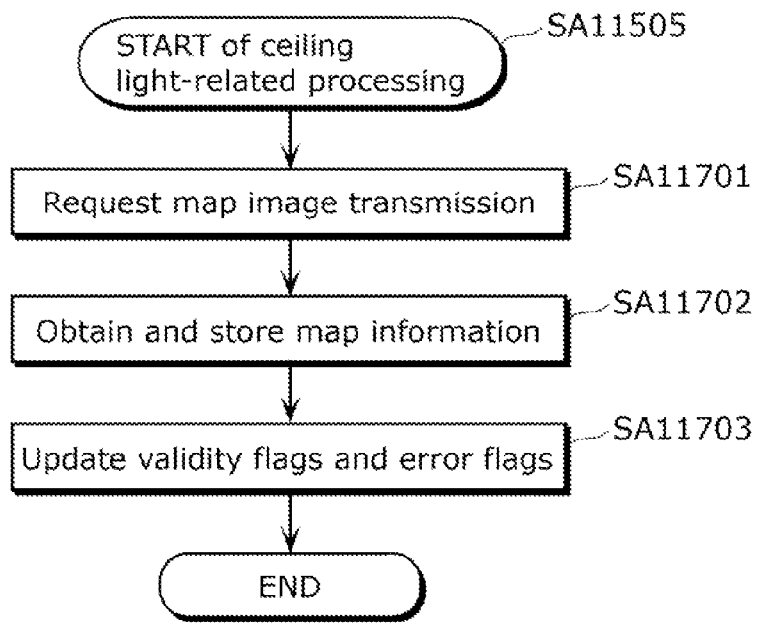
FIG. 17 is a flowchart of ceiling light-related processing according to Embodiment 1.

FIG. 17 is a flowchart of processing related to the ceiling light according to Embodiment 1.

First, as illustrated in FIG. 5, the DB management unit A11014 transmits, to the server device A11015, a request for transmission of a map image showing a target ceiling light and its periphery (SA11701).

Next, the DB management unit A11014 obtains the map image illustrated in FIG. 5 and stores it to the map information storage unit A11017 (SA11702).

Then, the DB management unit A11014 sets the validity flag A11301 of the map information storage unit A11017 to TRUE, and sets the validity flag of the product information storage unit A11016 to FALSE (SA11703).

[Flow of Processing Related to Base Light]

Next, the base light-related processing (SA11507) is described.

Figure 18:
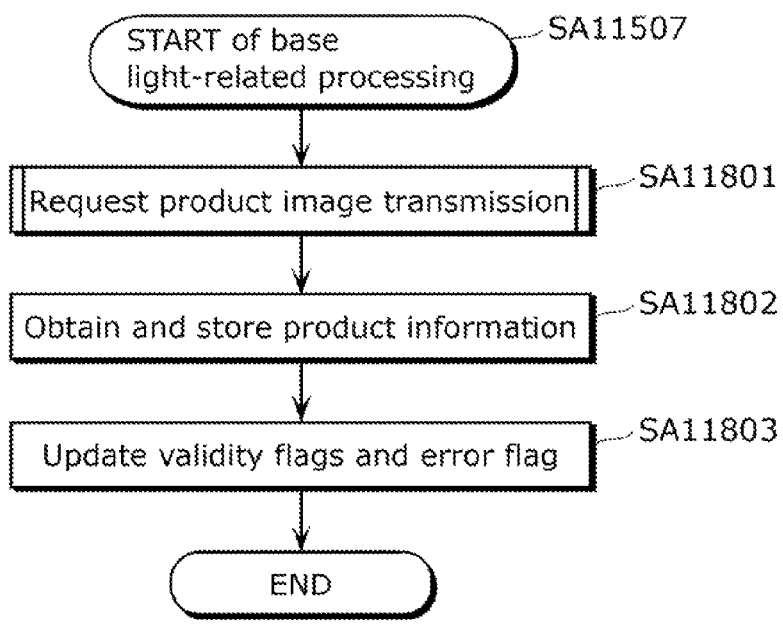
FIG. 18 is a flowchart of base light-related processing according to Embodiment 1.

FIG. 18 is a flowchart of processing related to the base light according to Embodiment 1.

First, the DB management unit A11014 requests the server device A11015 for the product information illustrated in FIG. 11 (SA11801).

Next, the DB management unit A11014 stores the obtained product information to the product information storage unit A11016 (SA11802).

Then, the DB management unit A11014 sets the validity flag A11301 of the map information storage unit A11017 to FALSE, and sets the validity flag of the product information storage unit A11016 to TRUE (SA11803).

[Processing Flow of UI Unit A11020]

Subsequently, the UI unit A11020 is described with reference to FIG. 19.

Figure 19:
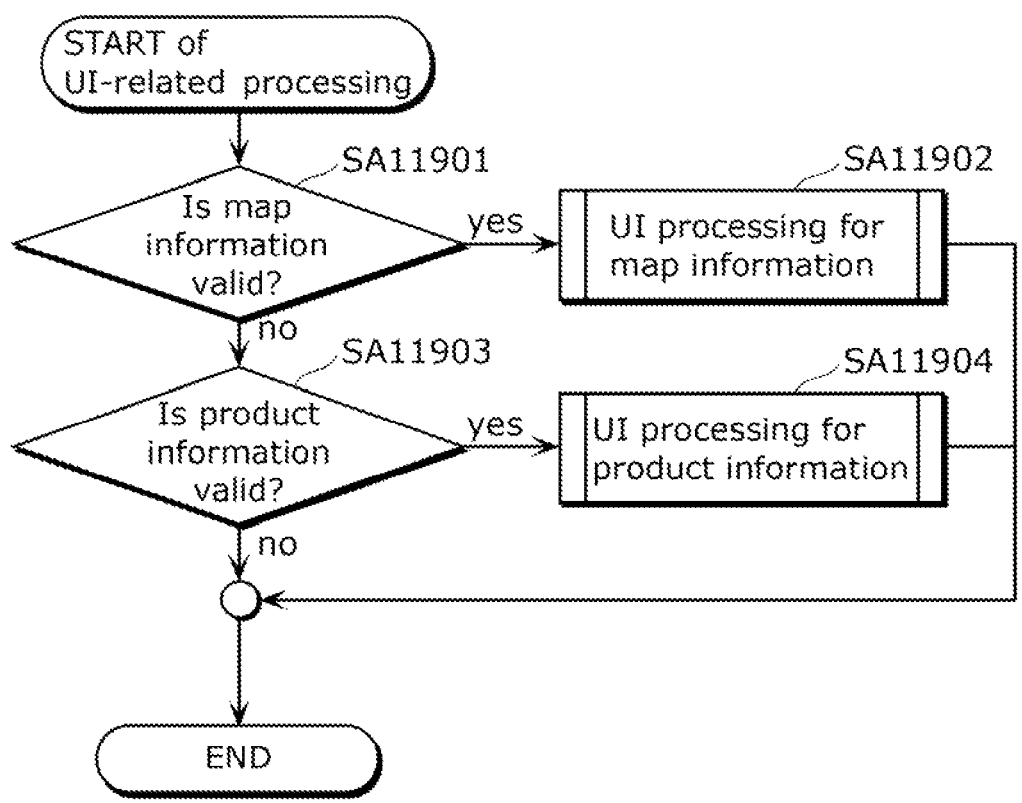
FIG. 19 is a flowchart of UI-related processing according to Embodiment 1.

FIG. 19 is a flowchart of processing related to UI according to Embodiment 1.

The UI unit A11020 is cooperated with the touch panel unit A1204, as described previously.

If, at SA119001, the validity flag A11301 of the map information storage unit A11017 is TRUE (yes at S11901), the UI unit A11020 performs UI processing for map information (S11902).

On the other hand, if at SA119003, the validity flag A11101 of the product information storage unit A11016 is TRUE (yes at S11903), then the UI unit A11020 performs UI processing for product information (S11904).

[Flow of UI Processing for Map Information]

Subsequently, the UI processing for map information (S11802) is described.

Figure 20:
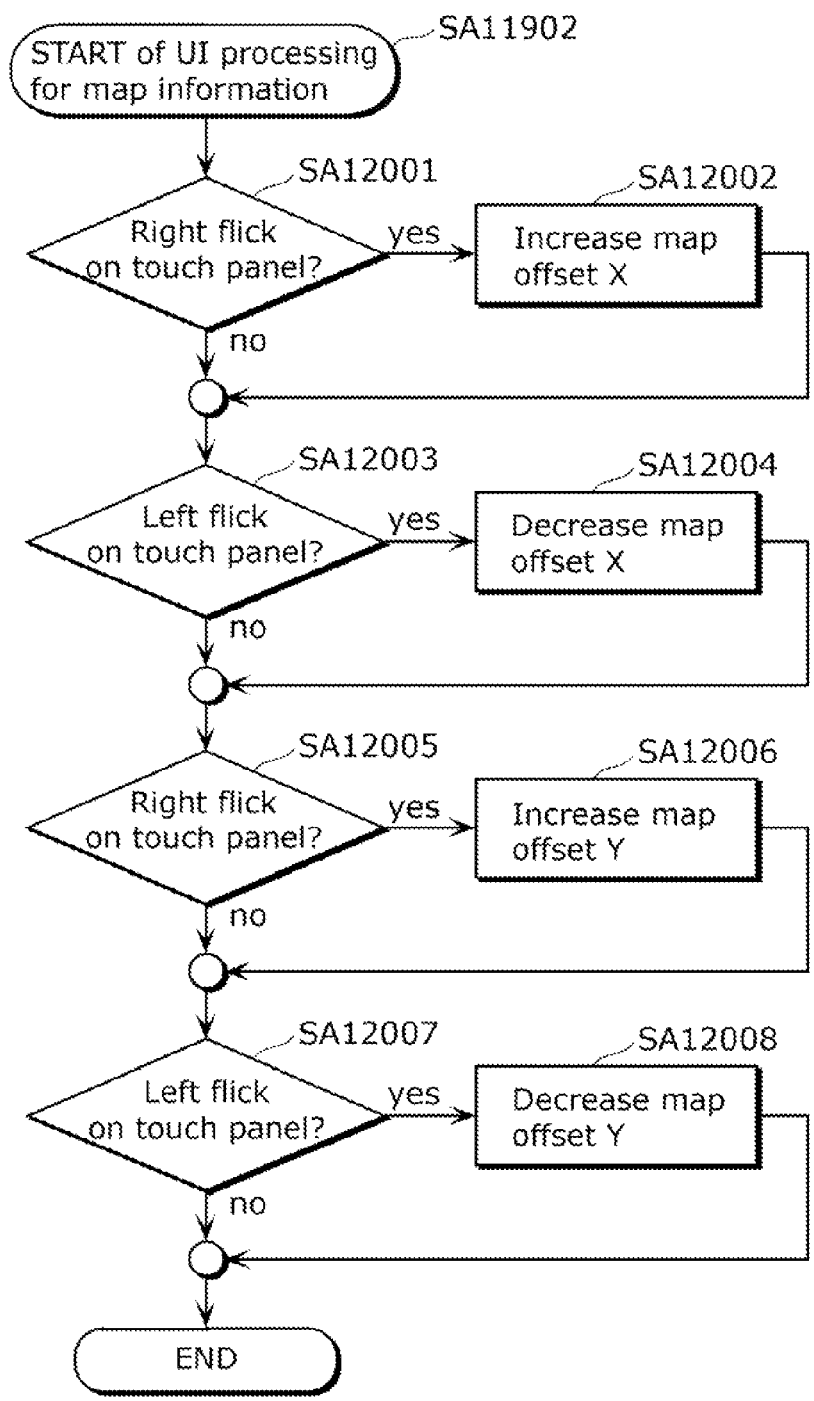
FIG. 20 is a flowchart of UI processing for map information according to Embodiment 1.

FIG. 20 is a flowchart of UI processing for map information according to Embodiment 1.

First, when the UI processing for map information starts (SA11902), the UI unit A11020 determines whether or not the user flicks to the right on the touch panel unit A1204 (SA12001).

At SA12001, if the user flicks to the right on the touch panel unit A1204 (yes at SA12001), the UI unit A11020 increases the value of the map offset X A11604 by an amount of the flicking (SA12002).

At SA12003, if the user flicks to the left on the touch panel unit A1204 (yes at SA12003), the UI unit A11020 decreases the value of the map offset X A11604 (SA12004).

At SA12005, if the user flicks upwards on the touch panel unit A1204 (yes at SA12005), the UI unit A11020 decreases the value of the map offset Y A11605 (SA12006).

At SA12007, if the user flicks downwards on the touch panel unit A1204 (yes at SA12007), the UI unit A11020 increases the value of the map offset Y A11605 (SA12008).

As described above, when the user flicks on the touch panel unit A1204, the UI unit A11020 updates the values of the map offset X A11604 and the map offset Y A11605.

[Flow of UI Processing for Product Information]

Subsequently, the UI processing for product information (S11804) is described.

Figure 21:
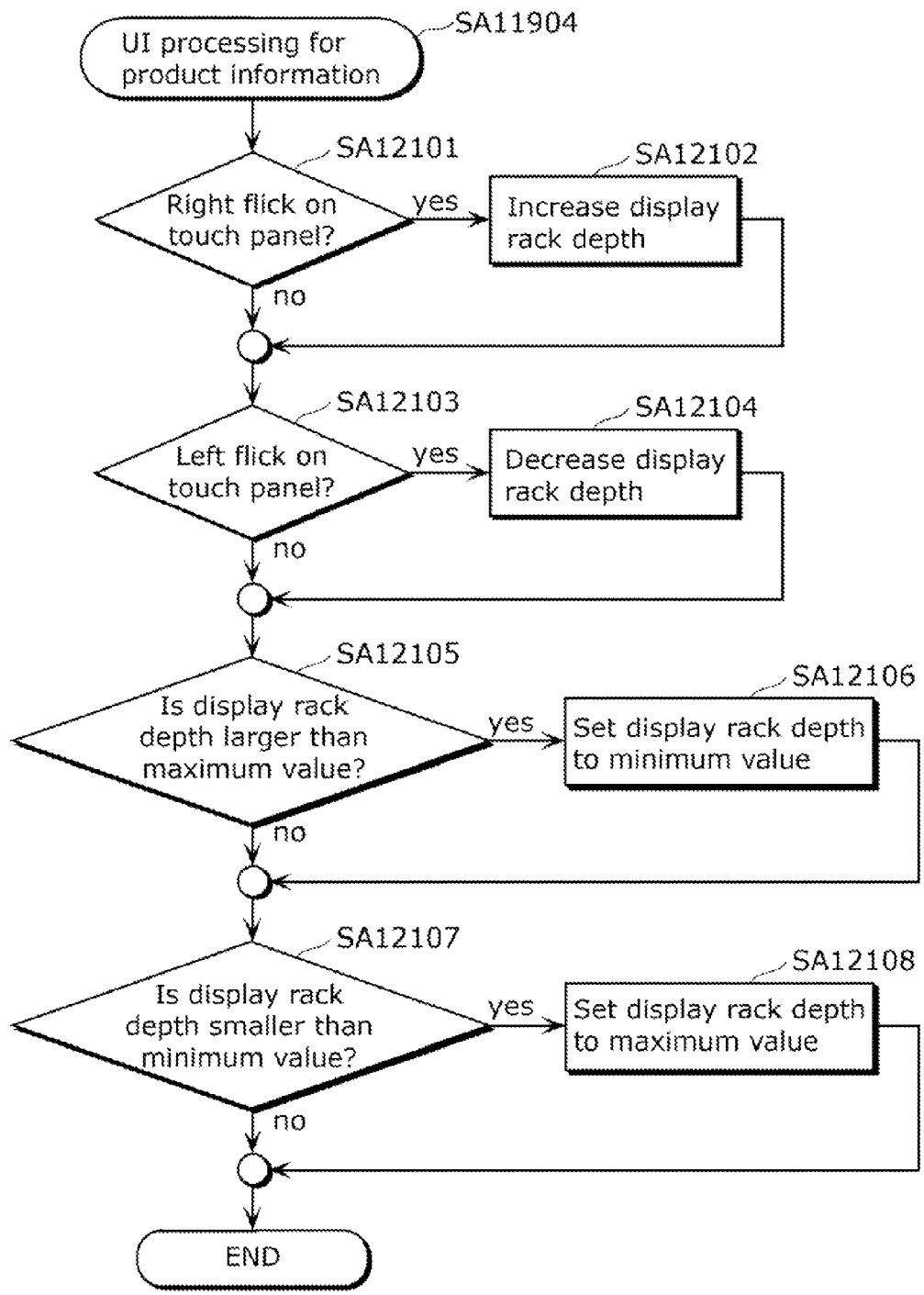
FIG. 21 is a flowchart of UI processing for product information according to Embodiment 1.

FIG. 21 is a flowchart of UI processing for product information according to Embodiment 1.

First, when the UI processing for product information starts (SA11904), the UI unit A11020 determines whether or not the user flicks to the right on the touch panel unit A1204 (SA12101).

At SA12101, if the user flicks to the right on the touch panel unit A1204 (yes at SA12101), the UI unit A11020 increases the value of the display rack depth A11603 (SA12102).

At SA12103, if the user flicks to the left on the touch panel unit A1204 (yes at SA12103), the UI unit A11020 decreases the value of the display rack depth A11603 (SA12104).

At SA12105, when the value of the display rack depth A11603 exceeds a maximum value of z coordinates of a product of the product stock information A11105, the UI unit A11020 resets the value of the display rack depth A11603 to zero (SA12106).

On the other hand, at SA12107, when the value of the display rack depth A11603 becomes smaller than zero (yes at SA12107), the UI unit A11020 sets the value of the display rack depth A11603 to the maximum value of the z coordinates of the product of the product stock information A11105 (SA12108).

As described above, the UI unit A11020 updates the display rack depth A11603.

[Processing Flow of Display Unit A11018]

Subsequently, the processing flow of the display unit A11018 is described.

Figure 22:
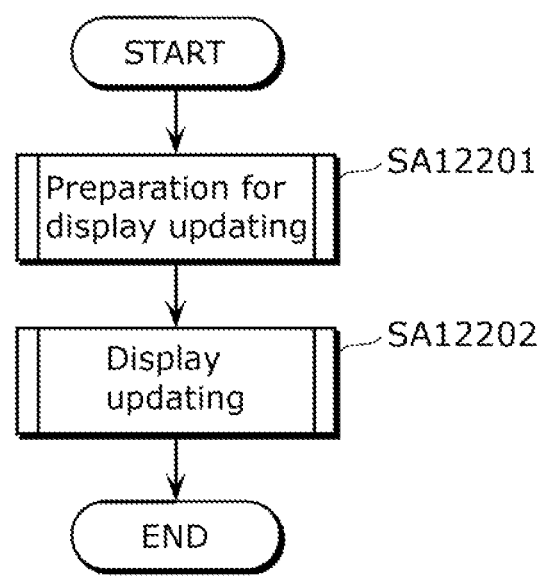
FIG. 22 is a flowchart of entire display processing according to Embodiment 1.
Figure 23:
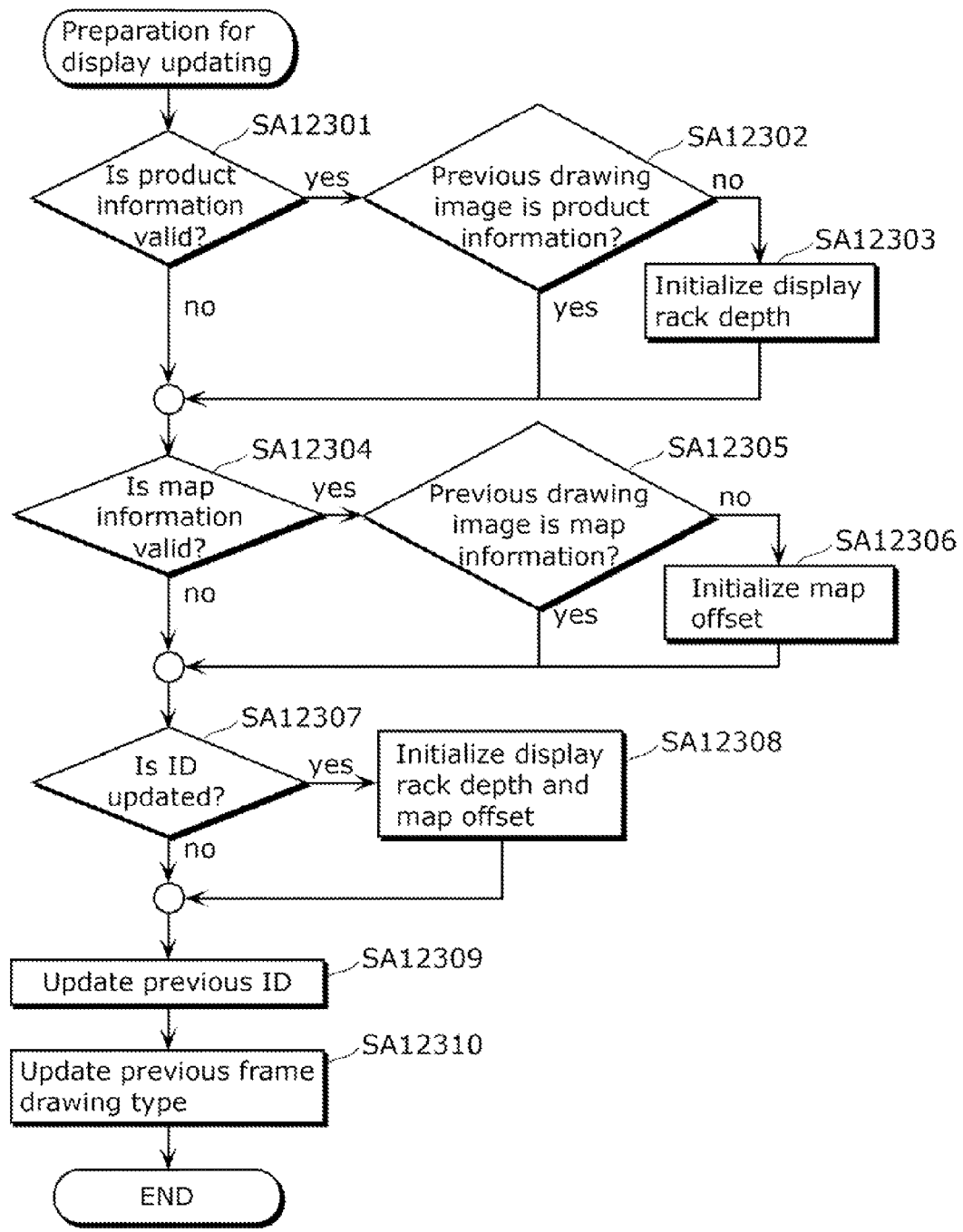
FIG. 23 is a flowchart of preparation for display updating according to Embodiment 1.
Figure 24:
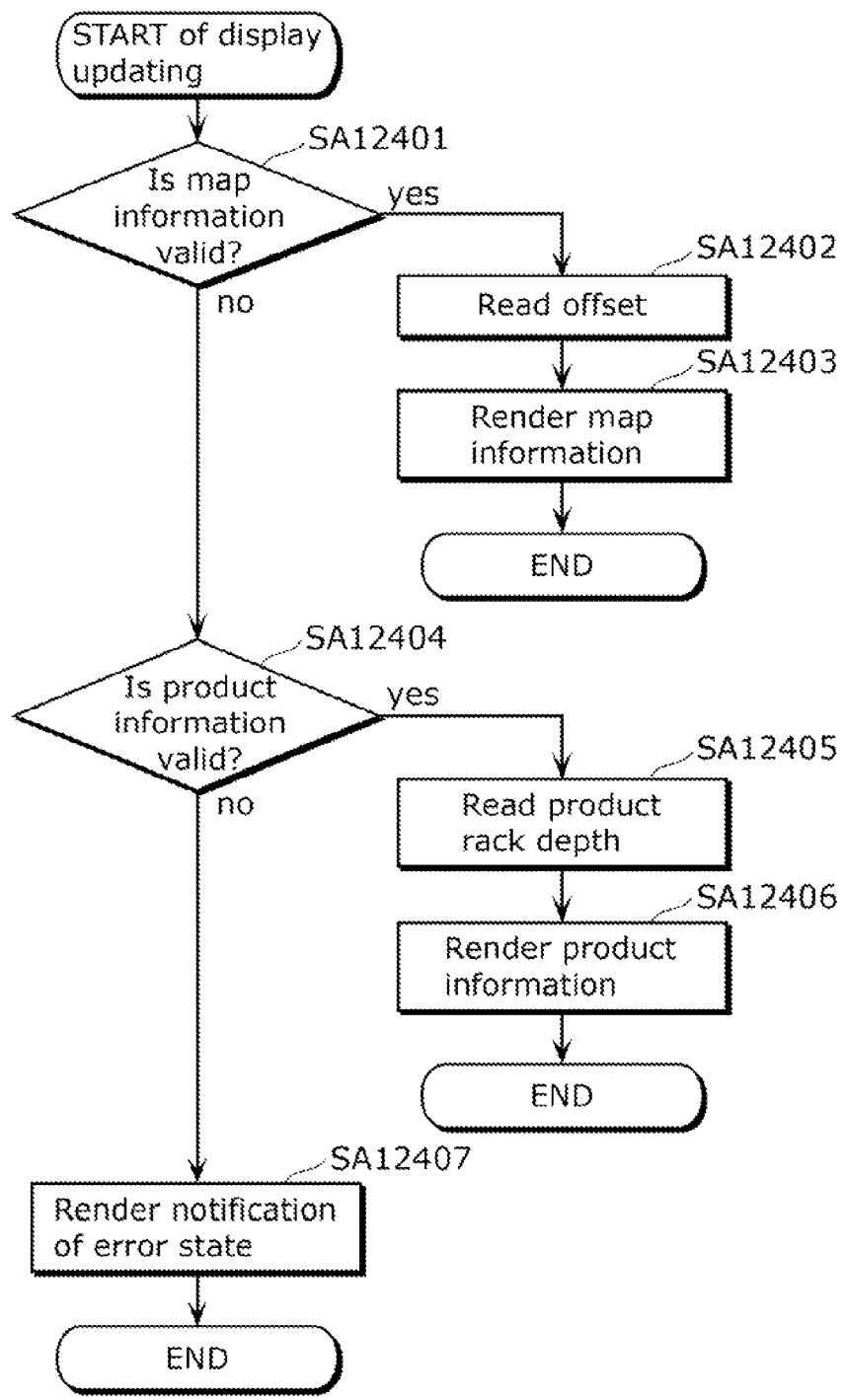
FIG. 24 is a flowchart of display updating according to Embodiment 1.

FIG. 22 is a flowchart of entire display processing according to Embodiment 1. FIG. 23 is a flowchart of preparation for display updating according to Embodiment 1. FIG. 24 is a flowchart of the display updating according to Embodiment 1.

As illustrated in FIG. 22, when display starts, the display unit A11018 performs preparation for display updating before performing the display updating (SA12201). Then, the display unit A11018 performs the display updating after performing the preparation (SA12202).

Here, the preparation for display updating (SA12201) is described in more detail with reference to FIG. 23.

When the preparation for display updating starts, the display unit A11018 confirms whether or not product information is valid as seen in FIG. 23 (SA12301).

If the validity flag A11101 of the product information storage unit A11016 is TRUE (yes at SA12301) and the previous frame drawing type A11602 is not product information (no at SA12302), the display unit A11018 determines that the state of the rack to be displayed is to be initialized and therefore resets the value of the display rack depth A11603 to zero (SA12303).

Next, at SA12304, the display unit A11018 confirms whether or not map information is valid (SA12304).

If the validity flag A11301 of the map information storage unit A11017 is TRUE (yes at SA12304) and the previous frame drawing type A11602 is not map information (no at SA12305), the display unit A11018 determines that the state of the map to be displayed is to be initialized, and therefore resets the values of the map offset X A11604 and the map offset Y A11605 to zero (SA12306).

Next, at SA12307, the display unit A11018 confirms whether or not an ID is updated (SA12307).

If the previously-obtained ID in the state management unit A11019 and the ID in the ID storage unit A11013 have different values (yes at SA12307), the display unit A11018 determines that the display state is to be initialized, and therefore resets the values of the map offset X A11604, the map offset Y A11605, and the display rack depth A11603 to zero (SA12308).

Next, at SA12309, the display unit A11018 copies data of the ID storage unit A11013 to the previously-obtained ID of the state management unit A11019, thereby updating the previous ID (SA12309).

Next, the display unit A11018 updates the previous frame drawing type (SA12310). More specifically, if the validity flag A11101 of the product information storage unit A11016 is TRUE, the display unit A11018 sets the previous frame drawing type A11602 to "product information". If the validity flag A11301 of the map information storage unit A11017 is TRUE, the display unit A11018 sets the previous frame drawing type A11602 to "map information". If the error flag A11601 is TRUE, the display unit A11018 sets the previous frame drawing type A11602 to "error".

Subsequently, the display updating (SA12202) is described with reference to FIG. 24.

When the display updating starts, the display unit A11018 confirms whether or not the map information is valid as illustrated in FIG. 24 (SA12301).

If the validity flag A11301 of the map information storage unit A11017 is TRUE (yes at SA12401), the display unit A11018 reads the value of the map offset X A11604 and the value of the map offset Y A11606 (SA12402), and renders the map information as illustrated in FIG. 5 by shifting it by the values of the offsets (SA12403).

At S12401, if the validity flag of the map information is invalid, the display unit A11018 confirms whether or not the product information is valid (SA12304).

If the validity flag of the product information storage unit A11016 is TRUE (yes at SA12404), the display unit A11018 reads the value of the display rack depth A11603 (SA12404), and renders the product stock state as illustrated in FIG. 12 to present the image of the rack indicated by the display rack depth A11603 (SA12406).

At S12404, if the validity flag of the product information is invalid (no at SA12404) and the error flag A11601 is TRUE, then the display unit A11018 updates the displayed details to notify that an unauthorized ID is received (SA12407).

Embodiment 2

In Embodiment 2, a structure and a flow of a light receiving control unit A11012 are described in detail. The other structure is the same as described in Embodiment 1 and therefore not described again below.

[Detailed Structure of Light Receiving Control Unit A11012]

First, the detailed structure of the light receiving control unit A11012 according to Embodiment 2 is described.

Figure 25:
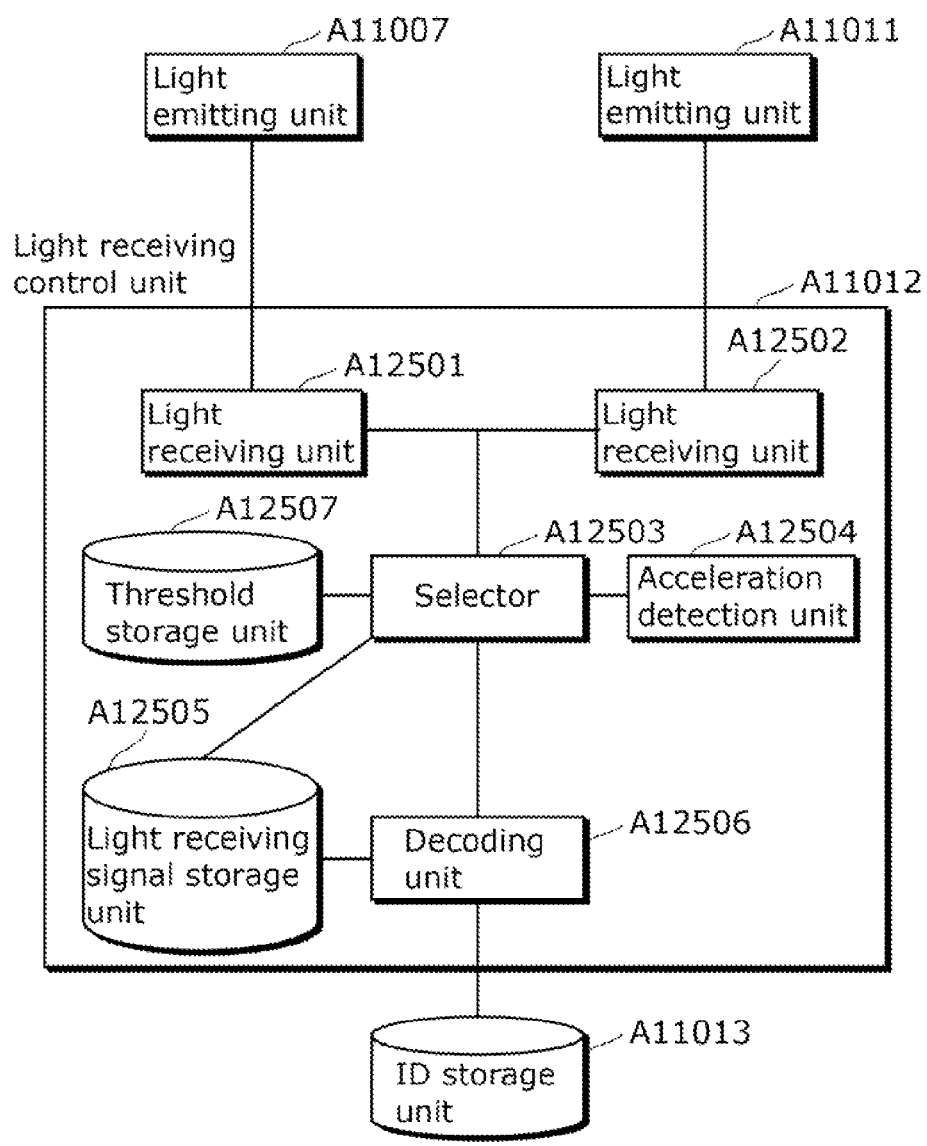
FIG. 25 is a diagram illustrating a detailed structure of a light receiving control unit according to Embodiment 2.

FIG. 25 is a diagram illustrating the detailed structure of the light receiving control unit according to Embodiment 2.

As illustrated in FIG. 25, the light receiving control unit A11012 according to Embodiment 2 includes a light receiving unit A12501, a light receiving unit A12502, a selector A12503, an acceleration detection unit A12504, a light receiving signal storage unit A12505, a decoding unit A12506, and a threshold storage unit A12507.

The light receiving unit A12501 corresponds to, for example, the front camera A1202 (first image capturing unit) according to Embodiment 1, and the light receiving unit A12502 corresponds to, for example, the back camera A1203 (second image capturing unit) according to Embodiment 1.

The selector A12503 selects one of the two light receiving units to be operated.

The acceleration detection unit A12504 detects an acceleration of the mobile terminal A11011 to provide the selector A12503 with information necessary in the selection.

The light receiving signal storage unit A12505 stores light receiving signal obtained from the light receiving unit A12501 or the light receiving unit A12502 via the selector A12503.

The decoding unit A12506 reads the light receiving signal from the light receiving signal storage unit A12505, then decodes the light receiving signal to an ID and stores the resulting ID to the ID storage unit A11013.

The threshold storage unit A12507 previously holds a first threshold and a second threshold. These thresholds are used in a determination as to, based on an acceleration detected by the selector A12503, whether or not the mobile terminal A11011 including the light receiving control unit A11012 is parallel to the ground.

[Processing of Light Receiving Control Unit]

Subsequently, the processing flow of the light receiving control unit A11012 according to Embodiment 2 is described.

Figure 26:
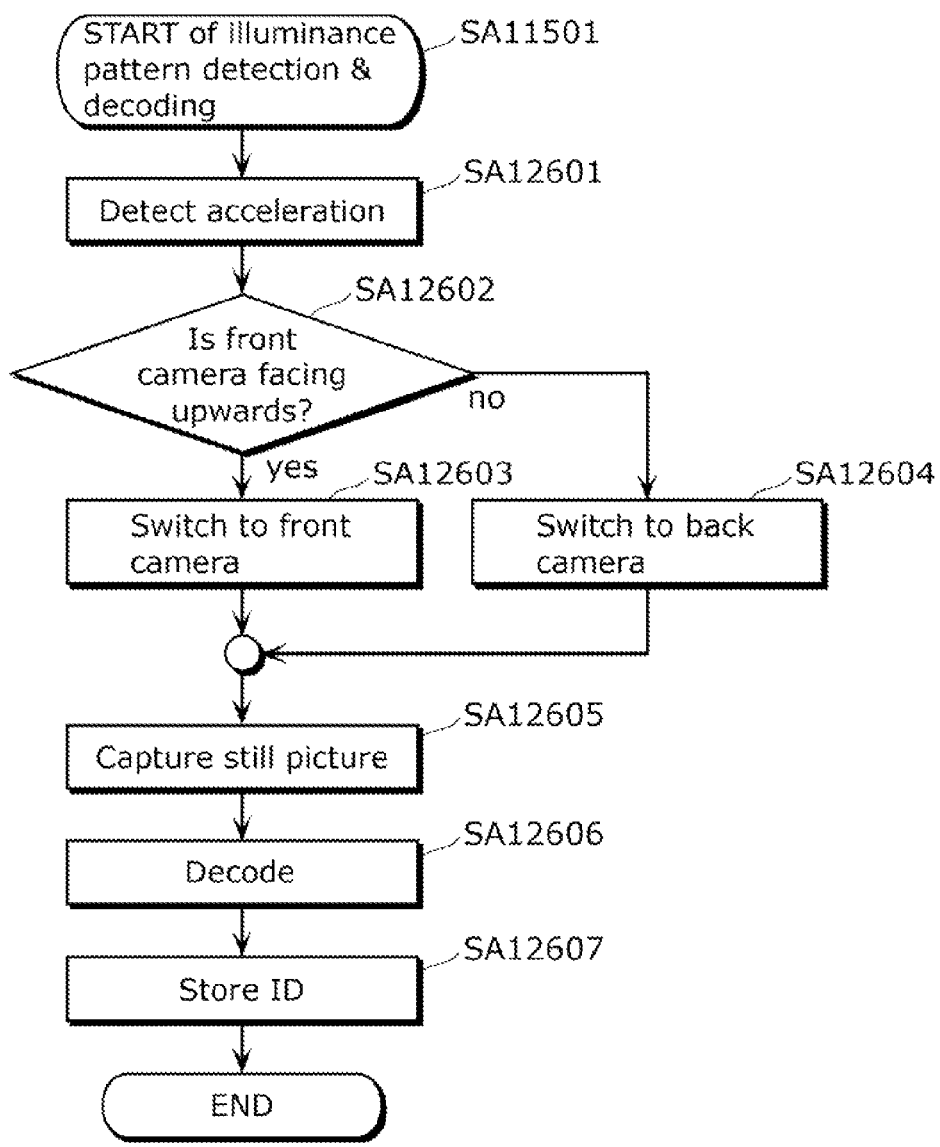
FIG. 26 is a flowchart of illuminance pattern detection performed by a light receiving control unit according to Embodiment 2.

FIG. 26 is a flowchart of illuminance pattern detection performed by the light receiving control unit according to Embodiment 2.

First, after starting (SA11501), the light receiving control unit A11012 detects, by using the acceleration detection unit A12504, an acceleration in a back surface direction of the mobile terminal A11011 (SA12601).

Next, the light receiving control unit A11012 compares the detected acceleration to the thresholds stored in the threshold storage unit A12507, thereby determining whether or not the light receiving unit A12501 (front camera) faces upwards (SA12602).

At SA12602, if the acceleration is greater than the first threshold, the light receiving control unit A11012 determines that the light receiving unit A12501 (front camera) faces upwards in respect with the ground (yes at SA12602) and therefore selects the light receiving unit A12501 (front camera) (SA12603). More specifically, if the acceleration is greater than the first threshold, this means that a greater acceleration, in other words, a gravity acceleration occurs in the back surface direction of the mobile terminal A11011. Therefore, the light receiving control unit A11012 can determine that the mobile terminal A11011 is parallel to the ground and the light receiving unit A12501 (front camera) faces upwards in respect with the ground. Then, the light receiving control unit A11012 selects or operates the light receiving unit A12501.

On the other hand, at SA12602, even if the acceleration is smaller than or equal to the second threshold, the light receiving control unit A11012 determines that the light receiving unit A12501 (front camera) does not face upwards in respect with the ground (no at SA12602), and selects the light receiving unit A12502 (back camera) (SA12604). More specifically, if the acceleration is smaller than or equal to the second threshold, this means that the gravity acceleration hardly occurs in the back surface direction of the mobile terminal A11011. Therefore, the light receiving control unit A11012 determines that the mobile terminal A11011 is not parallel to the ground and the light receiving unit A12502 (back camera) faces a wall or a rack. Then, the light receiving control unit A11012 selects or operates the light receiving unit A12502 (back camera).

Next, the light receiving control unit A11012 obtains still pictures (SA12605). More specifically, in the above-described processing, the light receiving control unit A11012 obtains images captured by the light receiving unit A12501 (front camera) and the light receiving unit A12502 (back camera).

Next, the light receiving control unit A11012 obtains an illuminance change of lighting from the captured images, in other words, performs decoding (SA12606).

Next, the light receiving control unit A11012 stores the ID obtained by the decoding, to the ID storage unit (SA12607).

As described above, the light receiving control unit A11012 can select a light receiving unit (image capturing unit) according to an attitude of the mobile terminal A11011. It is therefore possible to select the most appropriate light receiving unit (front camera) for a lighting device that looks at the mobile terminal from the above (in other words, looks down at a floor plan of a building), or select the most appropriate light receiving unit (back camera) for a lighting device that looks at a rack and other subjects in front in a horizontal direction.

Embodiment 3

The details of the structure and the flow of the light receiving control unit A11012 are not limited to those described in Embodiment 2. In Embodiment 3, a structure and a flow of the light receiving control unit A11012 which are different from those described in Embodiment 2 are described. The other structure is the same as described in Embodiment 1 and therefore not described again below.

[Detailed Structure of Light Receiving Control Unit A11012]

First, a detailed structure of the light receiving control unit A11012 according to Embodiment 3 is described.

Figure 27:
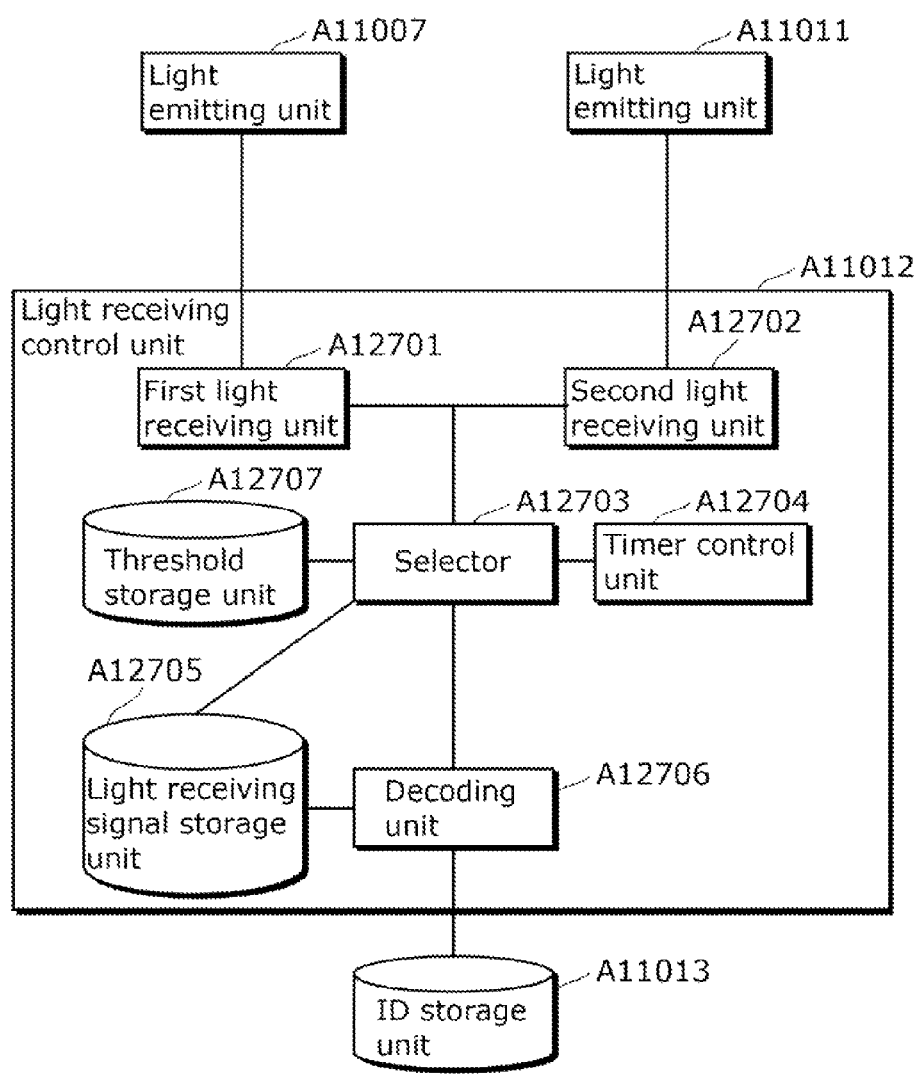
FIG. 27 is a diagram illustrating a detailed structure of a light receiving control unit according to Embodiment 3.

FIG. 27 is a diagram illustrating the detailed structure of the light receiving control unit according to Embodiment 3.

The light receiving control unit A11012 according to Embodiment 3 includes a first light receiving unit A12701, a second light receiving unit A12702, a selector A12703, a timer control unit A12704, a light receiving signal storage unit A12705, a decoding unit A12706, and a threshold storage unit A12707.

The light receiving unit A12701 corresponds to, for example, the front camera A1202 (first image capturing unit) according to Embodiment 1, and the light receiving unit A12702 corresponds to, for example, the back camera A1203 (second image capturing unit) according to Embodiment 1.

The selector A12703 selects one of these two light receiving units to be operated.

The timer control unit A12704 provides the selector A12703 with information necessary in the selection.

The light receiving signal storage unit A12705 stores light receiving signal obtained from the first light receiving unit A12701 or the second light receiving unit A12702 via the selector A12703.

The decoding unit A12706 reads the light receiving signal from the light receiving signal storage unit A12705, then decodes the light receiving signal to an ID and stores the resulting ID to the ID storage unit A11013.

The threshold storage unit A12707 previously holds a threshold 1 for a time period required from when the selector A12703 selects the first light receiving unit A12701 to start receiving light to when the selector A12703 switches to the second light receiving unit A12702 to receive light. The threshold storage unit A12507 previously holds a threshold 2 for a time period required from when the selector A12703 selects the second light receiving unit A12702 to start receiving light to when the selector A12703 switches to the first light receiving unit A12701 to receive light.

[Processing of Light Receiving Control Unit]

Subsequently, the processing flow of the light receiving control unit A11012 according to Embodiment 3 is described.

Figure 28:
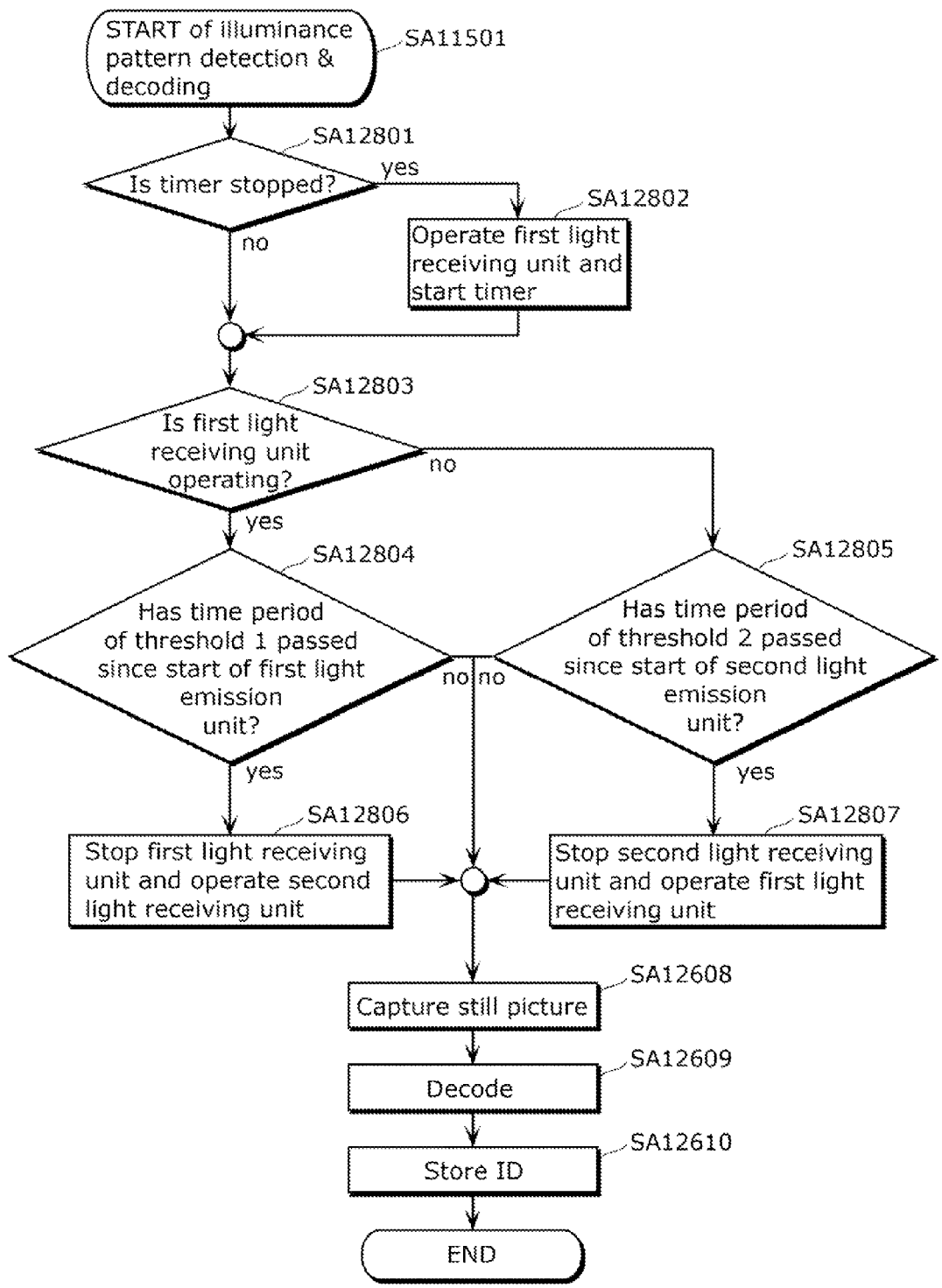
FIG. 28 is a flowchart of illuminance pattern detection performed by a light receiving control unit according to Embodiment 3.

FIG. 28 is a flowchart of illuminance pattern detection performed by the light receiving control unit according to Embodiment 3.

First, after starting (SA11501), the light receiving control unit A11012 confirms whether or not the timer control unit A12704 is stopped (SA12801).

At SA12801, if the timer control unit A12704 is not operated (yes at SA12801), the light receiving control unit A11012 operates the timer control unit A12704 and the first light receiving unit A12701 (SA12802).

Next, at SA12803, if the first light receiving unit A12701 is operating (yes at SA12803) and a time period of the first threshold has passed since the first light receiving unit A12701 starts the operation (yes at SA12804), the light receiving control unit A11012 stops the first light receiving unit A12701 and starts the second light receiving unit A12702 for a balanced use of these light receiving units (SA12806).

On the other hand, if the first light receiving unit A12701 is stopped and therefore the second light receiving unit A12702 is operating (no at SA12803), and a time period of the second threshold has passed since the second light receiving unit A12702 starts the operation (yes at SA12805), then the second light receiving unit A12702 is stopped and the first light receiving unit A12701 is operated for a balanced use of these light receiving units (SA12807).

Next, the light receiving control unit A11012 captures still pictures (SA12608). More specifically, in the above-described processing, the light receiving control unit A11012 obtains images captured by the first light receiving unit A12501 or the second light receiving unit A12502.

Next, the light receiving control unit A11012 obtains an illuminance change of lighting from the captured images, in other words, performs decoding (SA12609).

Next, the light receiving control unit A11012 stores the ID obtained by the decoding, to the ID storage unit A11013 (SA12610).

As described above, the light receiving control unit A11012 selects a light receiving unit (image capturing unit) at predetermined intervals. As a result, for example, in the case where a watch-type device as illustrated in FIG. 9 is horizontally held, it is possible to obtain, in a balanced manner, an ID from the ceiling light A1904 on the ceiling and an ID from the base light A1905 provided on a rack.

According to the present embodiment, the light receiving control unit A11012 may further include an acceleration detection unit. In this case, if it is expected that the display surface of the watch-type device is not parallel to the ground, in other words, the user does not look at the display surface of the watch-type device, the light receiving control unit A11012 may stop the first light receiving unit A12501 and the second light receiving unit A12502 to save power consumption.

Embodiment 4

According to Embodiment 4, the description is given for an example where a technique of detecting a line of sight is applied to Embodiment 1 to more appropriately reflect user's intention to the display unit A11018.

Figure 29:
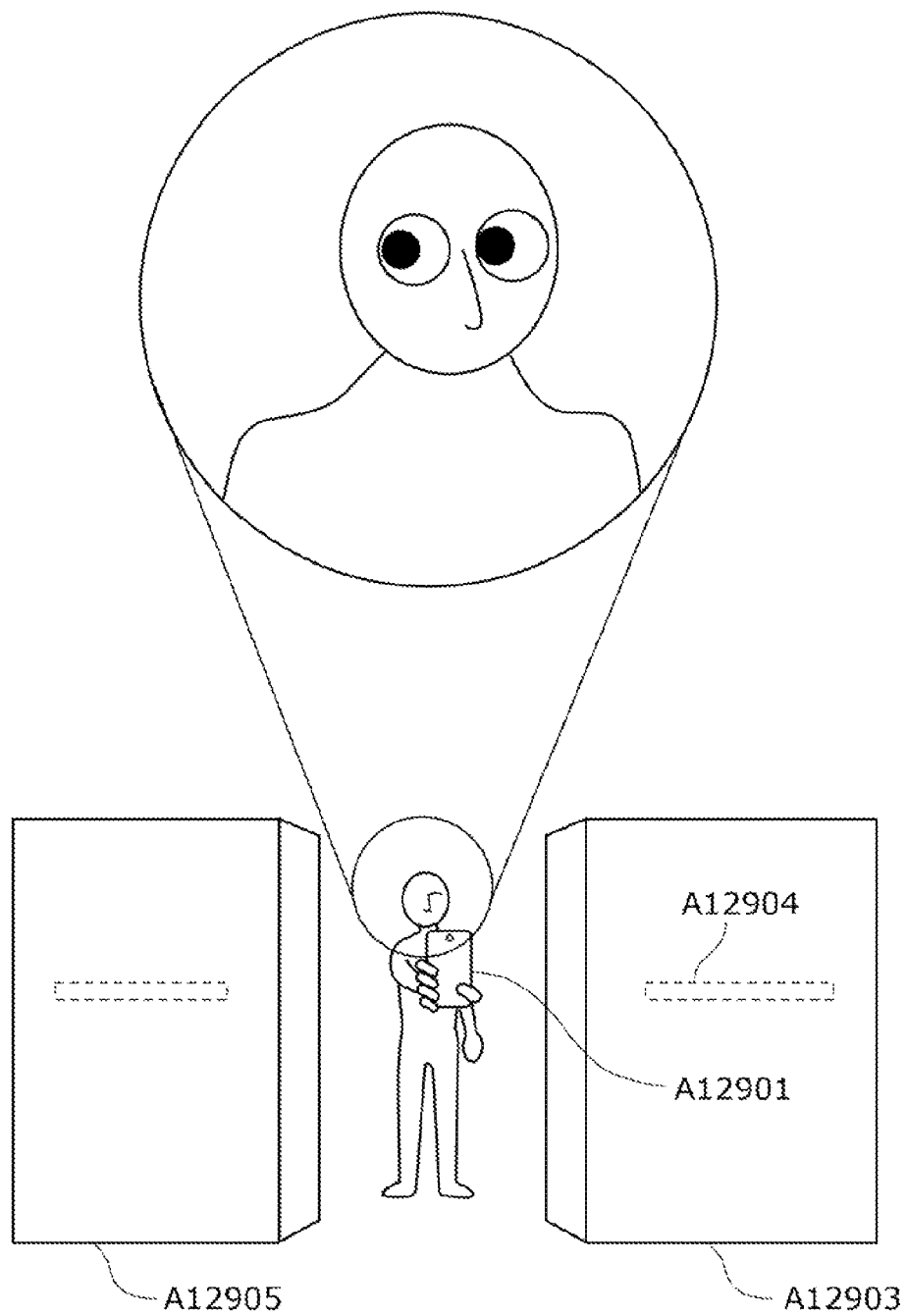
FIG. 29 is a diagram illustrating an example of a situation of using a mobile terminal for detecting a movement of a line of sight according to Embodiment 4.

FIG. 29 is a diagram illustrating an example of a situation of using a mobile terminal for detecting a movement of a line of sight according to Embodiment 4.

As illustrated in FIG. 29, when a user holds a mobile terminal A12901 by a hand and causes the back side of the mobile terminal A12901 to face a rack A12903, a display unit of the mobile terminal A12901 displays information of the rack A12903. According to the present embodiment, if the user's line of sight looks at the right of the rack A12901 in the above situation, the mobile terminal A12901 can detect the user's line of sight by image recognition. Then, it is determined that "what the user looks at is not the rack A12901 but a rack A12905 located on the right side of the rack A12901", and therefore information related to the rack A12905 is displayed on the display unit of the mobile terminal A12901.

As described above, in the present embodiment, an object to be displayed is selected in consideration of not only a lighting device in front of the mobile terminal A12901 but also a user's line of sight. As a result, it is possible to examine information to which user's intention is more appropriately reflected.

[Structure of Mobile Terminal A12901]

Subsequently, the structure of the mobile terminal A12901 according to Embodiment 4 is described.

Figure 30:
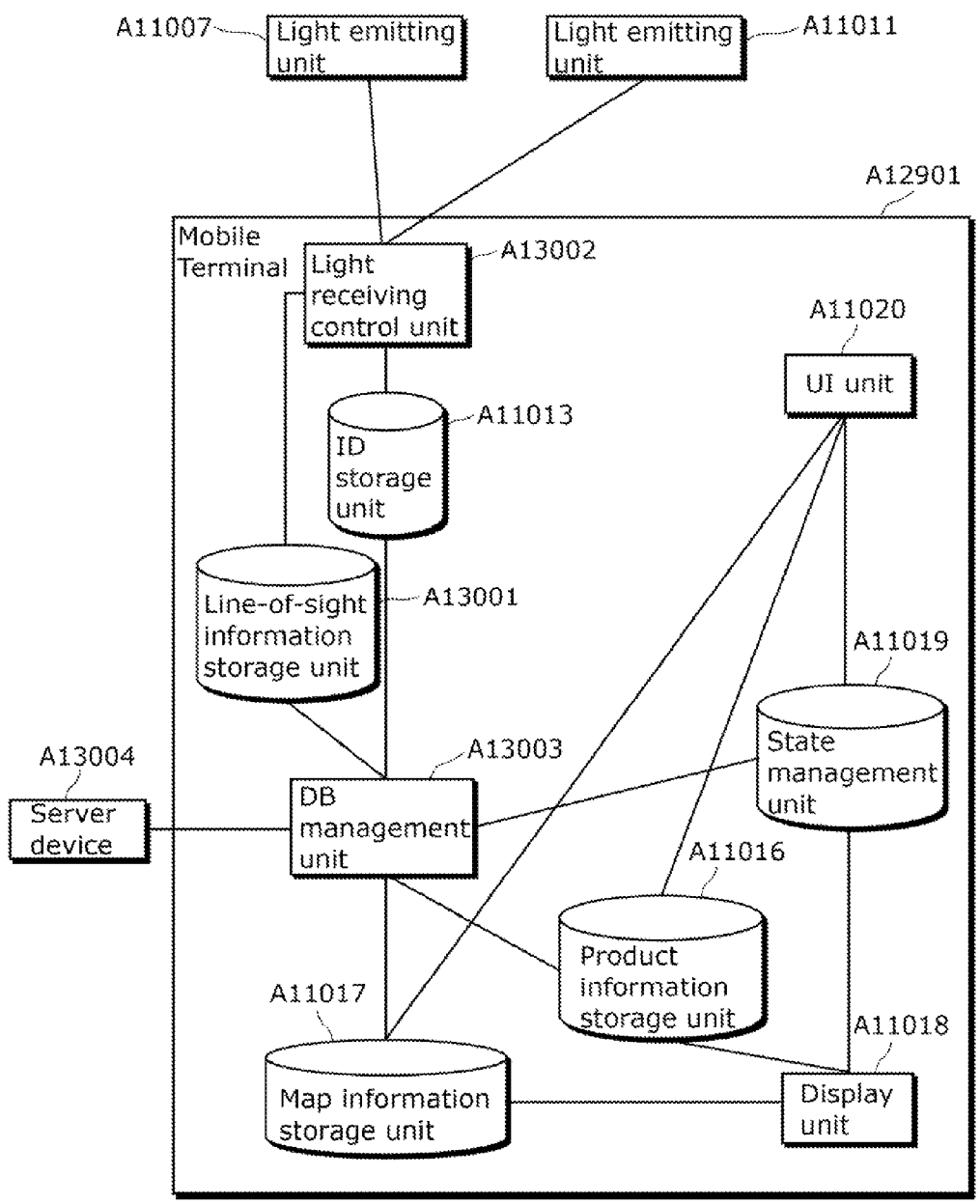
FIG. 30 is a diagram illustrating an example of a structure of the mobile terminal according to Embodiment 4.

FIG. 30 is a diagram illustrating an example of a structure of a mobile terminal according to Embodiment 4. It should be noted that, in FIG. 30, structural elements overlapping in Embodiment 1, in other words, the same structural elements as illustrated in FIG. 10, are assigned with the same reference numerals.

A mobile terminal A12901 illustrated in FIG. 30 includes a light receiving control unit A13002, an ID storage unit A11013, a DB management unit A13003, a product information storage unit A11016, a map information storage unit A11017, a display unit A11018, a state management unit A11019, an UI unit A11020, and a line-of-sight information storage unit A13001. Furthermore, the mobile terminal A12901 is connected to the server device A13004 by wireless communication.

The light receiving control unit A13002 detects an illuminance pattern of the light emitting unit A11007 and an illuminance pattern of the light emitting unit A11011, then converts the detected patterns to IDs, and stores the IDs to the ID storage unit A11013. In the case of the present embodiment, since the light receiving control unit A13002 detects an illuminance pattern of the light emitting unit A11007 or the light emitting unit A11011, the ID stored in the ID storage unit A11013 is identical to either an ID stored in the ID storage unit A11004 or an ID stored in the ID storage unit A11008.

Furthermore, the light receiving control unit A13002 detects, by an internal light receiving function in the light receiving control unit A13002, line-of-sight classification information indicating to which the user's line of sight is classified among "front, right, and left", and eventually stores the detected classification result to the line-of-sight information storage unit A13001.

The other structure is the same as described in Embodiment 10, so that it is not described in detail again.

[Operation Flow of DB Management Unit A13003]

Next, a flow of a DB management unit A13003 is described. In the first embodiment, SA11801 in FIG. 18 according to Embodiment 1 is described in more detail. Since the other steps are the same as described previously, the following mainly describes a detailed flow of SA11801.

Figure 31:
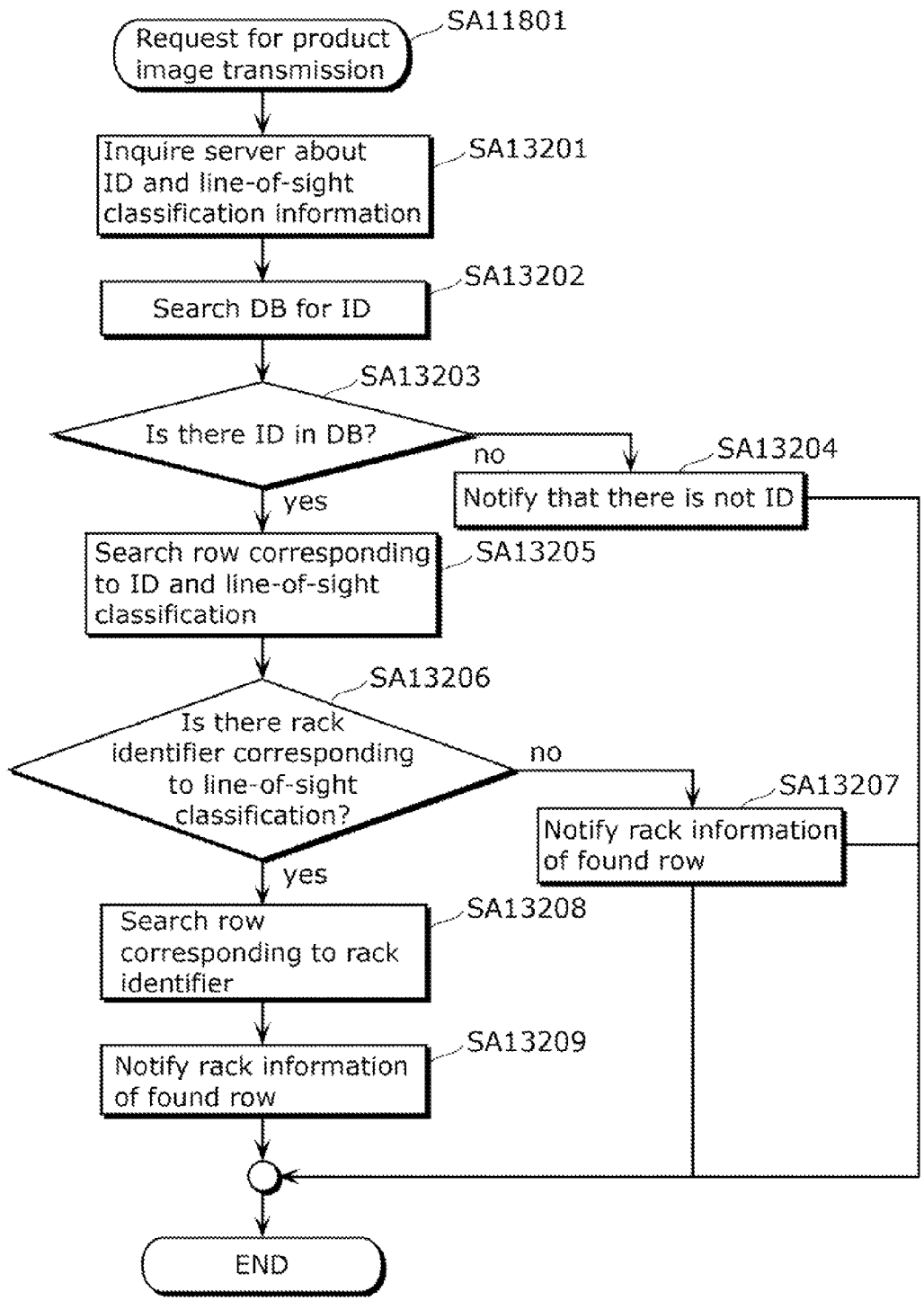
FIG. 31 is a flowchart performed when making inquiry to a server according to Embodiment 4.

FIG. 31 is a flowchart of inquiry performed by the DB management unit according to Embodiment 4. FIG. 32 illustrates an example of a structure of pieces of information managed by the DB in the server device according to Embodiment 4.

First, the DB management unit A13003 starts processing for requesting the server device A11015 to transmit a product image (SA11801).

Then, the DB management unit A13003 inquires the server device about an ID and line-of-sight classification information (SA13201). More specifically, the DB management unit A13003 reads the ID from the ID storage unit A11013, and reads the line-of-sight classification information from the line-of-sight information storage unit A13001. Furthermore, the DB management unit A13003 requests the server device A11015 for product information. In this case, the ID of the base light is transmitted to the server device A11015, and the line-of-sight classification information stored in the line-of-sight information storage unit A13001 is also transmitted to the server device A11015.

Next, the server device A11015 searches the held DB for the ID (SA13202). More specifically, the server device A11015 holds a DB as illustrated in FIG. 32, and searches a column A13102 of the DB for the received ID.

At SA13202, if the ID is found in the DB (yes at SA13203), then the server device A11015 searches a row of the DB according to the ID and the line-of-sight classification information (SA13205), and confirms whether or not there is a rack identifier corresponding to the line-of-sight classification information (SA13206). More specifically, if the corresponding row is found in the column A13102 of the DB, the server device A11015 extracts a rack identifier from the row. Here, if the line-of-sight classification information indicates "front", a rack identifier is obtained with reference to a column A13101 in the corresponding row. If the line-of-sight classification information indicates "left", a rack identifier is obtained with reference to a column A13103 in the corresponding row. If the line-of-sight classification information indicates "right", a rack identifier is obtained with reference to a column A13104 in the corresponding row.

Next, the server device A11015 searches for a row corresponding to the obtained rack identifier (SA13208), and notifies rack information indicated in the rack information column in the corresponding row (SA13209). More specifically, the server device A11015 searches the A13101 column for the obtained rack identifier, and notifies rack information A13105 in the corresponding row to the DB management unit A13003 in the mobile terminal A12901. For example, if an ID having a value of 200 and line-of-sight classification information indicating "right" are received and the ID having a value of 200 is searched in lighting ID A13102, the ID is in the first row. Since a rack identifier A13104 on the right side of the first row is 101, rack information A13105 in a row in which a rack identifier A13101 is 101, namely, rack information 2, is transmitted to the mobile terminal A12901.

Then, the DB management unit A13003 of the mobile terminal A12901 stores the obtained product information to the product information storage unit A11016, and sets the validity flag A11301 of the map information storage unit A11017 to FALSE, sets the validity flag of the product information storage unit A11016 to TRUE, and sets the error flag A11601 to FALSE.

Here, at SA13206, if no rack identifier is extracted based on the received ID and the line-of-sight classification information although the ID is detected from the column A13102 (no at SA13206), then the server device A11015 notifies the rack information A13105 of the row in which the received ID is found, to the DB management unit A13003 in the mobile terminal A12901 (SA13207).

On the other hand, at SA13023, if the server device A11015 cannot detect the received ID from the column A13102 (no at SA13203), the server device A11015 notifies the DB management unit A13003 in the mobile terminal A12901 of that there is no corresponding ID (SA13204). It should be noted that, if, for example, the ID transmitted to the server device A11015 is an invalid ID that is not related to any of the ceiling light and the base lights, the DB management unit A13003 sets the validity flag A11301 of the map information storage unit A11017 to FALSE, sets the validity flag of the product information storage unit A11016 to FALSE, and sets the error flag A11601 to TRUE.

As described above, according to the present embodiment, the mobile terminal including the communication device is further capable of detecting a user's line of sight. More specifically, if an orientation of the mobile terminal is substantially perpendicular to the ground, the back camera is selected to perform visible light communication with the first device that emits visible light, and the front camera is used to detect the user's line of sight.

As a result, the back camera is used to perform visible light communication with the first device that is in front of the user and emits visible light, the product information of the first product rack to which the first device is provided is obtained. If the second product rack in the detected user's line of sight is not the first product rack, it is possible to display product information of the second product rack instead of the product information of the first product rack.

Embodiment 5

Embodiment 5 is based on Embodiment 4 to more clarify the structure of the light receiving control unit A11012.

Figure 33:
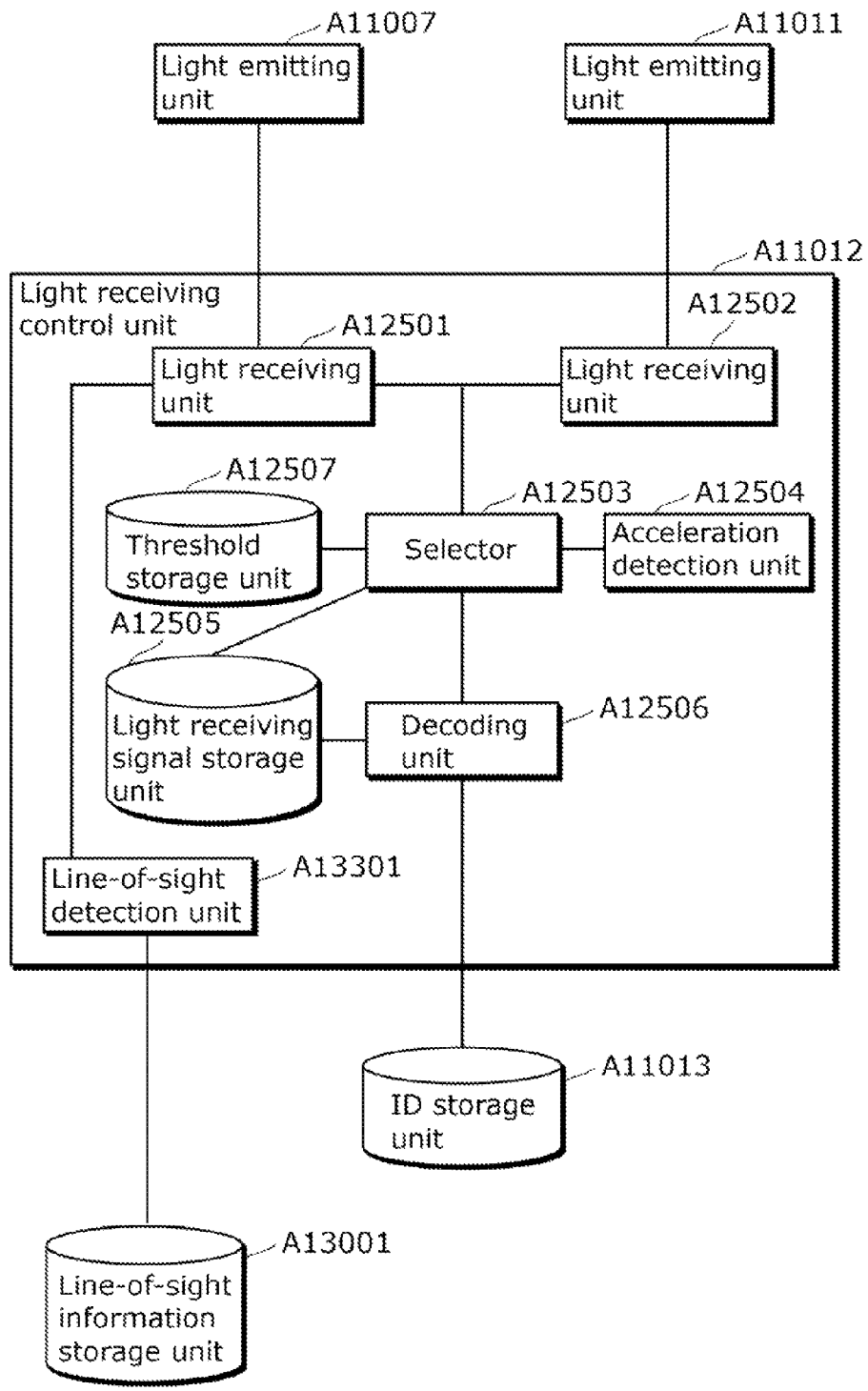
FIG. 33 is a diagram illustrating a detailed structure of a light receiving control unit according to Embodiment 5.

FIG. 33 is a diagram illustrating the detailed structure of the light receiving control unit according to Embodiment 5.

As illustrated in FIG. 33, the light receiving control unit A11012 according to Embodiment 5 includes a light receiving unit A12501, a light receiving unit A12502, a selector A12503, an acceleration detection unit A12504, a light receiving signal storage unit A12505, a decoding unit A12506, a threshold storage unit A12507, and a line-of-sight detection unit A13301. It should be noted that the same reference numerals in FIG. 25 are assigned to the identical structural elements, and therefore the detailed description of the identical structural elements are not given below.

The light receiving unit A12501 corresponds to, for example, the front camera A1202 (first image capturing unit) according to Embodiment 1, and the light receiving unit A12502 corresponds to, for example, the back camera A1203 (second image capturing unit) according to Embodiment 1. It should be noted that, according to the present embodiment, the light receiving unit A12501 is a video imaging device such as a camera device.

The selector A12503 selects one of the two light receiving units to be operated.

The acceleration detection unit A12504 detects an acceleration of the mobile terminal A12901 to provide the selector A12503 with information necessary in the selection.

The light receiving signal storage unit A12505 stores light receiving signal obtained from the light receiving unit A12501 or the light receiving unit A12502 via the selector A12503.

The decoding unit A12506 reads the light receiving signal from the light receiving signal storage unit A12505, then decodes the light receiving signal to an ID and stores the resulting ID to the ID storage unit A11013.

The threshold storage unit A12507 previously holds a first threshold and a second threshold. These thresholds are used to determine, based on an acceleration detected by the selector A12503, whether or not the mobile terminal A12901 including the light receiving control unit A11012 is parallel to the ground.

The line-of-sight detection unit A13301 receives a video signal from the light receiving unit A12501, and detects a position of a user's line of sight and stores line-of-sight classification information to the line-of-sight information storage unit A13001.

Embodiment 6

Embodiment 6 is based on Embodiment 4 to more clarify the structure of the light receiving control unit A11012.

Figure 34:
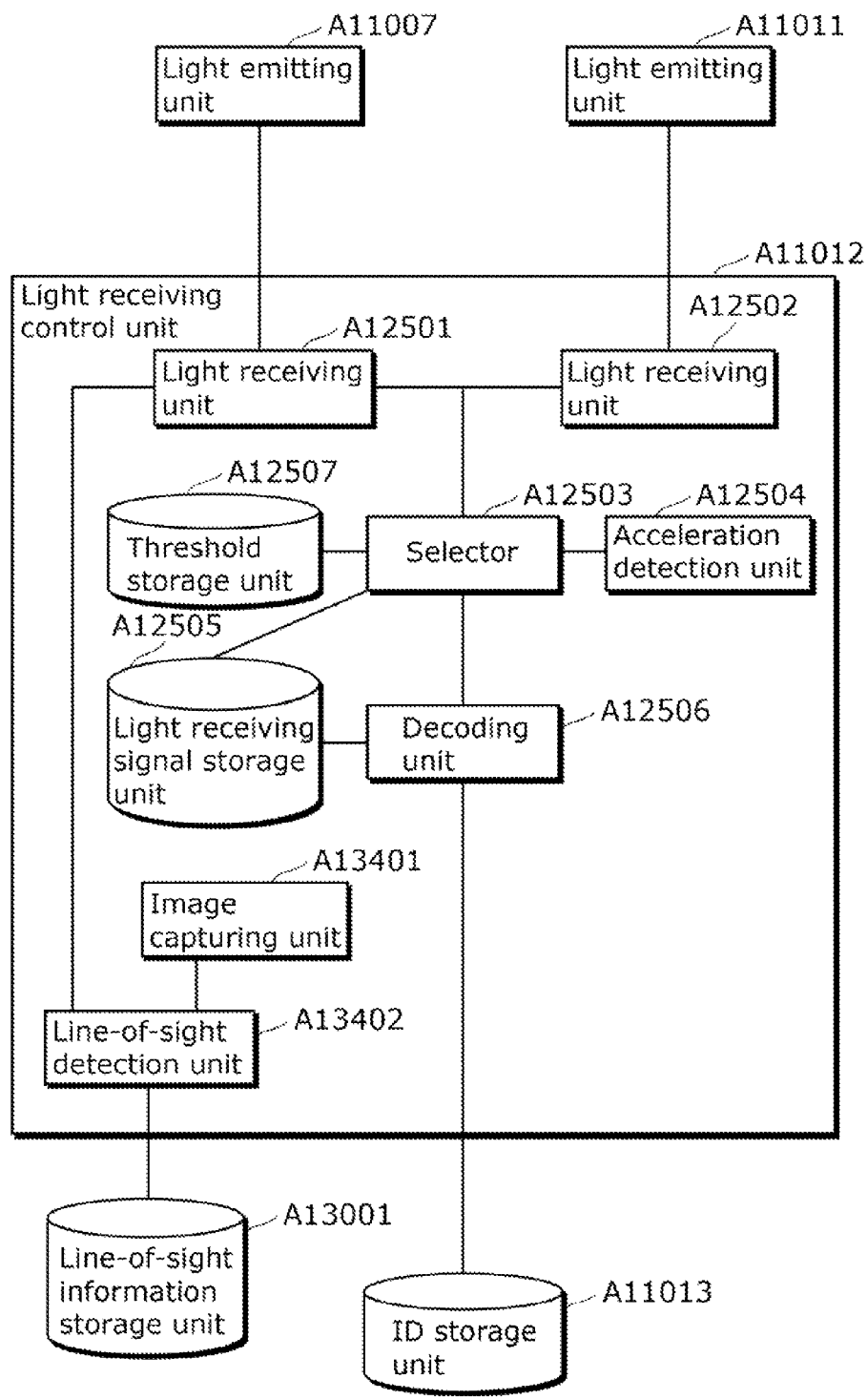
FIG. 34 is a diagram illustrating a detailed structure of a light receiving control unit according to Embodiment 6.

FIG. 34 is a diagram illustrating the detailed structure of the light receiving control unit according to Embodiment 6.

As illustrated in FIG. 34, the light receiving control unit A11012 according to Embodiment 6 includes a light receiving unit A12501, a light receiving unit A12502, a selector A12503, an acceleration detection unit A12504, a light receiving signal storage unit A12505, a decoding unit A12506, a threshold storage unit A12507, an image capturing unit A13401, and a line-of-sight detection unit A13402. It should be noted that the same reference numerals in FIG. 25 are assigned to the identical structural elements, and therefore the detailed description of the identical structural elements are not given below.

According to the present embodiment, the light receiving unit A12501 is assumed to be a sensor device such as an illuminance sensor. The light receiving unit A12502 corresponds to, for example, the out-camera A1203 (second image capturing unit) according to Embodiment 1.

The selector A12503 selects one of these two light receiving units to be operated.

The acceleration detection unit A12504 detects an acceleration of the mobile terminal A12901 to provide the selector A12503 with information necessary in the selection.

The light receiving signal storage unit A12505 stores light receiving signal obtained from the light receiving unit A12501 or the light receiving unit A12502 via the selector A12503.

The decoding unit A12506 reads the light receiving signal from the light receiving signal storage unit A12505, then decodes the light receiving signal to an ID and stores the resulting ID to the ID storage unit A11013.

The threshold storage unit A12507 previously holds a first threshold and a second threshold. These thresholds are used to determine, based on an acceleration detected by the selector A12503, whether or not the mobile terminal A12901 including the light receiving control unit A11012 is parallel to the ground.

The image capturing unit A13401 is a video imaging device such as a camera device.

The line-of-sight detection unit A13402 receives a video signal from the light receiving unit A13401, and detects a position of a user's line of sight and stores resulting line-of-sight classification information to the line-of-sight information storage unit A13001.

As described above, according to the present embodiment, it is possible to provide a communication terminal and a communication method which are capable of presenting information to which a current position and intension of a user are more appropriately reflected according to an attitude of a mobile terminal.

Embodiment 7

The following describes Embodiment 7.

(Observation of Luminance of Light Emitting Unit)

Figure 35:
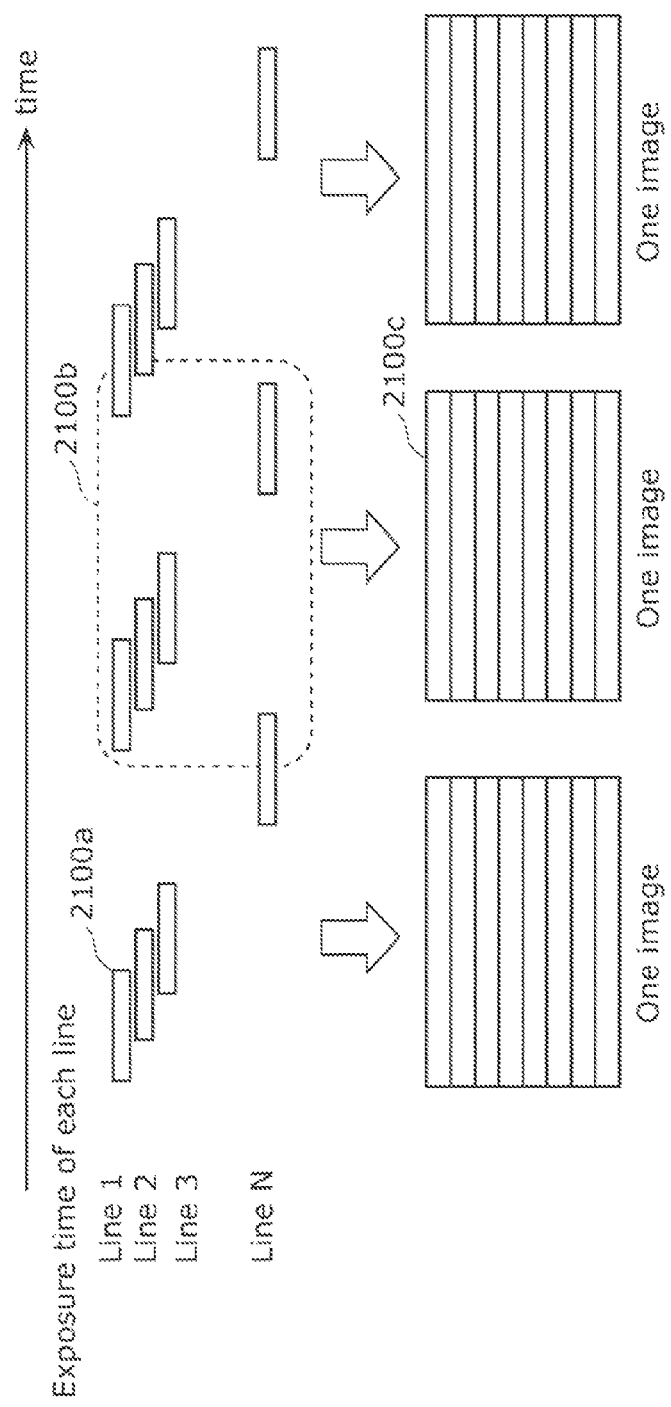
FIG. 35 is a diagram illustrating an example of a situation where imaging elements arranged in a line are exposed simultaneously with an exposure start time being shifted in order of lines according to Embodiment 7.

The following proposes an imaging method in which, when capturing one image, all imaging elements are not exposed simultaneously but the times of starting and ending the exposure differ between the imaging elements. FIG. 35 illustrates an example of imaging where imaging elements arranged in a line are exposed simultaneously, with the exposure start time being shifted in order of lines. Here, the simultaneously exposed imaging elements are referred to as "exposure line", and the line of pixels in the image corresponding to the imaging elements is referred to as "bright line".

Figure 36:
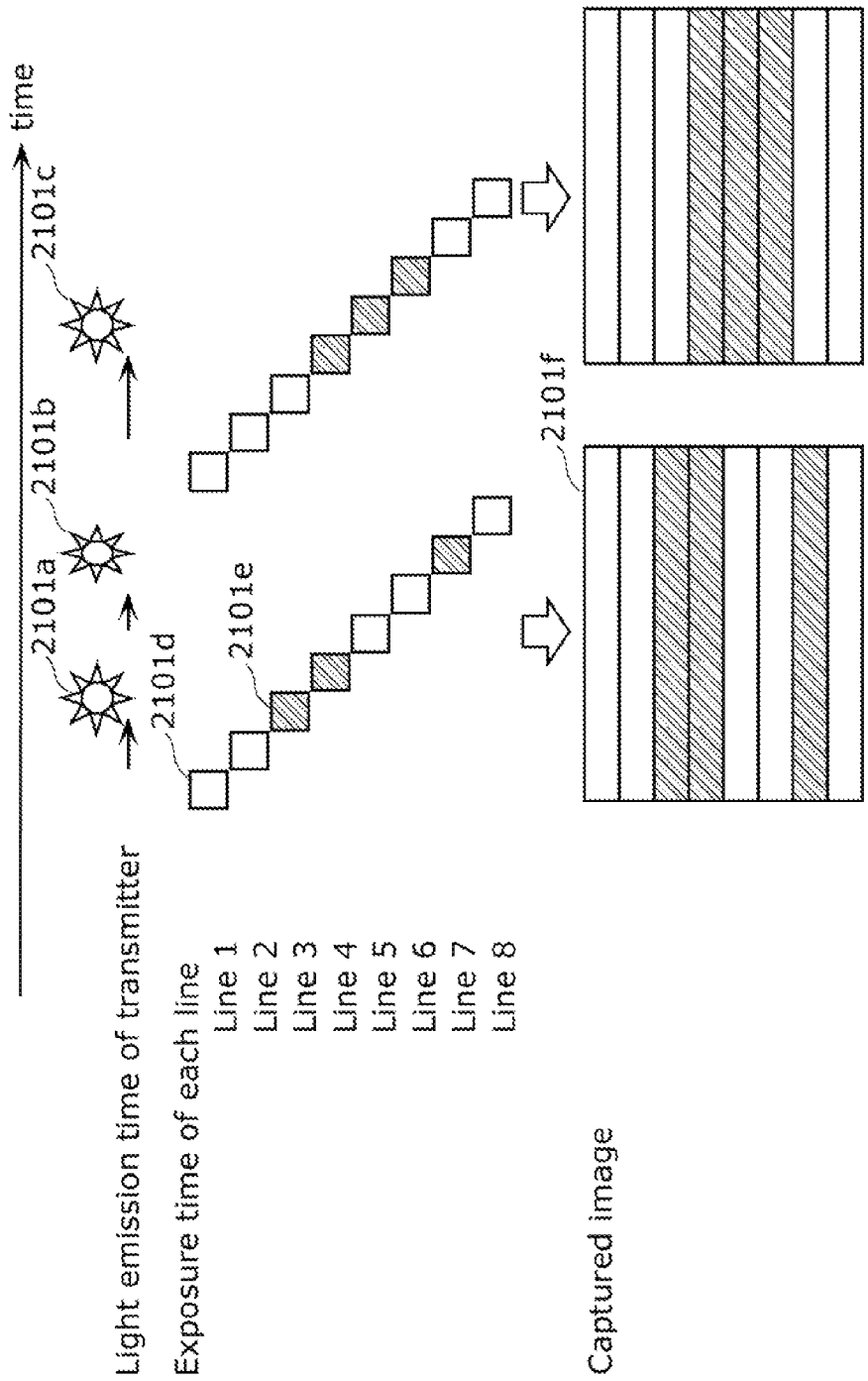
FIG. 36 is a diagram illustrating a situation where, after exposure of one exposure line ends, exposure of a next exposure line starts according to Embodiment 7.

In the case of capturing a blinking light source shown on the entire imaging elements using this imaging method, bright lines (lines of brightness in pixel value) along exposure lines appear in the captured image as illustrated in FIG. 36. By recognizing this bright line pattern, the luminance change of the light source at a speed higher than the imaging frame rate can be estimated. Hence, transmitting a signal as the luminance change of the light source enables communication at a speed not less than the imaging frame rate. In the case where the light source takes two luminance values to express a signal, the lower luminance value is referred to as "low" (LO), and the higher luminance value is referred to as "high" (HI). The low may be a state in which the light source emits no light, or a state in which the light source emits weaker light than in the high.

By this method, information transmission is performed at a speed higher than the imaging frame rate.

In the case where the number of exposure lines whose exposure times do not overlap each other is 20 in one captured image and the imaging frame rate is 30 fps, it is possible to recognize a luminance change in a period of 1.67 millisecond. In the case where the number of exposure lines whose exposure times do not overlap each other is 1000, it is possible to recognize a luminance change in a period of 1/30000 second (about 33 microseconds). Note that the exposure time is set to less than 10 milliseconds, for example.

FIG. 36 illustrates a situation where, after the exposure of one exposure line ends, the exposure of the next exposure line starts.

In this situation, when transmitting information based on whether or not each exposure line receives at least a predetermined amount of light, information transmission at a speed of fl bits per second at the maximum can be realized where f is the number of frames per second (frame rate) and l is the number of exposure lines constituting one image.

Note that faster communication is possible in the case of performing time-difference exposure not on a line basis but on a pixel basis.

In such a case, when transmitting information based on whether or not each pixel receives at least a predetermined amount of light, the transmission speed is flm bits per second at the maximum, where m is the number of pixels per exposure line.

Figure 37:
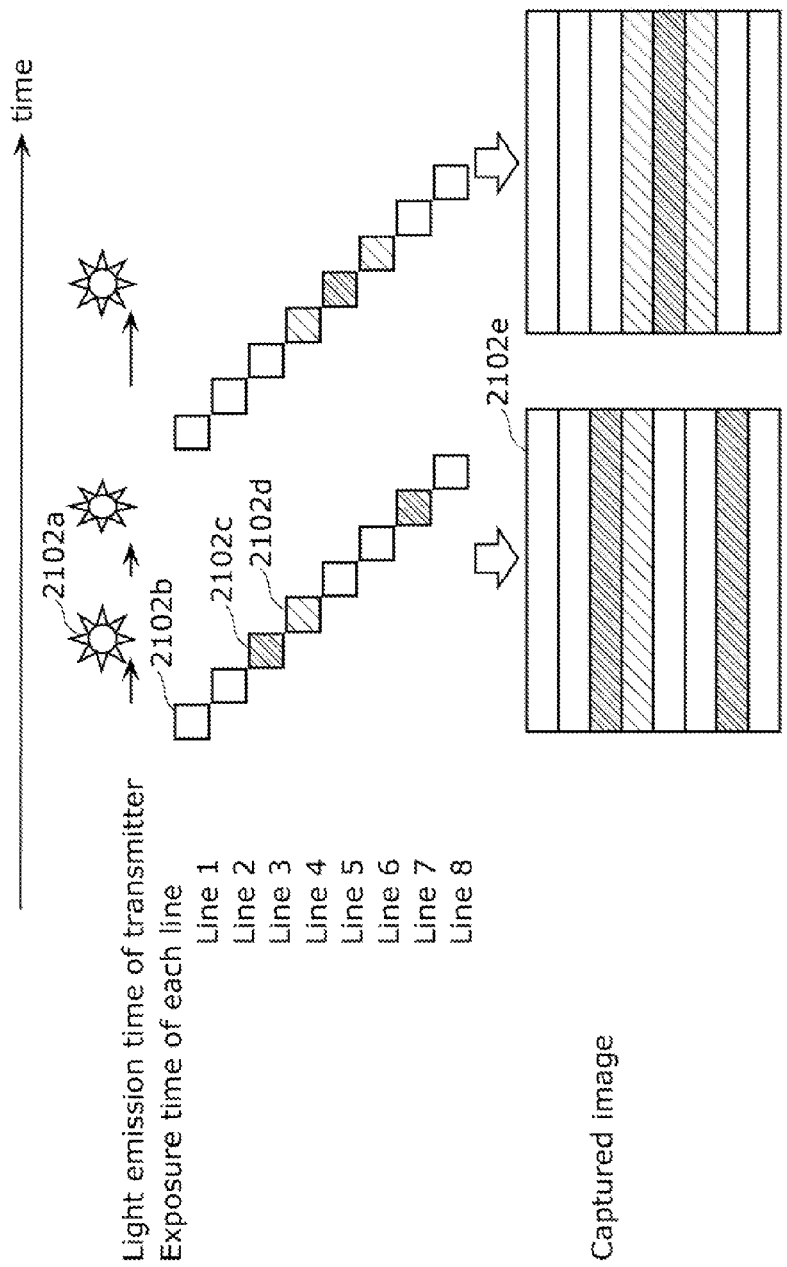
FIG. 37 is a diagram illustrating a situation where, after exposure of one exposure line ends, exposure of a next exposure line starts according to Embodiment 7.

If the exposure state of each exposure line caused by the light emission of the light emitting unit is recognizable in a plurality of levels as illustrated in FIG. 37, more information can be transmitted by controlling the light emission time of the light emitting unit in a shorter unit of time than the exposure time of each exposure line.

In the case where the exposure state is recognizable in Elv levels, information can be transmitted at a speed of flElv bits per second at the maximum.

Moreover, a fundamental period of transmission can be recognized by causing the light emitting unit to emit light with a timing slightly different from the timing of exposure of each exposure line.

Figure 38:
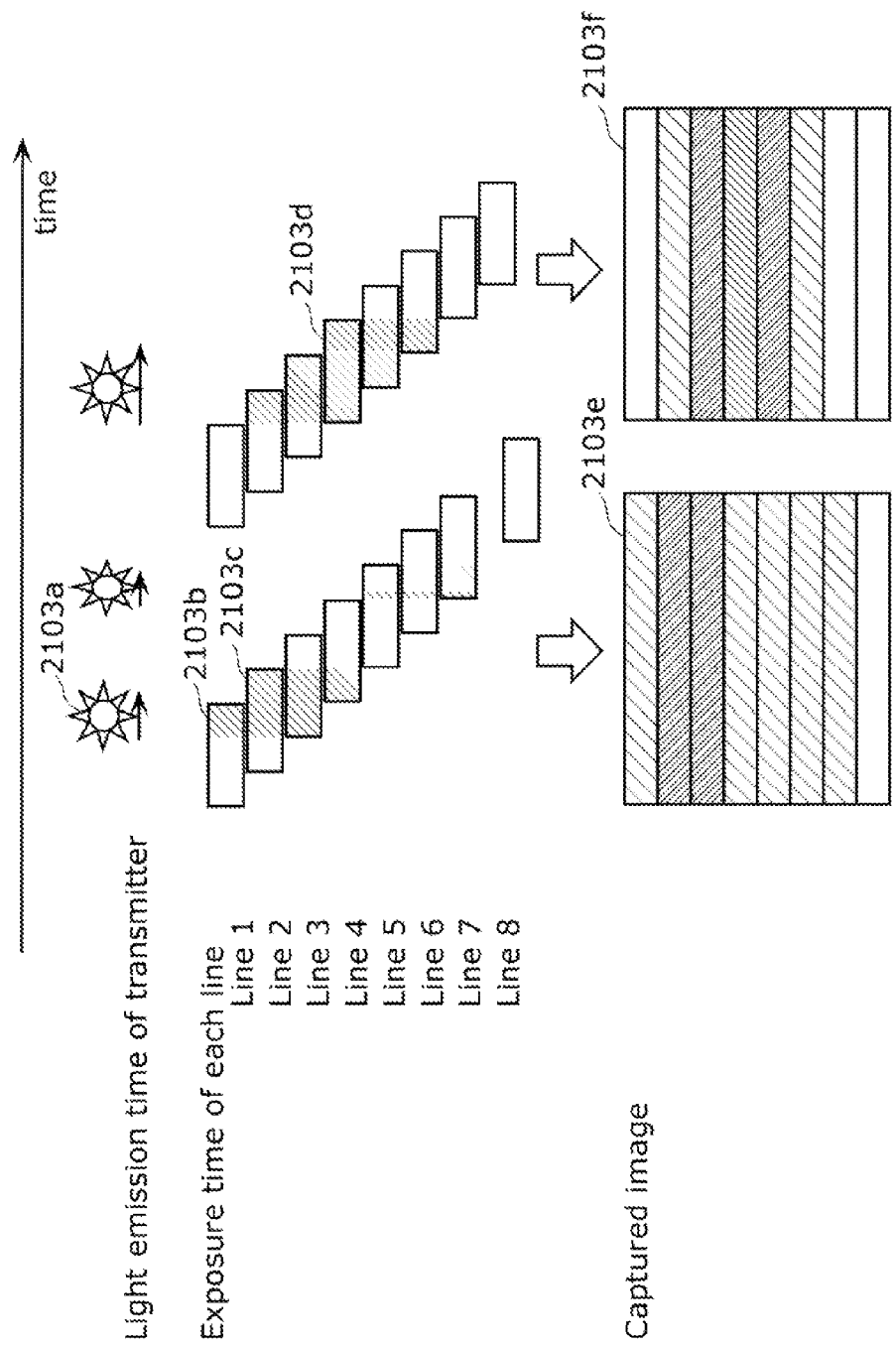
FIG. 38 is a diagram illustrating a situation where, before exposure of one exposure line ends, exposure of a next exposure line starts according to Embodiment 7.

FIG. 38 illustrates a situation where, before the exposure of one exposure line ends, the exposure of the next exposure line starts. That is, the exposure times of adjacent exposure lines partially overlap each other. This structure has the feature (1): the number of samples in a predetermined time can be increased as compared with the case where, after the exposure of one exposure line ends, the exposure of the next exposure line starts. The increase of the number of samples in the predetermined time leads to more appropriate detection of the light signal emitted from the light transmitter which is the subject. In other words, the error rate when detecting the light signal can be reduced. The structure also has the feature (2): the exposure time of each exposure line can be increased as compared with the case where, after the exposure of one exposure line ends, the exposure of the next exposure line starts. Accordingly, even in the case where the subject is dark, a brighter image can be obtained, i.e. the S/N ratio can be improved. Here, the structure in which the exposure times of adjacent exposure lines partially overlap each other does not need to be applied to all exposure lines, and part of the exposure lines may not have the structure of partially overlapping in exposure time. By keeping part of the exposure lines from partially overlapping in exposure time, the occurrence of an intermediate color caused by exposure time overlap is suppressed on the imaging screen, as a result of which bright lines can be detected more appropriately.

In this situation, the exposure time is calculated from the brightness of each exposure line, to recognize the light emission state of the light emitting unit.

Note that, in the case of determining the brightness of each exposure line in a binary fashion of whether or not the luminance is greater than or equal to a threshold, it is necessary for the light emitting unit to continue the state of emitting no light for at least the exposure time of each line, to enable the no light emission state to be recognized.

Figure 39:
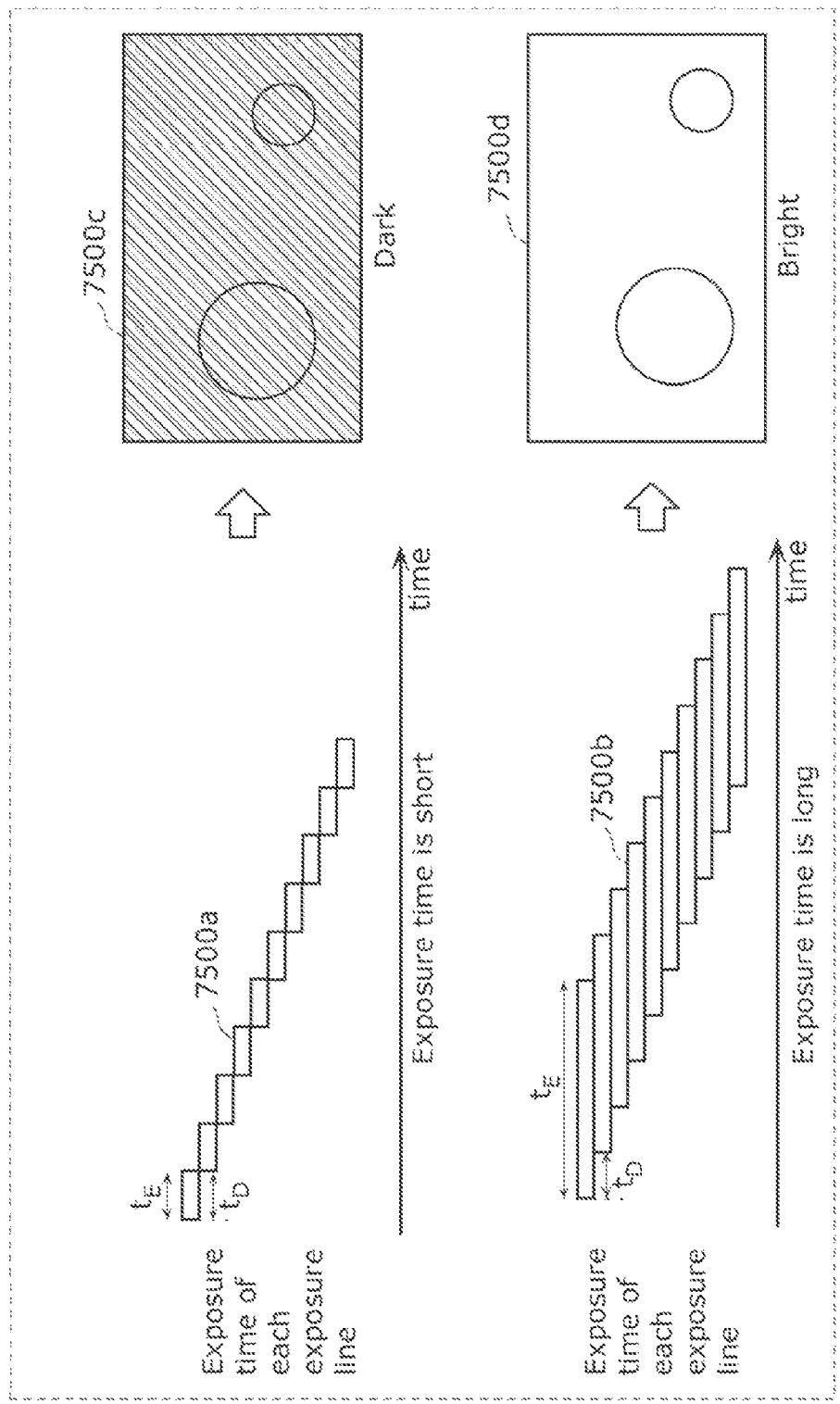
FIG. 39 is a diagram illustrating influence of a difference in an exposure time in the case where an exposure start time of each exposure line is the same, according to Embodiment 7.

FIG. 39 illustrates the influence of the difference in exposure time in the case where the exposure start time of each exposure line is the same. In 7500a, the exposure end time of one exposure line and the exposure start time of the next exposure line are the same. In 7500b, the exposure time is longer than that in 7500a. The structure in which the exposure times of adjacent exposure lines partially overlap each other as in 7500b allows a longer exposure time to be used. That is, more light enters the imaging element, so that a brighter image can be obtained. In addition, since the imaging sensitivity for capturing an image of the same brightness can be reduced, an image with less noise can be obtained. Communication errors are prevented in this way.

Figure 40:
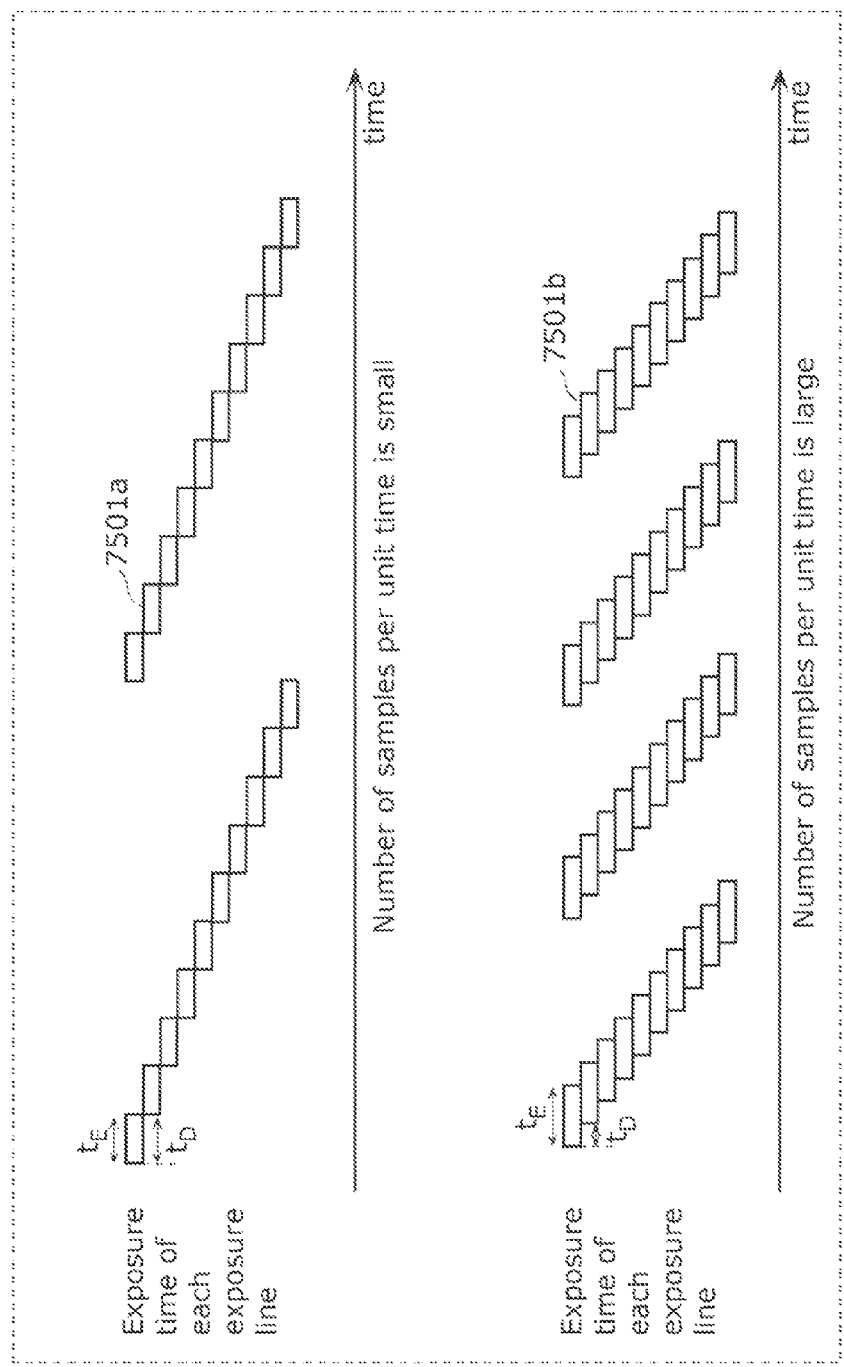
FIG. 40 is a diagram illustrating influence of a difference in an exposure time of exposure lines in the case where each exposure time is the same, according to Embodiment 7.

FIG. 40 illustrates the influence of the difference in exposure start time of each exposure line in the case where the exposure time is the same. In 7501a, the exposure end time of one exposure line and the exposure start time of the next exposure line are the same. In 7501b, the exposure of one exposure line ends after the exposure of the next exposure line starts. The structure in which the exposure times of adjacent exposure lines partially overlap each other as in 7501b allows more lines to be exposed per unit time. This increases the resolution, so that more information can be obtained. Since the sample interval (i.e. the difference in exposure start time) is shorter, the luminance change of the light source can be estimated more accurately, contributing to a lower error rate. Moreover, the luminance change of the light source in a shorter time can be recognized. By exposure time overlap, light source blinking shorter than the exposure time can be recognized using the difference of the amount of exposure between adjacent exposure lines.

As described with reference to FIGS. 39 and 40, in the structure in which each exposure line is sequentially exposed so that the exposure times of adjacent exposure lines partially overlap each other, the communication speed can be dramatically improved by using, for signal transmission, the bright line pattern generated by setting the exposure time shorter than in the normal imaging mode. Setting the exposure time in visible light communication to less than or equal to 1/480 second enables an appropriate bright line pattern to be generated. Here, it is necessary to set (exposure time)<1/8×f, where f is the frame frequency. Blanking during imaging is half of one frame at the maximum. That is, the blanking time is less than or equal to half of the imaging time. The actual imaging time is therefore 1/2f at the shortest. Besides, since 4-value information needs to be received within the time of 1/2f, it is necessary to at least set the exposure time to less than 1/(2f×4). Given that the normal frame rate is less than or equal to 60 frames per second, by setting the exposure time to less than or equal to 1/480 second, an appropriate bright line pattern is generated in the image data and thus fast signal transmission is achieved.

Figure 41:
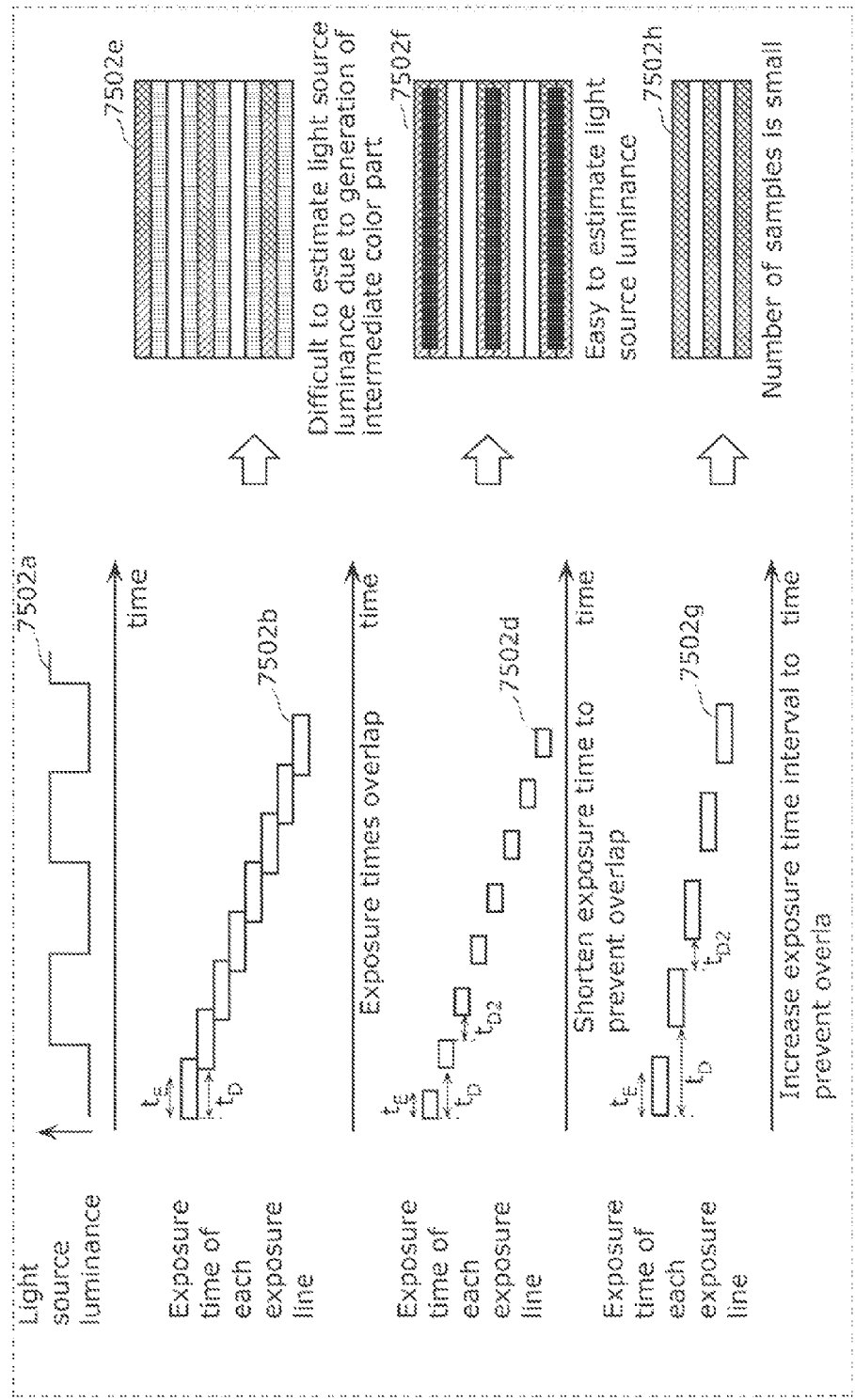
FIG. 41 is a diagram illustrating advantages of using a short exposure time in the case where each exposure line does not overlap in an exposure time, according to Embodiment 7.

FIG. 41 illustrates the advantage of using a short exposure time in the case where each exposure line does not overlap in exposure time. In the case where the exposure time is long, even when the light source changes in luminance in a binary fashion as in 7502*a*, an intermediate-color part tends to appear in the captured image as in 7502*e*, making it difficult to recognize the luminance change of the light source. By providing a predetermined non-exposure vacant time (predetermined wait time) $t_{D2}$ from when the exposure of one exposure line ends to when the exposure of the next exposure line starts as in 7502*d*, however, the luminance change of the light source can be recognized more easily. That is, a more appropriate bright line pattern can be detected as in 7502*f*. The provision of the predetermined non-exposure vacant time is possible by setting a shorter exposure time $t_E$ than the time difference $t_D$ between the exposure start times of the exposure lines, as in 7502*d*. In the case where the exposure times of adjacent exposure lines partially overlap each other in the normal imaging mode, the exposure time is shortened from the normal imaging mode so as to provide the predetermined non-exposure vacant time. In the case where the exposure times of adjacent exposure lines partially overlap each other in the normal imaging mode, the exposure time is shortened from the normal imaging mode so as to provide the predetermined non-exposure vacant time. In the case where the exposure end time of one exposure line and the exposure start time of the next exposure line are the same in the normal imaging mode, too, the exposure time is shortened so as to provide the predetermined non-exposure time. Alternatively, the predetermined non-exposure vacant time (predetermined wait time) $t_{D2}$ from when the exposure of one exposure line ends to when the exposure of the next exposure line starts may be provided by increasing the interval $t_D$ between the exposure start times of the exposure lines, as in 7502*g*. This structure allows a longer exposure time to be used, so that a brighter image can be captured. Moreover, a reduction in noise contributes to higher error tolerance. Meanwhile, this structure is disadvantageous in that the number of samples is small as in 7502*h*, because fewer exposure lines can be exposed in a predetermined time. Accordingly, it is desirable to use these structures depending on circumstances. For example, the estimation error of the luminance change of the light source can be reduced by using the former structure in the case where the imaging object is bright and using the latter structure in the case where the imaging object is dark.

Here, the structure in which the exposure times of adjacent exposure lines partially overlap each other does not need to be applied to all exposure lines, and part of the exposure lines may not have the structure of partially overlapping in exposure time. Moreover, the structure in which the predetermined non-exposure vacant time (predetermined wait time) is provided from when the exposure of one exposure line ends to when the exposure of the next exposure line starts does not need to be applied to all exposure lines, and part of the exposure lines may have the structure of partially overlapping in exposure time. This makes it possible to take advantage of each of the structures. Furthermore, the same reading method or circuit may be used to read a signal in the normal imaging mode in which imaging is performed at the normal frame rate (30 fps, 60 fps) and the visible light communication mode in which imaging is performed with the exposure time less than or equal to 1/480 second for visible light communication. The use of the same reading method or circuit to read a signal eliminates the need to employ separate circuits for the normal imaging mode and the visible light communication mode. The circuit size can be reduced in this way.

Figure 42:
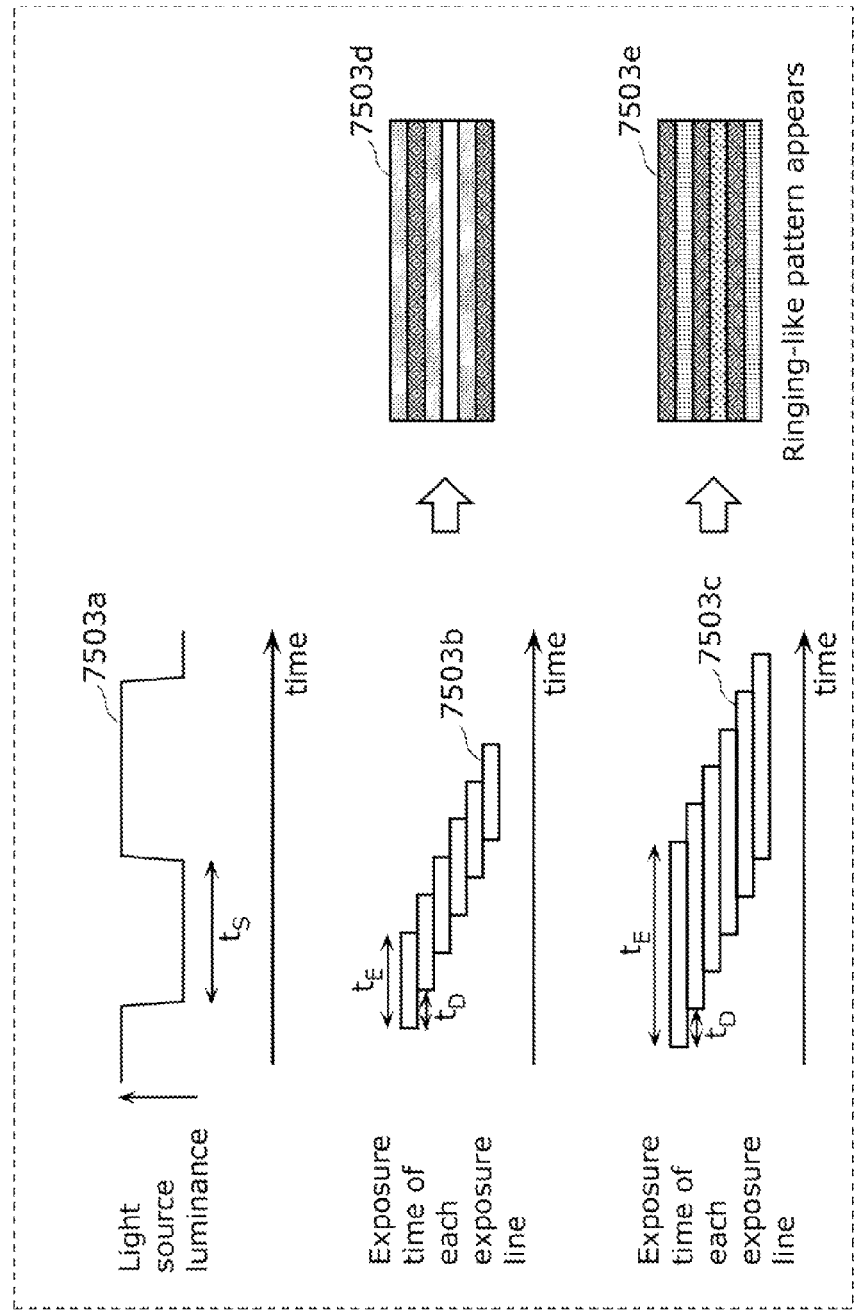
FIG. 42 is a diagram illustrating a relation between a minimum change time of light source luminance, an exposure time, a time difference between exposure start times of the exposure lines, and a captured image, according to Embodiment 7.

FIG. 42 illustrates the relation between the minimum change time $t_S$ of light source luminance, the exposure time $t_E$, the time difference $t_D$ between the exposure start times of the exposure lines, and the captured image. In the case where $t_E + t_D < t_S$, imaging is always performed in a state where the light source does not change from the start to end of the exposure of at least one exposure line. As a result, an image with clear luminance is obtained as in 7503*d*, from which the luminance change of the light source is easily recognizable. In the case where $2t_E > t_S$, a bright line pattern different from the luminance change of the light source might be obtained, making it difficult to recognize the luminance change of the light source from the captured image.

Figure 43:
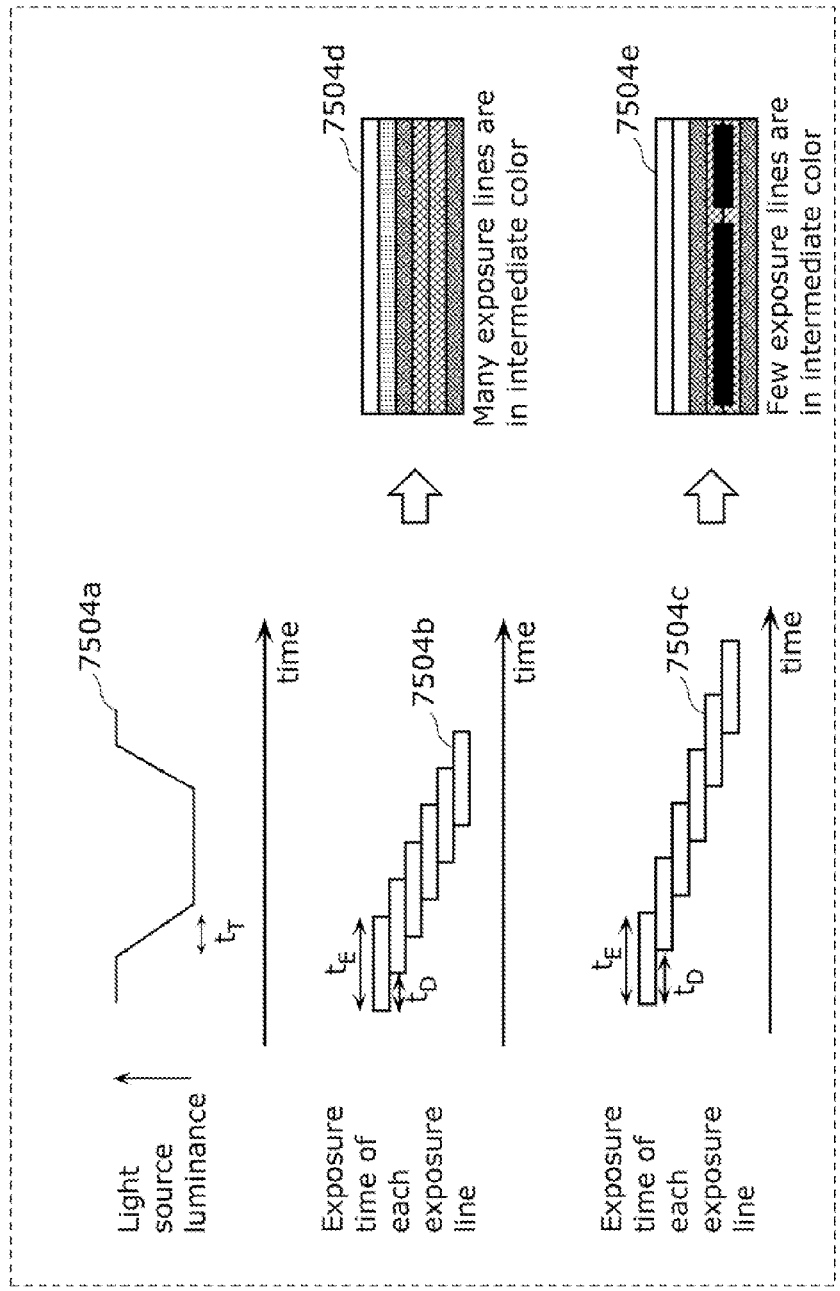
FIG. 43 is a diagram illustrating a relation between a transition time of light source luminance and a time difference between exposure start times of the exposure lines, according to Embodiment 7.

FIG. 43 illustrates the relation between the transition time $t_T$ of light source luminance and the time difference $t_D$ between the exposure start times of the exposure lines. When $t_D$ is large as compared with $t_T$, fewer exposure lines are in the intermediate color, which facilitates estimation of light source luminance. It is desirable that $t_D > t_T$, because the number of exposure lines in the intermediate color is two or less consecutively. Since $t_T$ is less than or equal to 1 microsecond in the case where the light source is an LED and about 5 microseconds in the case where the light source is an organic EL device, setting $t_D$ to greater than or equal to 5 microseconds facilitates estimation of light source luminance.

Figure 44:
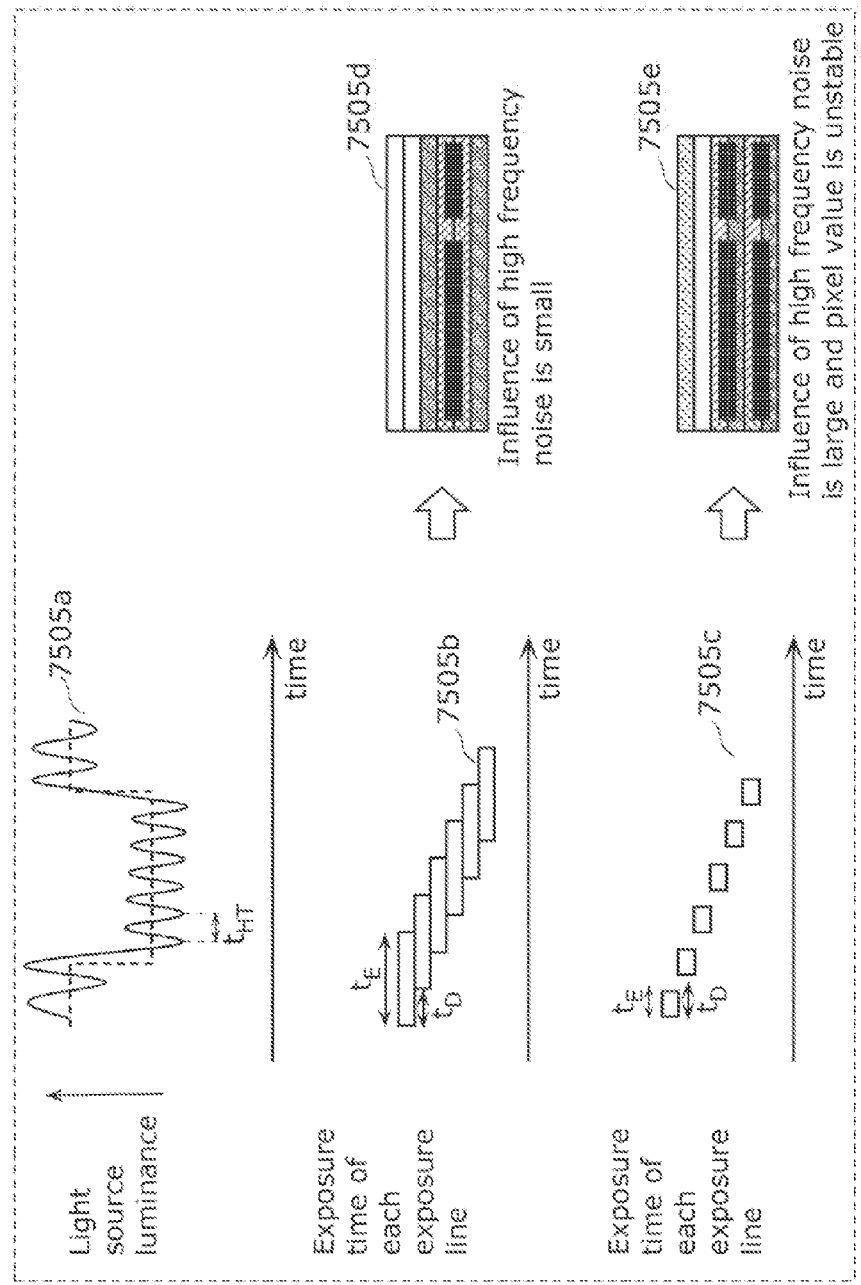
FIG. 44 illustrates a relation between a high frequency noise of light source luminance and an exposure time, according to Embodiment 7.

FIG. 44 illustrates the relation between the high frequency noise $t_{HT}$ of light source luminance and the exposure time $t_E$. When $t_E$ is large as compared with $t_{HT}$, the captured image is less influenced by high frequency noise, which facilitates estimation of light source luminance. When $t_E$ is an integral multiple of $t_{HT}$, there is no influence of high frequency noise, and estimation of light source luminance is easiest. For estimation of light source luminance, it is desirable that $t_E > t_{HT}$. High frequency noise is mainly caused by a switching power supply circuit. Since $t_{HT}$ is less than or equal to 20 microseconds in many switching power supplies for lightings, setting $t_E$ to greater than or equal to 20 microseconds facilitates estimation of light source luminance.

Figure 45:
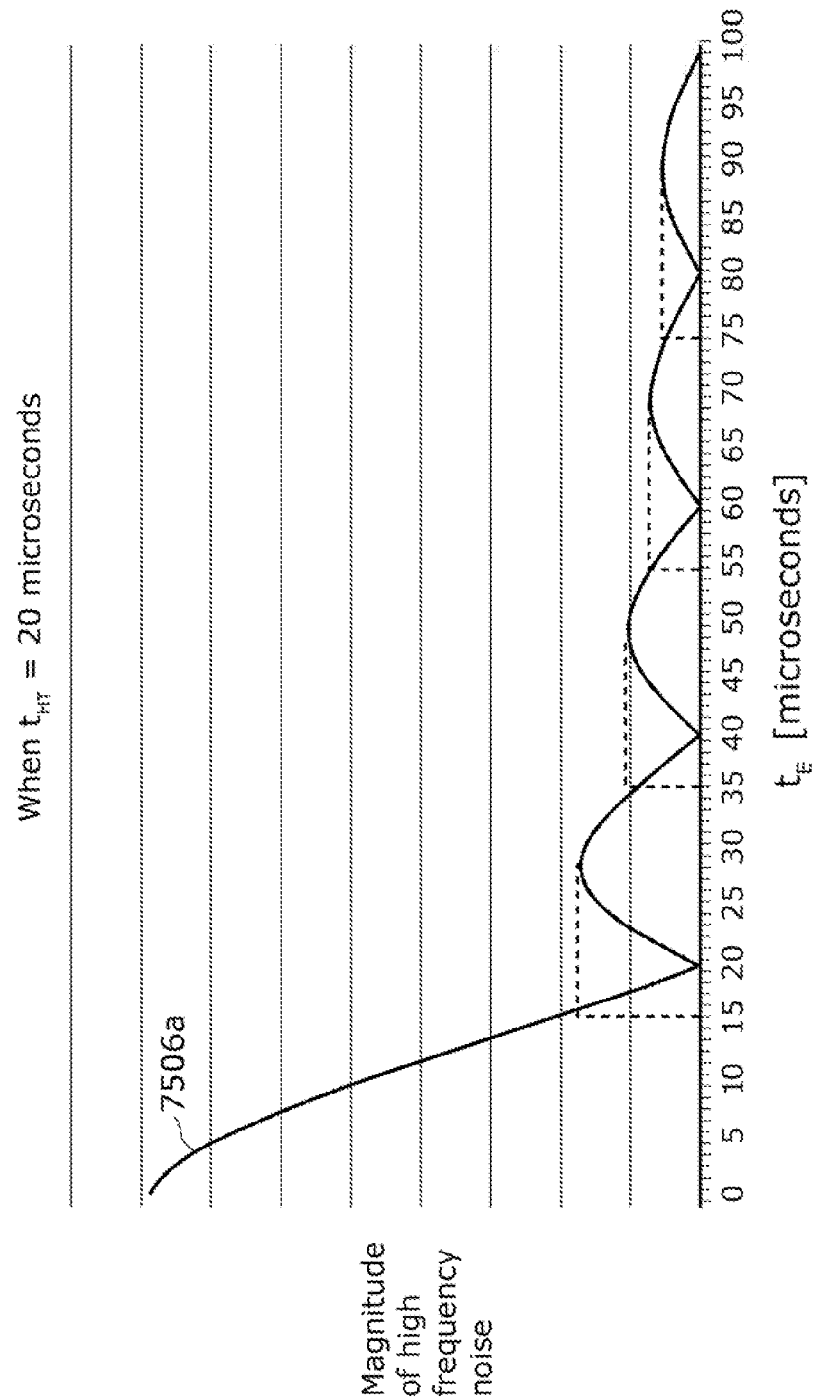
FIG. 45 is a graph representing a relation between an exposure time and a magnitude of high frequency noise when the high frequency noise of the light source luminance is 20 microseconds, according to Embodiment 7.

FIG. 45 is a graph representing the relation between the exposure time $t_E$ and the magnitude of high frequency noise when $t_{HT}$ is 20 microseconds. Given that $t_{HT}$ varies depending on the light source, the graph demonstrates that it is efficient to set $t_E$ to greater than or equal to 15 microseconds, greater than or equal to 35 microseconds, greater than or equal to 54 microseconds, or greater than or equal to 74 microseconds, each of which is a value equal to the value when the amount of noise is at the maximum. Though $t_E$ is desirably larger in terms of high frequency noise reduction, there is also the above-mentioned property that, when $t_E$ is smaller, an intermediate-color part is less likely to occur and estimation of light source luminance is easier. Therefore, $t_E$ may be set to greater than or equal to 15 microseconds when the light source luminance change period is 15 to 35 microseconds, to greater than or equal to 35 microseconds when the light source luminance change period is 35 to 54 microseconds, to greater than or equal to 54 microseconds when the light source luminance change period is 54 to 74 microseconds, and to greater than or equal to 74 microseconds when the light source luminance change period is greater than or equal to 74 microseconds.

Figure 46:
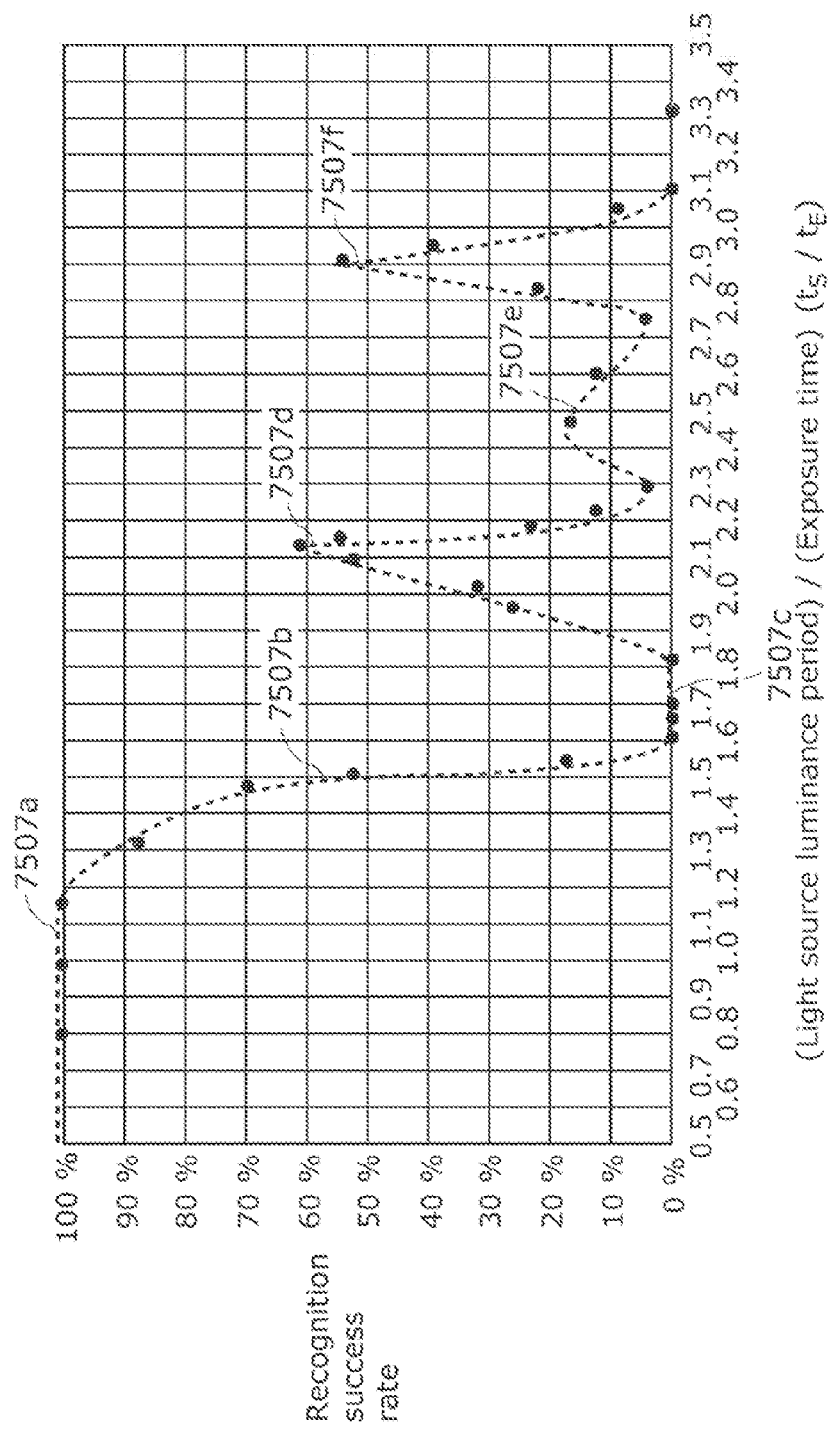
FIG. 46 is a diagram illustrating a relation between an exposure time and a recognition success rate according to Embodiment 7.
Figure 48:
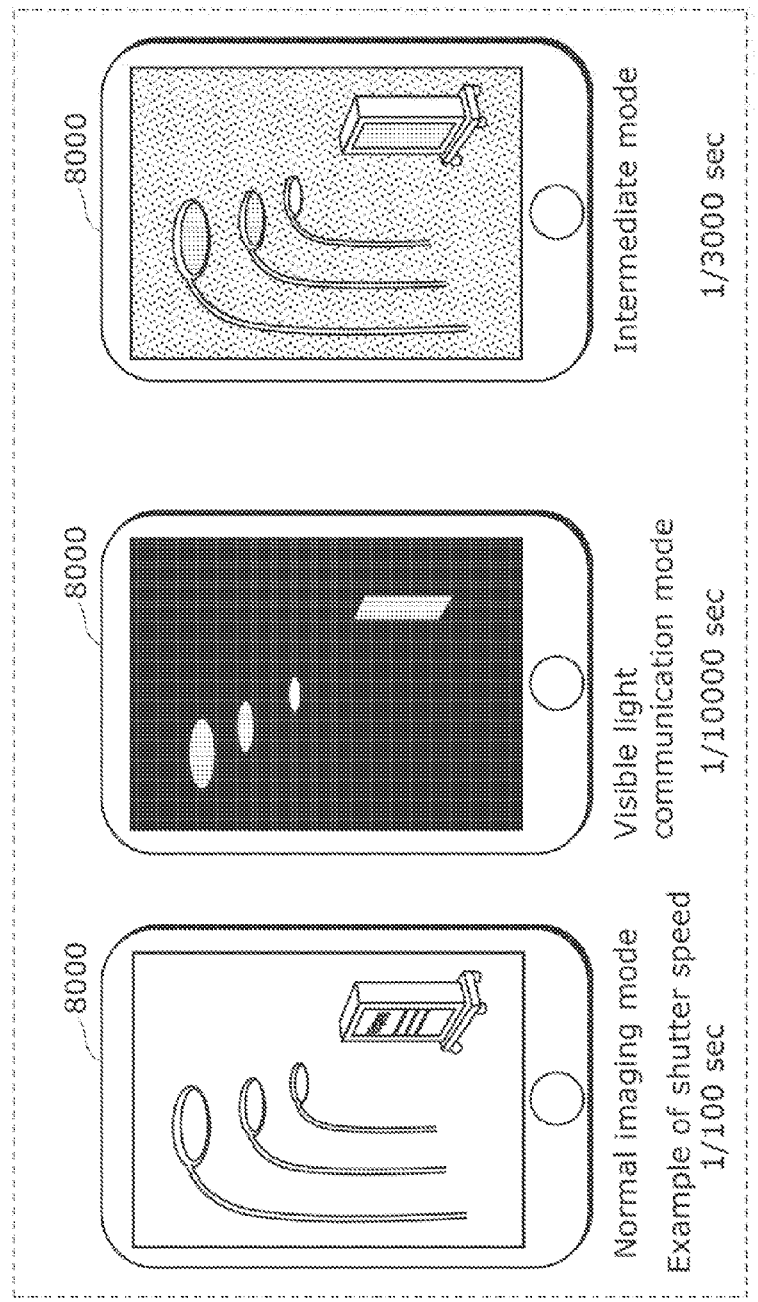
FIG. 48 is a diagram illustrating an example of each mode of a receiving device according to Embodiment 7.

FIG. 46 illustrates the relation between the exposure time $t_E$ and the recognition success rate. Since the exposure time $t_E$ is relative to the time during which the light source luminance is constant, the horizontal axis represents the value (relative exposure time) obtained by dividing the light source luminance change period $t_S$ by the exposure time $t_E$. It can be understood from the graph that the recognition success rate of approximately 100% can be attained by setting the relative exposure time to less than or equal to 1.2. For example, the exposure time may be set to less than or equal to approximately 0.83 millisecond in the case where the transmission signal is 1 kHz. Likewise, the recognition success rate greater than or equal to 95% can be attained by setting the relative exposure time to less than or equal to 1.25, and the recognition success rate greater than or equal to 80% can be attained by setting the relative exposure time to less than or equal to 1.4. Moreover, since the recognition success rate sharply decreases when the relative exposure time is about 1.5 and becomes roughly 0% when the relative exposure time is 1.6, it is necessary to set the relative exposure time not to exceed 1.5. After the recognition rate becomes 0% at 7507*c*, it increases again at 7507*d*, 7507*e*, and 7507*f*. Accordingly, for example to capture a bright image with a longer exposure time, the exposure time may be set so that the relative exposure time is 1.9 to 2.2, 2.4 to 2.6, or 2.8 to 3.0. Such an exposure time may be used, for instance, as an intermediate mode in FIG. 48.

Figure 47:
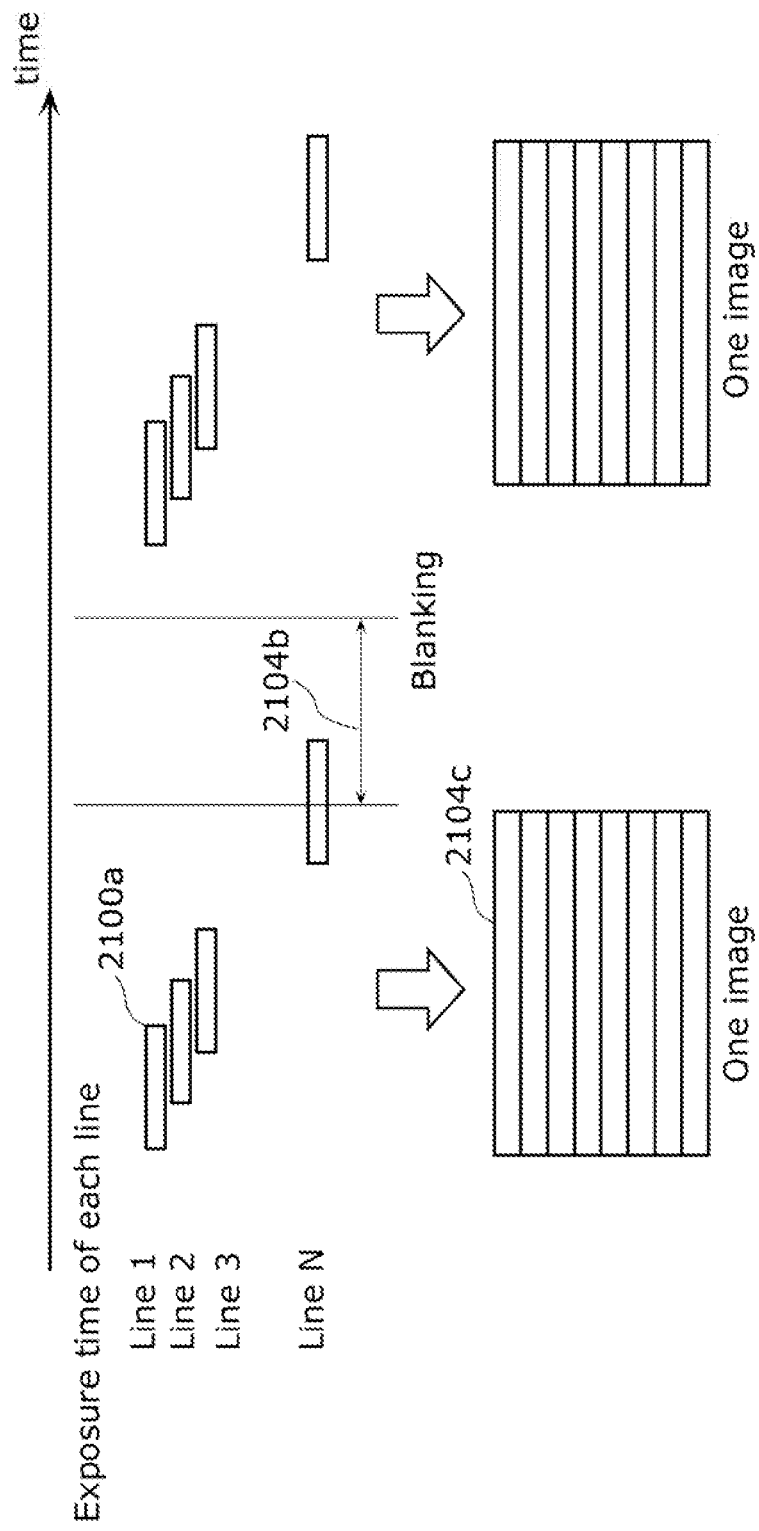
FIG. 47 is a diagram illustrating an example of a method for observing luminance by a light emitting unit according to Embodiment 7.

Depending on imaging devices, there is a time (blanking) during which no exposure is performed, as illustrated in FIG. 47.

In the case where there is blanking, the luminance of the light emitting unit during the time cannot be observed.

A transmission loss caused by blanking can be prevented by the light emitting unit repeatedly transmitting the same signal two or more times or adding error correcting code.

To prevent the same signal from being transmitted during blanking every time, the light emitting unit transmits the signal in a period that is relatively prime to the period of image capture or a period that is shorter than the period of image capture.

Embodiment 8

Figure 49:
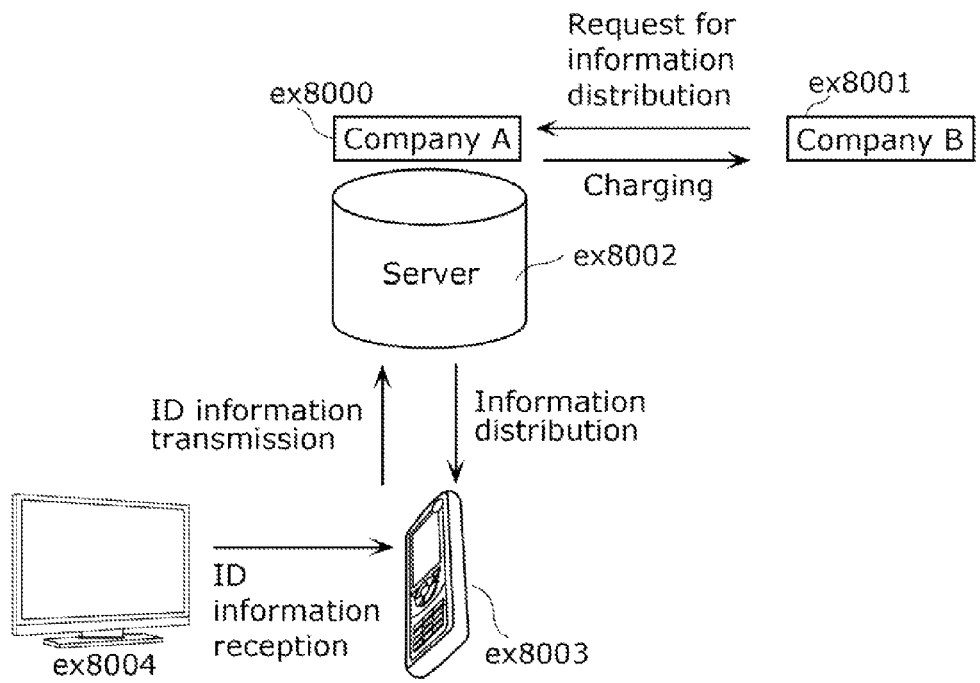
FIG. 49 is a diagram illustrating a service provision system according to Embodiment 8.

FIG. 49 is a diagram illustrating a service provision system using the reception method described in any of the foregoing embodiments.

First, a company A ex8000 managing a server ex8002 is requested to distribute information to a mobile terminal, by another company B or individual ex8001. For example, the distribution of detailed advertisement information, coupon information, map information, or the like to the mobile terminal that performs visible light communication with a signage is requested. The company A ex8000 managing the server manages information distributed to the mobile terminal in association with arbitrary ID information. A mobile terminal ex8003 obtains ID information from a subject ex8004 by visible light communication, and transmits the obtained ID information to the server ex8002. The server ex8002 transmits the information corresponding to the ID information to the mobile terminal, and counts the number of times the information corresponding to the ID information is transmitted. The company A ex8000 managing the server charges the fee corresponding to the count, to the requesting company B or individual ex8001. For example, a larger fee is charged when the count is larger.

Figure 50:
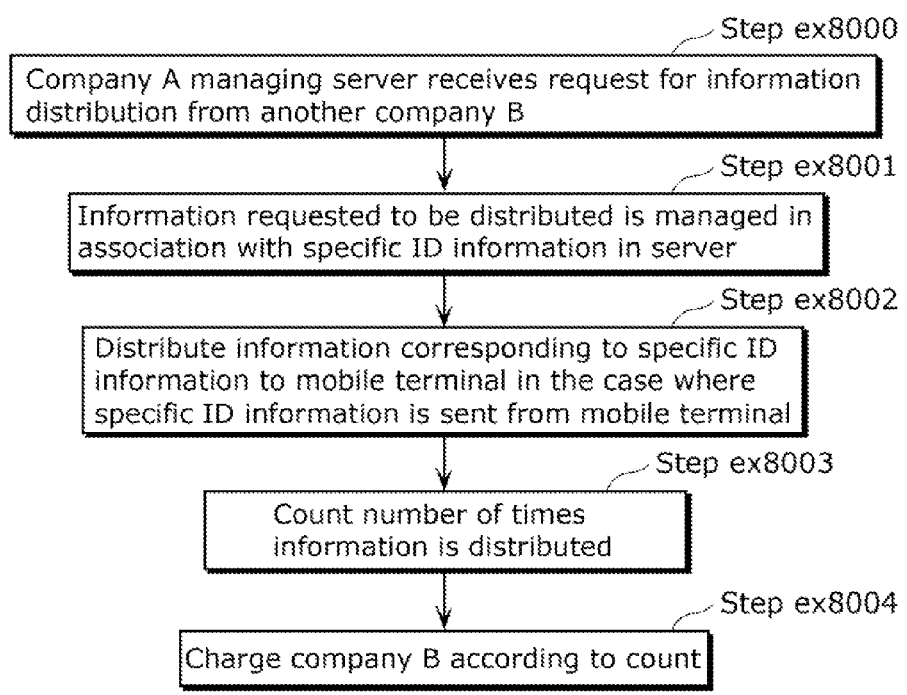
FIG. 50 is a flowchart of service provision according to Embodiment 8.

FIG. 50 is a flowchart illustrating service provision flow.

In Step ex8000, the company A managing the server receives the request for information distribution from another company B. In Step ex8001, the information requested to be distributed is managed in association with the specific ID information in the server managed by the company A. In Step ex8002, the mobile terminal receives the specific ID information from the subject by visible light communication, and transmits it to the server managed by the company A. The visible light communication method has already been described in detail in the other embodiments, and so its description is omitted here. The server transmits the information corresponding to the specific ID information received from the mobile terminal, to the mobile terminal. In Step ex8003, the number of times the information is distributed is counted in the server. Lastly, in Step ex8004, the fee corresponding to the information distribution count is charged to the company B. By such charging according to the count, the appropriate fee corresponding to the advertising effect of the information distribution can be charged to the company B.

Figure 51:
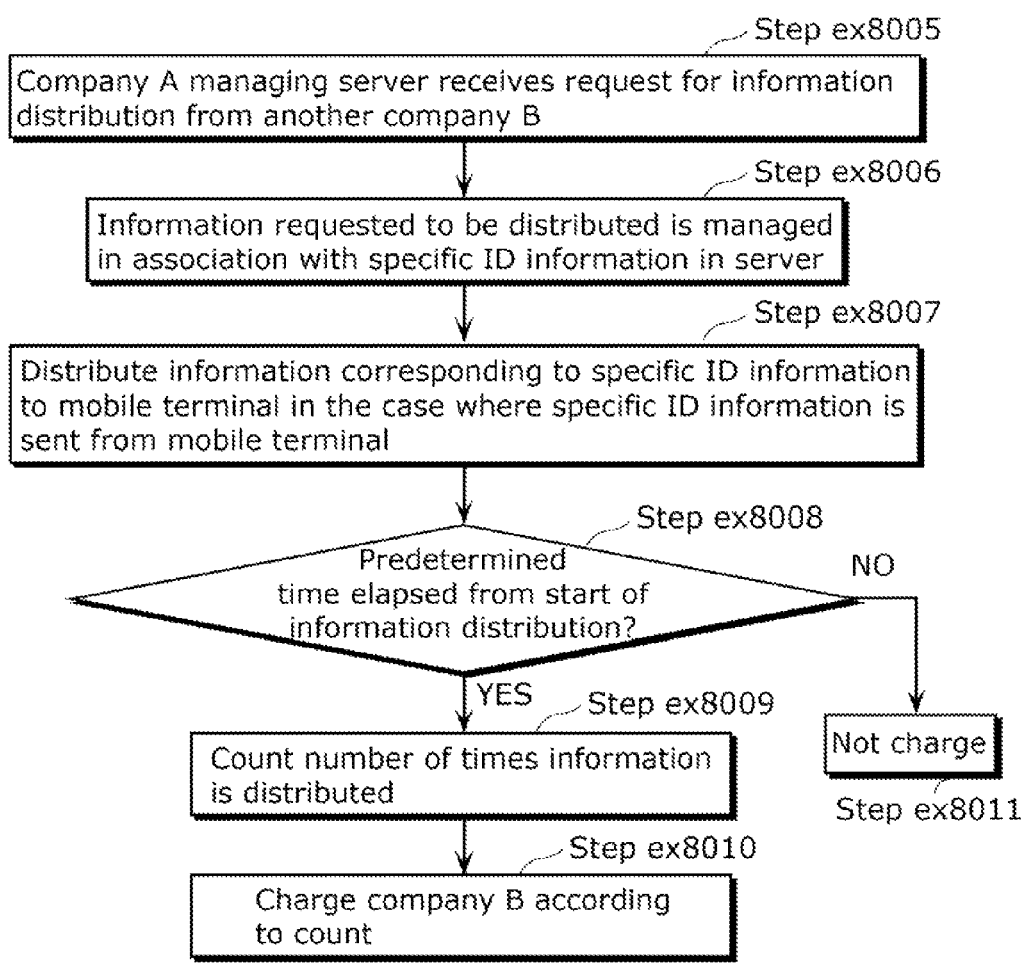
FIG. 51 is a flowchart of service provision according to a variation of Embodiment 8.

FIG. 51 is a flowchart illustrating service provision in another example. The description of the same steps as those in FIG. 50 is omitted here.

In Step ex8008, whether or not a predetermined time has elapsed from the start of the information distribution is determined. In the case of determining that the predetermined time has not elapsed, no fee is charged to the company B in Step ex8011. In the case of determining that the predetermined time has elapsed, the number of times the information is distributed is counted in Step ex8009. In Step ex8010, the fee corresponding to the information distribution count is charged to the company B. Since the information distribution is performed free of charge within the predetermined time, the company B can receive the accounting service after checking the advertising effect and the like.

Figure 52:
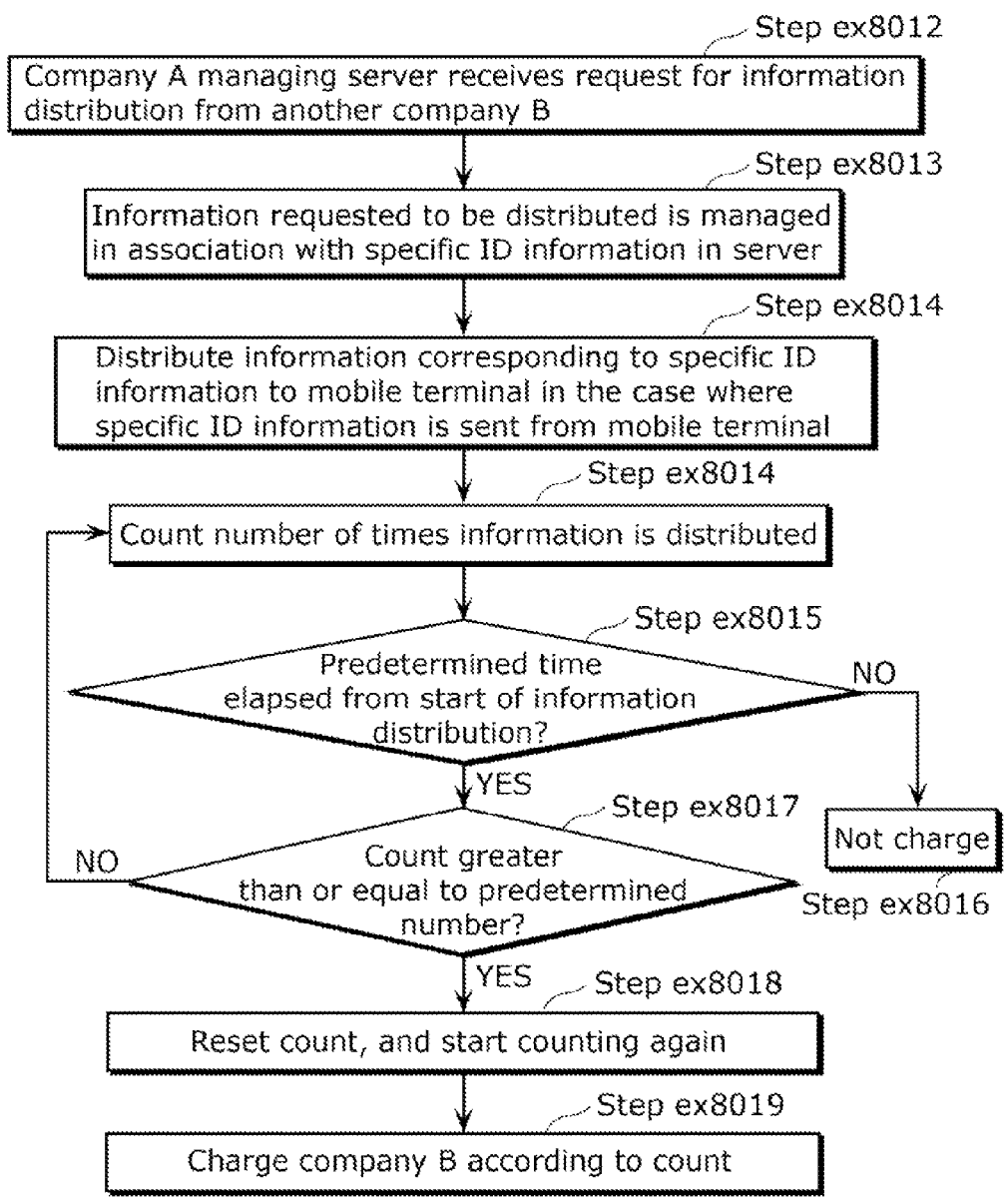
FIG. 52 is a flowchart of service provision according to another variation of Embodiment 8.

FIG. 52 is a flowchart illustrating service provision in another example. The description of the same steps as those in FIG. 51 is omitted here.

In Step ex8014, the number of times the information is distributed is counted. In the case of determining that the predetermined time has not elapsed from the start of the information distribution in Step ex8015, no fee is charged in Step ex8016. In the case of determining that the predetermined time has elapsed, on the other hand, whether or not the number of times the information is distributed is greater than or equal to a predetermined number is determined in Step ex8017. In the case where the number of times the information is distributed is less than the predetermined number, the count is reset, and the number of times the information is distributed is counted again. In this case, no fee is charged to the company B regarding the predetermined time during which the number of times the information is distributed is less than the predetermined number. In the case where the count is greater than or equal to the predetermined number in Step ex8017, the count is reset and started again in Step ex8018. In Step ex8019, the fee corresponding to the count is charged to the company B. Thus, in the case where the count during the free distribution time is small, the free distribution time is provided again. This enables the company B to receive the accounting service at an appropriate time. Moreover, in the case where the count is small, the company A can analyze the information and, for example when the information is out of season, suggest the change of the information to the company B. In the case where the free distribution time is provided again, the time may be shorter than the predetermined time provided first. The shorter time than the predetermined time provided first reduces the burden on the company A. Further, the free distribution time may be provided again after a fixed time period. For instance, if the information is influenced by seasonality, the free distribution time is provided again after the fixed time period until the new season begins.

Note that the charge fee may be changed according to the amount of data, regardless of the number of times the information is distributed. Distribution of a predetermined amount of data or more may be charged, while distribution is free of charge within the predetermined amount of data. The charge fee may be increased with the increase of the amount of data. Moreover, when managing the information in association with the specific ID information, a management fee may be charged. By charging the management fee, it is possible to determine the fee upon requesting the information distribution.

INDUSTRIAL APPLICABILITY

The communication method and the like according to the present invention are capable of securely and actively obtaining information except image. Therefore, they are suitable for various uses, such as transfer of information with image and information transmission, in any situations, since the active obtaining allows not only apparatuses in home, such as television sets, PCs, and tablet terminals, but also signage, information terminals, and information display apparatuses outside home to securely obtain necessary information by a necessary amount.

We claim:

1. A communication method used in a terminal that includes a front camera and a back camera, the communication method comprising:
    switching between the front camera and the back camera according to an orientation of the terminal; and
    performing visible light communication by using the front camera or the back camera, which is selected in the switching,
    wherein the performing of visible light communication includes:
        capturing a first subject that is changing in luminance by using the front camera and obtaining a first image when the front camera is used;
        capturing a second subject by using the back camera and obtaining a second image when the back camera is used; and
        obtaining specified information that is related to the first subject or the second subject.

2. The communication method according to claim 1, wherein when the orientation of the terminal is substantially parallel to ground, the performing of visible light communication includes performing, by using the front camera selected in the switching, visible light communication with the second subject which is located above the user and emits visible light.

3. The communication method according to claim 2, wherein when the orientation of the terminal is substantially perpendicular to ground, the performing of visible light communication includes performing, by using the back camera selected in the switching, visible light communication with the first subject which is located in front of a user and emits visible light.

4. The communication method according to claim 1, wherein the terminal is included in a watch,
    the front camera is provided on a front surface of the watch, and the back camera is provided on a side surface of the watch, the front surface having a display that displays a time of the watch, and
    when the display of the watch is substantially parallel to ground, the performing of visible light communication includes:
        performing, by using the front camera, visible light communication with the second subject which is located above the user and emits visible light; and
        performing, by using the back camera, visible light communication with the first subject which is located in front of the user and emits visible light.

5. The communication method according to claim 1, wherein the performing of visible light communication includes inquiring a server about the specified information, thereby obtaining information related to the first subject or the second subject corresponding to the specified information, and
    when no information corresponds to the specified information as a result of the inquiring the server, the performing of visible light communication further includes displaying, on a display of the terminal, an error notification indicating that no information is related to the first subject or the second subject.

6. The communication method according to claim 2, further comprising:
    performing, by using the front camera selected in the switching, visible light communication with the second subject which is located above the user and emits visible light, thereby obtaining information of the first subject; and displaying the information on a display of the terminal, and
    changing the information displayed on the display of the terminal, wherein in the changing, the information to be displayed on the display is changed by user's flicking on the display.

7. A communication apparatus, comprising:
    a front camera;
    a back camera;
    a processor; and
    a memory having therein a program, the program causing the processor to execute operations including:
    switching between the front camera and the back camera according to an orientation of the terminal; and
    performing visible light communication by using the front camera or the back camera, which is selected in the switching,
    wherein the performing of visible light communication includes:
        capturing a first subject that is changing in luminance by using the front camera and obtaining a first image when the front camera is used;
        capturing a second subject by using the back camera and obtaining a second image when the back camera is used; and
        obtaining specified information that is related to the first subject or the second subject.

8. A non-transitory computer-readable recording medium storing a program for performing visible light communication, the visible light communication program causing a computer to execute:
    switching between the front camera and the back camera according to an orientation of the terminal; and
    performing visible light communication by using the front camera or the back camera, which is selected in the switching,
    wherein the performing of visible light communication includes:
        capturing a first subject that is changing in luminance by using the front camera and obtaining a first image when the front camera is used;

capturing a second subject by using the back camera and obtaining a second image when the back camera is used; and obtaining specified information that is related to the first subject or the second subject.

* * * * *